United States Patent [19]

Mimura et al.

[11] Patent Number: 5,963,704
[45] Date of Patent: Oct. 5, 1999

[54] RECORDING MEDIUM, APPARATUS AND METHOD FOR RECORDING DATA ON THE RECORDING MEDIUM, APPARATUS AND METHOD FOR REPRODUCING DATA FROM THE RECORDING MEDIUM

[75] Inventors: Hideki Mimura; Tomoaki Kurano; Shinichi Kikuchi; Kazuhiko Taira, all of Yokohama, Japan

[73] Assignee: Kabushiki Kaisha Toshiba, Kawasaki, Japan

[21] Appl. No.: 09/116,831

[22] Filed: Jul. 17, 1998

Related U.S. Application Data

[62] Division of application No. 08/635,245, Apr. 12, 1996.

[30] Foreign Application Priority Data

Apr. 14, 1995 [JP] Japan .................................. 7-114018

[51] Int. Cl.⁶ ...................................................... H04N 5/76
[52] U.S. Cl. ............................................. 386/95; 386/126
[58] Field of Search .............................. 386/95, 96, 104, 386/105, 111, 112, 125, 126, 121, 83, 98, 46; 369/32; 348/468; H04N 5/76

[56] References Cited

U.S. PATENT DOCUMENTS

| | | |
|---|---|---|
| 4,305,131 | 12/1981 | Best . |
| 4,333,152 | 6/1982 | Best . |
| 4,569,026 | 2/1986 | Best . |
| 4,979,159 | 12/1990 | Tsuruoka . |
| 4,989,097 | 1/1991 | Yoshio . |
| 5,010,417 | 4/1991 | Yoshio . |
| 5,016,113 | 5/1991 | Yamashita . |
| 5,043,826 | 8/1991 | Yoshio . |

(List continued on next page.)

FOREIGN PATENT DOCUMENTS

| | | |
|---|---|---|
| 440408 | 8/1991 | European Pat. Off. . |
| 546189 | 6/1993 | European Pat. Off. . |
| 661888 | 12/1993 | European Pat. Off. . |
| 633560 | 1/1995 | European Pat. Off. . |
| 677842 | 10/1995 | European Pat. Off. . |
| 93923665 | 8/1996 | European Pat. Off. . |
| 63-43480 | 2/1988 | Japan . |
| 1221072 | 9/1989 | Japan . |
| 1241083 | 9/1989 | Japan . |
| 1273275 | 11/1989 | Japan . |
| 2287990 | 11/1990 | Japan . |
| 3134883 | 6/1991 | Japan . |
| 3220671 | 9/1991 | Japan . |
| 4245091 | 9/1992 | Japan . |
| 4324165 | 11/1992 | Japan . |
| 628780 | 2/1994 | Japan . |
| 7130102 | 5/1995 | Japan . |
| WO 86/01063 | 2/1986 | WIPO . |
| WO 94/07332 | 3/1994 | WIPO . |
| WO94/30014 | 12/1994 | WIPO . |

OTHER PUBLICATIONS

Patent Abstracts of Japan, Publication No. 5–250418, Date of Publication of Application—Sep. 28, 1993.
Patent Abstracts of Japan, Publication No. 6–12834, Date of Publication of Application—Jan. 21, 1994.
Patent Abstracts of Japan, Publication No. 06302163 A, Date of Publication of Application—Oct. 28, 1994.
Patent Abstracts of Japan, Publication No. 06319125 A, Date of Publication of Application—Nov. 15, 1994.
Patent Abstracts of Japan, Publication No. Hei 8–149407, Date of Publication of Application—Jun. 7, 1996.

*Primary Examiner*—Huy T. Nguyen
*Attorney, Agent, or Firm*—Pillsbury Madison & Sutro LLP

[57] ABSTRACT

A method to form a menu of video data as the background image of the menu and sub-picture data made of an selection item of the menu, alters highlight information for the selection item of the sub-picture data, thereby easily forming various menu. Specifically, a button area for surrounding the selection item and the action item represented by the sub-picture data is provided, and the color and contract of the pattern pixel, background pixel and highlighted pixel as pixel data in the button area are variously altered.

1 Claim, 55 Drawing Sheets

Video

Sub-picture

Highlight information

Mixing picture

U.S. PATENT DOCUMENTS

| | | |
|---|---|---|
| 5,063,551 | 11/1991 | Yoshio . |
| 5,065,252 | 11/1991 | Yoshio . |
| 5,089,899 | 2/1992 | Nomura . |
| 5,097,349 | 3/1992 | Nomura . |
| 5,233,438 | 8/1993 | Funahashi . |
| 5,237,426 | 8/1993 | Daito . |
| 5,237,648 | 8/1993 | Mills . |
| 5,243,582 | 9/1993 | Yamauchi . |
| 5,245,600 | 9/1993 | Yamauchi . |
| 5,253,120 | 10/1993 | Endoh . |
| 5,270,828 | 12/1993 | Mogi . |
| 5,280,572 | 1/1994 | Case . |
| 5,282,186 | 1/1994 | Yoshio . |
| 5,384,674 | 1/1995 | Nishida et al. . |
| 5,400,077 | 3/1995 | Cookson . |
| 5,434,678 | 7/1995 | Abecassis . |
| 5,479,266 | 12/1995 | Young et al. . |
| 5,543,925 | 8/1996 | Timmermans . |
| 5,546,191 | 8/1996 | Hibbi et al. . |
| 5,596,564 | 1/1997 | Fukushima et al. . |
| 5,619,338 | 4/1997 | Nakai et al. . |
| 5,636,200 | 6/1997 | Taira et al. ............................... 369/32 |
| 5,646,796 | 7/1997 | Kimura et al. . |

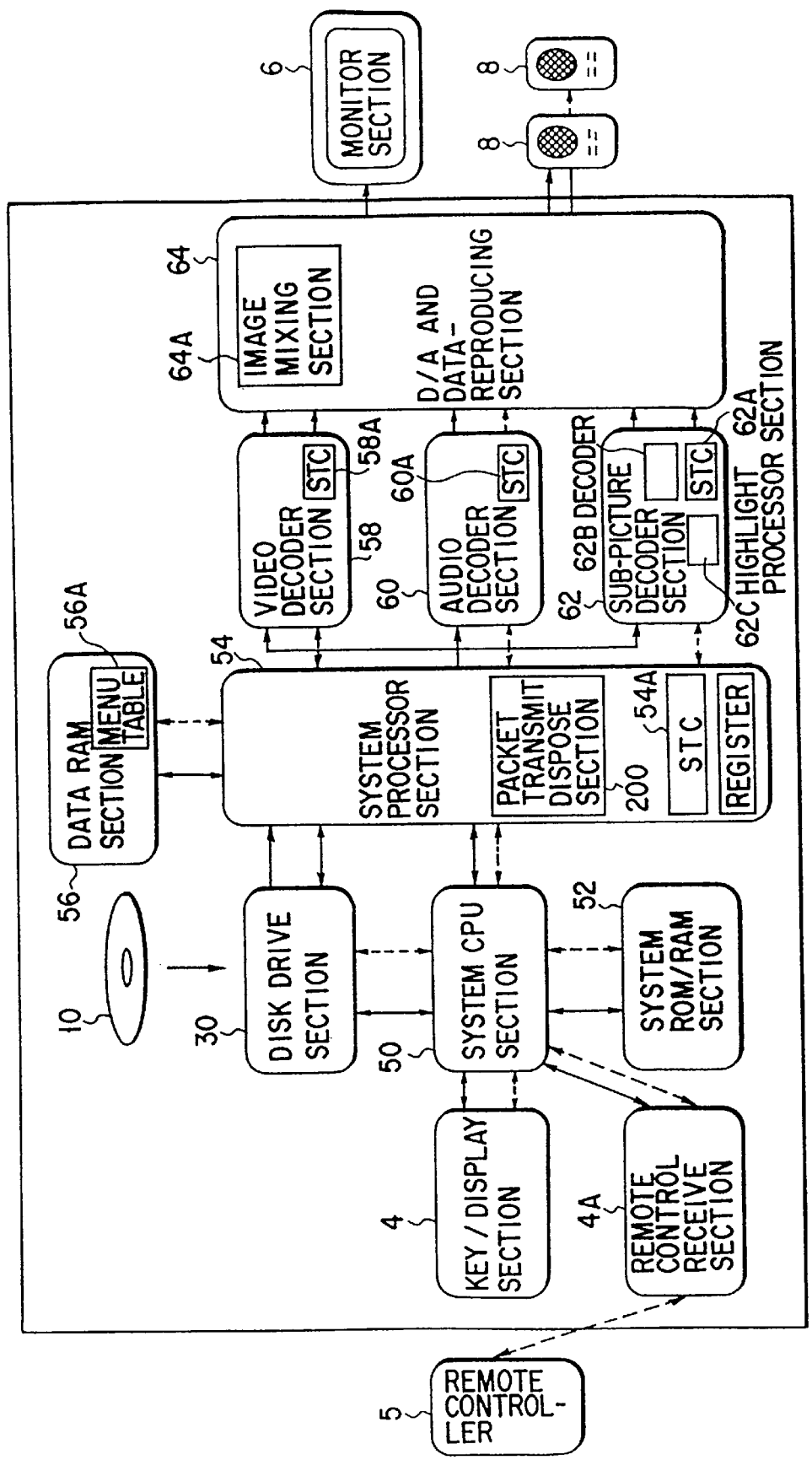
F I G. 1

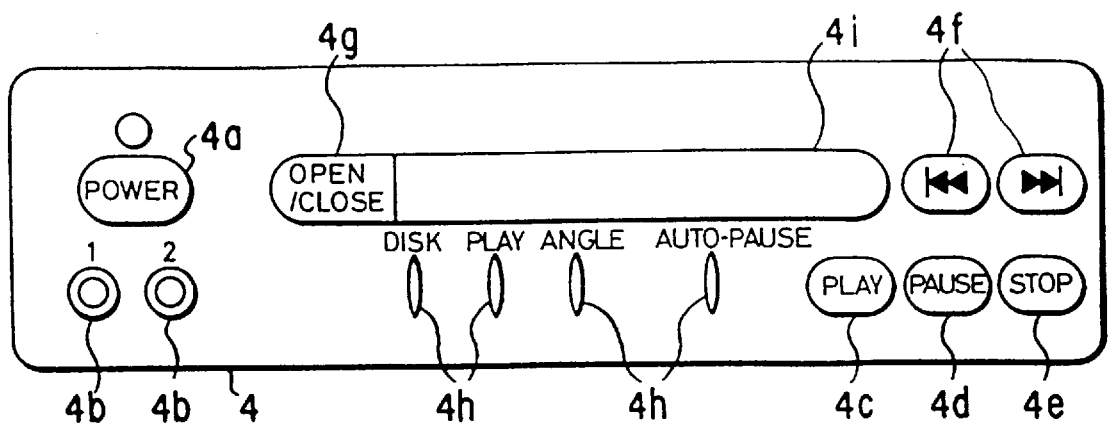
F I G. 4
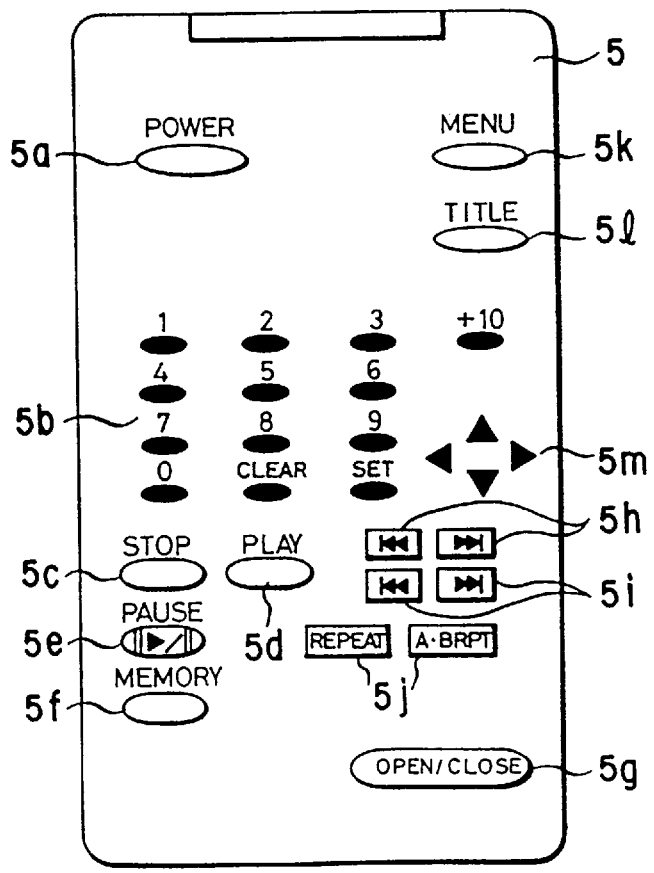
F I G. 5

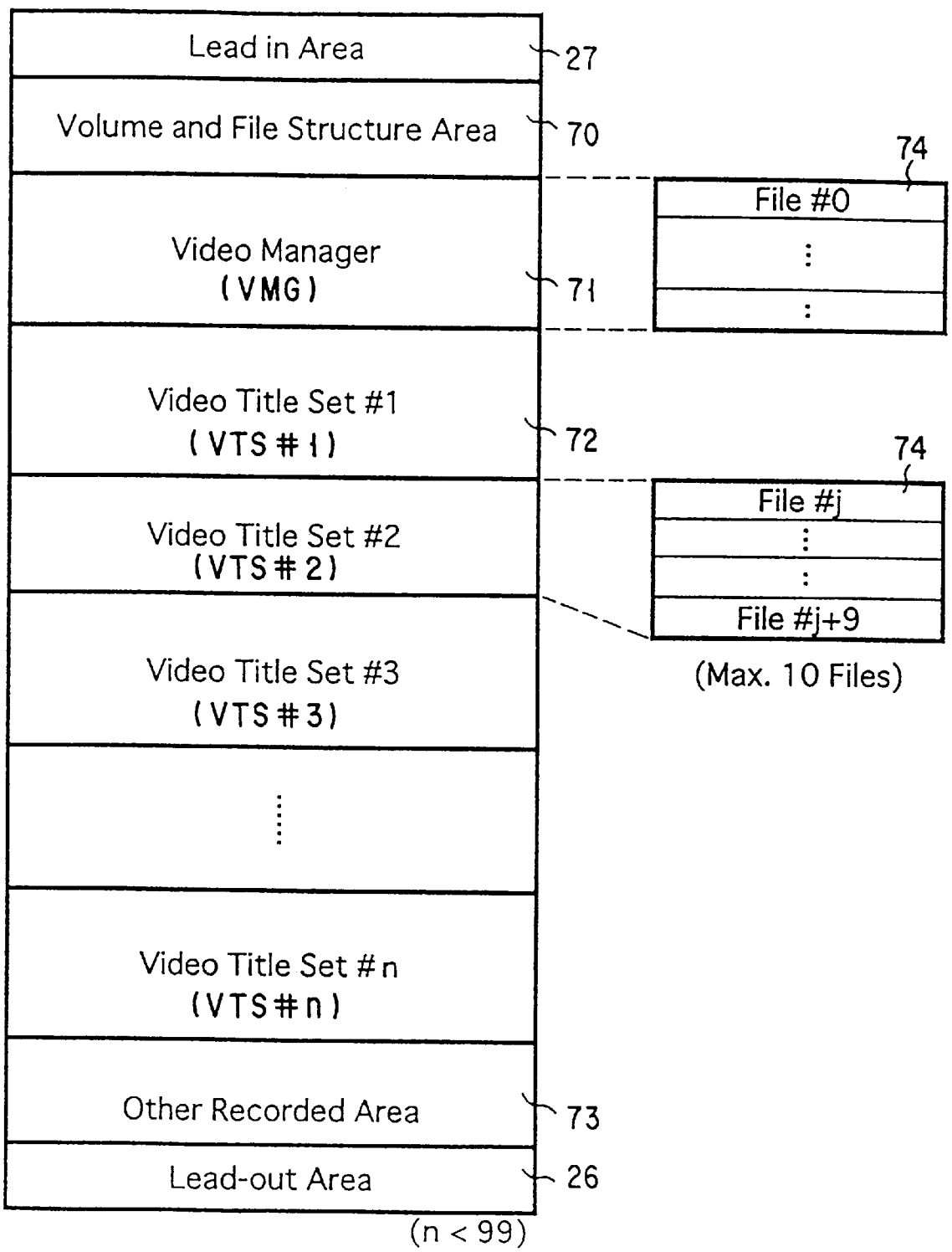
F I G. 6

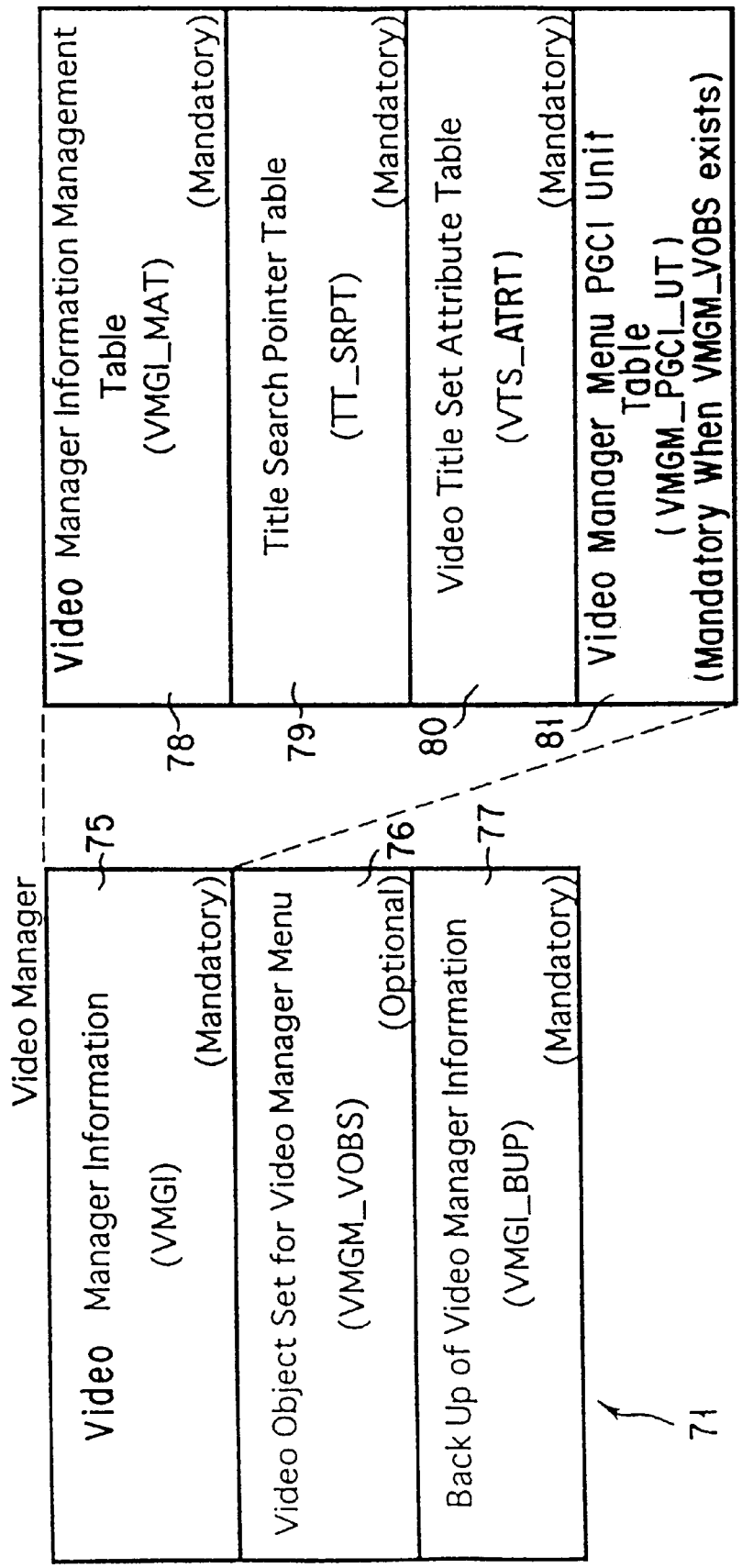
F I G. 7

FIG. 10

| VMGI_MAT | Content | (Description order) |
|---|---|---|
| VMG_ID | Video Manager Identifier | |
| VMGI_SZ | Size of Video Manager Information | |
| VERN | Version Number of DVD Video Specification | |
| VMG_CAT | Video Manager Category | |
| VLMS_ID | Volume Set Identifier | |
| VTS_Ns | Number of Video Title Sets | |
| PVR_ID | Provider Unique ID | |
| VMGM_VOBS_SA | Video Manager Menu Video Object Set Start Address | |
| VMGI_MAT_EA | End Address of VMGI_MAT | |
| TT_SRPT_SA | Start Address of TT_SRPT | |
| VMGM_PGCI_UT_SA | Start Address of VMGM_PGCI_UT | |
| VTS_ATRT_SA | Start Address of VTS_ATRT | |
| VMGM_V_ATR | Video Attribute of VMGM | |
| VMGM_AST_Ns | Number of Audio Streams of VMGM | |
| VMGM_AST_ATR | Audio Stream Attribute of VMGM | |
| VMGM_SPST_Ns | Number of Sub-picture Streams of VMGM | |
| VMGM_SPST_ATR | Sub-picture Stream Attribute of VMGM | |

TT_SRPT

| TT_SRPTI | (Description order) |
|---|---|
| | Content |
| TT_SRPT_Ns | Number of Title search Pointers |
| TT_SRPT_EA | End Address of TT_SRPT |

| TT_SRP | (Description order) |
|---|---|
| | Content |
| PTT_Ns | Number of Part-of-Titles |
| VTSN | Video Title Set Number |
| VTS_TTN | Video Title Set Title Number |
| VTS_SA | Start Address of Video Title Set |

| VMGM_PGCI_UTI | Contents |
|---|---|
| VMGM_LU_Ns | Number of Video Manager Menu Language Unit |
| VMGM_PGCI_UT_EA | End address of VMGM PGCI UT |

VTSM_PGCI_SRP

| | Contents |
|---|---|
| VMGM_LCD | Video Manager Menu Language Code |
| VMGM_LU_SA | Start address of associated VMGM_LU |

VMSM_LUI

| | Contents |
|---|---|
| VMGM_PGCI_Ns | Number of VMGM_PGCIS |
| reserved | RSV(0) |
| VMGM_LUI_EA | End address of VMGM_LUI |

VTSM_PGCI_SRP

| | Contents |
|---|---|
| VMGM_PGC_CAT | VMGM_PGC Category |
| VMGM_PGCI_SA | Start Address of VMGM_PGCI |

| VTSI_MAT | Content | (Description order) |
|---|---|---|
| VTS_ID | Video Title Set Identifier | |
| VTS_SZ | Size of the VTS | |
| VERN | Version Number of DVD Video Specification | |
| VTS_CAT | Video Title Set Category | |
| VTSM_VOBS_SA | Start Address of VTSM_VOBS | |
| VTSTT_VOBS_SA | Start Address of VTSTT_VOBS | |
| VTSI_MAT_EA | End Address of VTSI_MAT | |
| VTS_PTT_SRPT_SA | Start Address of VTS_PTT_SRPT | |
| VTS_PGCIT_SA | Start Address of VTS_PGCIT | |
| VTSM_PGCI_UT_SA | Start Address of VTS_PGCI_UT | |
| VTS_TMAPT_SA | Start Address of VTS_TMAPT | |
| VTS_V_ATR | Video Attribute of VTS | |
| VTS_AST_Ns | Number of Audio Streams for VTS | |
| VTS_AST_ATR | Audio Stream Attribute for VTS | |
| VTS_SPST_Ns | Number of Sub-picture Streams for VTS | |
| VTS_SPST_ATR | Sub-picture Stream Attribute for VTS | |
| VTSM_AST_Ns | Number of Audio Streams for VTSM | |
| VTSM_AST_ATR | Audio Stream Attribute for VTSM | |
| VTS_SPST_Ns | Number of Sub-picture Streams for VTSM | |
| VTS_SPST_ATR | Sub-picture Stream Attribute for VTSM | |

FIG. 21

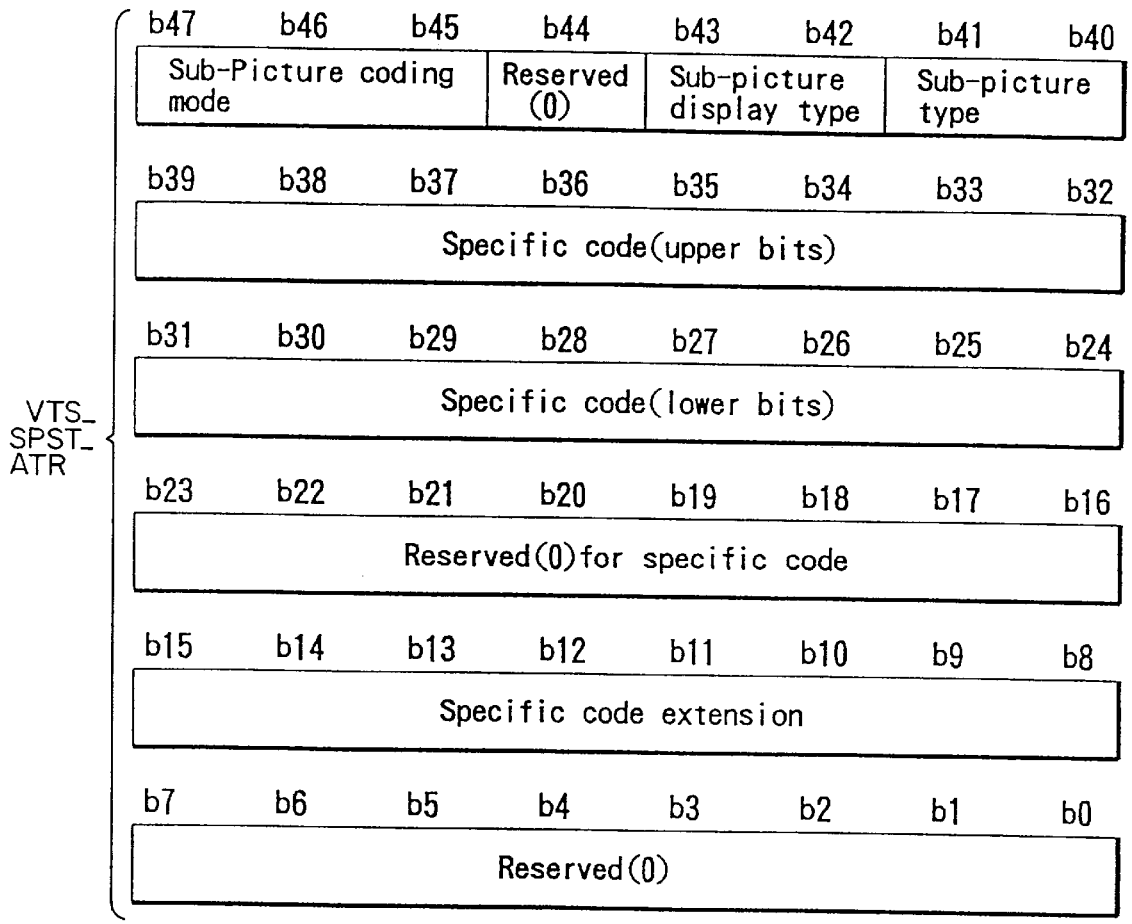
F I G. 23

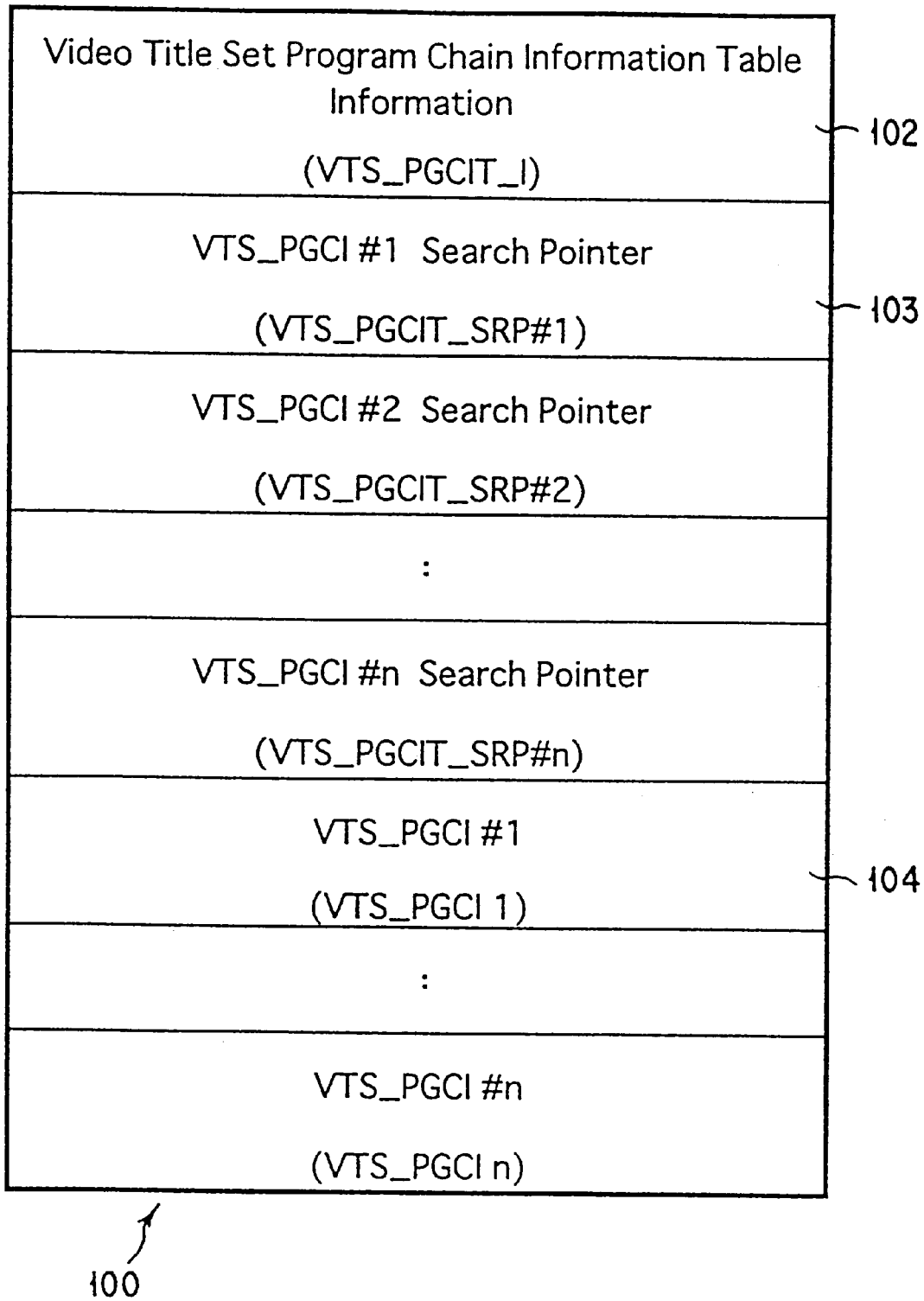
F I G. 24

VTS_PGCIT_I

| | (Description order) |
|---|---|
| | Content |
| VTS_PGC_Ns | Number of VTS_PGCs |
| VTS_PGCIT_EA | End Address of VTS_PGCIT |

F I G. 25

VTS_PGCIT_SRP

| | (Description order) |
|---|---|
| | Content |
| VTS_PGC_CAT | Video Title Set PGC category |
| VTS_PGCI_SA | Start Address of VTS_PGC Information |

F I G. 26

VTS_PGCI

| Program Chain General Information (PGC_GI) (Mandatory) | ~105 |
| Program Chain Program Map (PGC_PGMAP) (Mandatory If VOB exists) | ~106 |
| Cell Playback Information Table (C_PBIT) (Mandatory If VOB exists) | ~107 |
| Cell Position Information Table (C_POSIT) (Mandatory If VOB exists) | ~108 |

~104

F I G. 27

PGC_GI

| | (Description order) |
|---|---|
| | Content |
| PGC_CAT | PGC Category |
| PGC_CNT | PGC Content |
| PGC_PB_TIME | PGC Playback Time |
| PGC_SPST_CTL | PGC-Sub-picture Stream Control |
| PGC_AST_CTL | PGC Audio Stream Control |
| PGC_SP_PLT | PGC Sub-picture Palette |
| C_PBIT_SA | Start Address of C_PBIT |
| C_POSIT_SA | Start Address of C_POSIT |

F I G. 28

PGC_PGMAP

| Entry Cell Number for Program #1 |
|---|
| Entry Cell Number for Program #2 |
| ⋮ |
| Entry Cell Number for Program #n |

F I G. 31

Entry cell number

| | Content |
|---|---|
| ECELLN | Entry Cell Number |

F I G. 32

C_PBIT

| Cell Playback Information #1 (C_PBI1) |
|---|
| Cell Playback Information #2 (C_PBI2) |
| ⋮ |
| Cell Playback Information #n (C_PBIn) |

F I G. 33

PGC_CAT
| b31 | b30 | b29 | b28 | b27 | b26 | b25 | b24 |
|---|---|---|---|---|---|---|---|
| Error type | RSV(0) | | | Menu ID | | | |

| b23 | b22 | b21 | b20 | b19 | b18 | b17 | b16 |
|---|---|---|---|---|---|---|---|
| PGC block mode | | PGC block type | | Program playback control | | | |

| b15 | b14 | b13 | b12 | b11 | b10 | b9 | b8 |
|---|---|---|---|---|---|---|---|
| Copy flag | | Playback system management | | Application type | | | |

| b7 | b6 | b5 | b4 | b3 | b2 | b1 | b0 |
|---|---|---|---|---|---|---|---|
| Parental ID | | | | | | | |

F I G. 29

PGC_CNT
| b23 | b22 | b21 | b20 | b19 | b18 | b17 | b16 |
|---|---|---|---|---|---|---|---|
| Reserved (0) | Number of Programs | | | | | | |

| b15 | b14 | b13 | b12 | b11 | b10 | b9 | b8 |
|---|---|---|---|---|---|---|---|
| Number of Cells | | | | | | | |

| b7 | b6 | b5 | b4 | b3 | b2 | b1 | b0 |
|---|---|---|---|---|---|---|---|
| Reserved(0) | | | | Number of Angles | | | |

F I G. 30

C_PBI
|  | Content |
|---|---|
| C_CAT | Cell Category |
| C_PBTM | Cell Playback Time |
| C_FVOBU_SA | Start Address of the First VOBU in the Cell |
| C_LVOBU_SA | Start Address of the Last VOBU in the Cell |
F I G. 34
C_POSI
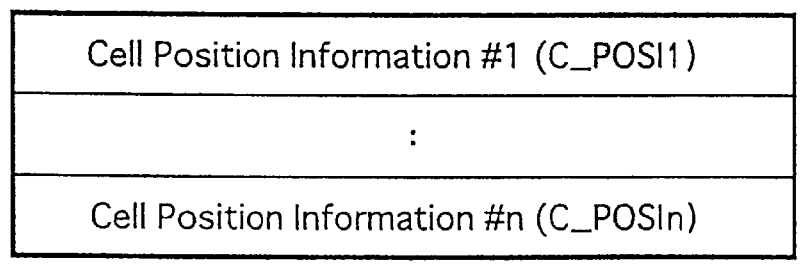
F I G. 35
C_POSI
|  | Content |
|---|---|
| C_VOB_IDN | VOB ID Number of the Cell |
| C_IDN | Cell ID Number of the Cell |
F I G. 36

VTSM_PGCI_UTI

| | Contents |
|---|---|
| VTSM_LU_Ns | Number of Video Title Set Menu Language Units |
| reserved | RSV(0) |
| VTSM_PGCI_UT_EA | End Address of VTSM_PGCI_UT |

VTSM_LU_SRP

| | Contents |
|---|---|
| VTSM_LCD | Video Title Set Menu Language Code |
| reserved | RSV(0) |
| VTSM_LU_SA | Start Address of VTSM_LU |

VTSM_LUI

| | Contents |
|---|---|
| VTSM_PGC_Ns | Number of VTSM_PGCs |
| reserved | Reserved(0) |
| VTSM_LU_EA | End Adderss of VTSM_LU |

VTSM_PGCI_SRP

| | Contents |
|---|---|
| VTSM_PGC_CAT | VTSM_PGC Category |
| VTSM_PGCI_SA | Start Address of VTSM_PGCI |

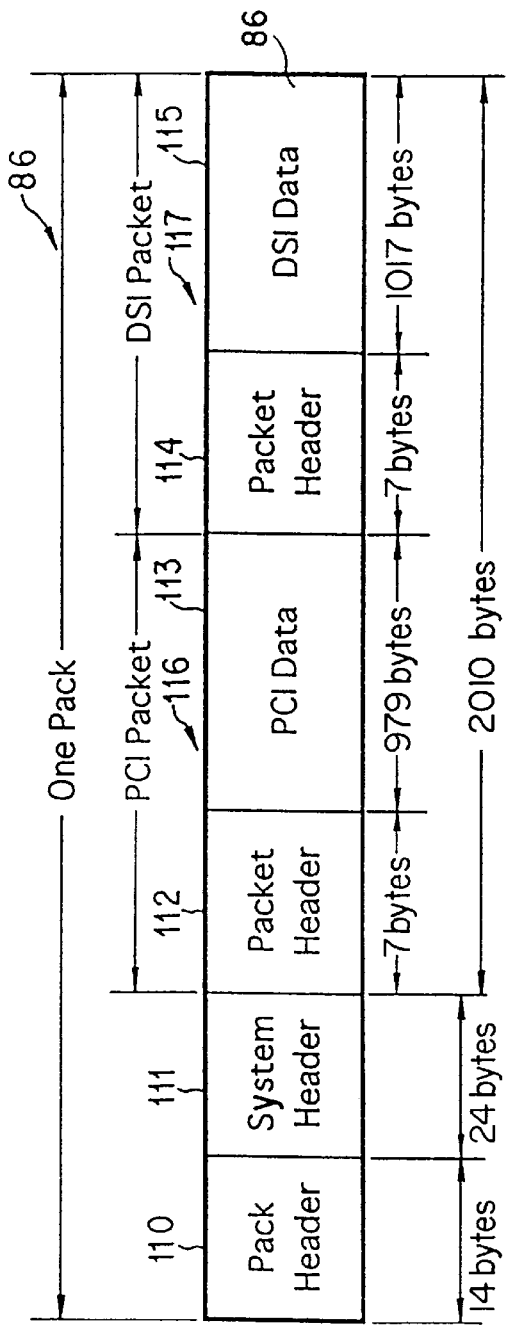
F I G. 43
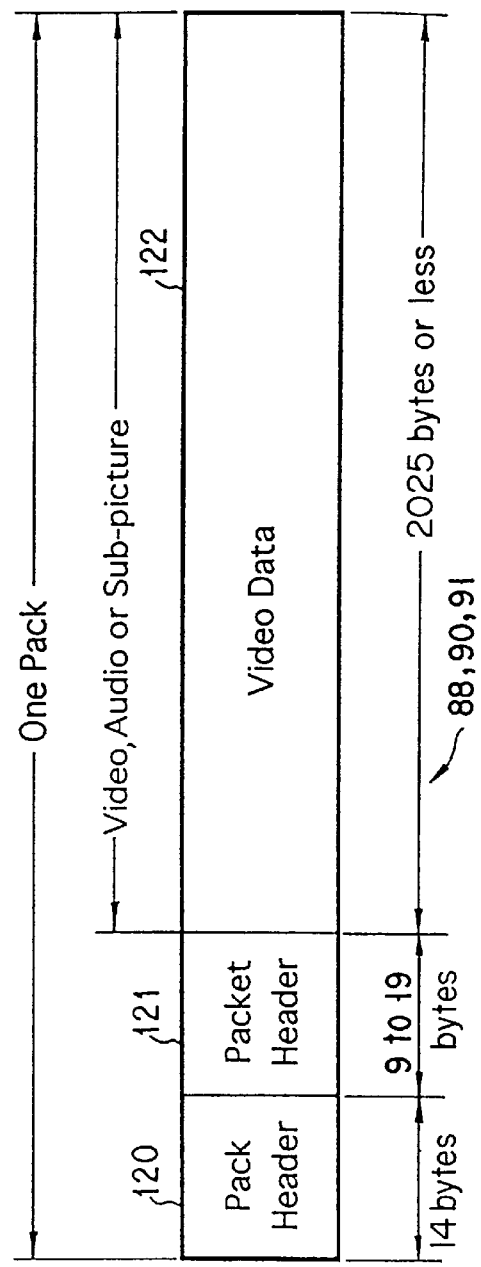
F I G. 44

| PCI | |
|---|---|
| | Content |
| PCI_GI | PCI General Information |
| NSML_AGLI | Angle Information |
| HLI | Highlight Information |

F I G. 45

| PCI_GI | |
|---|---|
| | Content |
| NV_PCK_LBN | LBN of NV Pack |
| VOBU_CAT | Category of VOBU |
| VOBU_S_PTS | Start PTS of VOBU |
| VOBU_E_PTS | End PTS of VOBU |

F I G. 46

| NSML_AGLI | |
|---|---|
| | Content |
| NSML_AGL_C1_DSTA | Destination Address of Angle Cell Number 1 |
| NSML_AGL_C2_DSTA | Destination Address of Angle Cell Number 2 |
| NSML_AGL_C3_DSTA | Destination Address of Angle Cell Number 3 |
| NSML_AGL_C4_DSTA | Destination Address of Angle Cell Number 4 |
| NSML_AGL_C5_DSTA | Destination Address of Angle Cell Number 5 |
| NSML_AGL_C6_DSTA | Destination Address of Angle Cell Number 6 |
| NSML_AGL_C7_DSTA | Destination Address of Angle Cell Number 7 |
| NSML_AGL_C8_DSTA | Destination Address of Angle Cell Number 8 |
| NSML_AGL_C9_DSTA | Destination Address of Angle Cell Number 9 |

F I G. 47

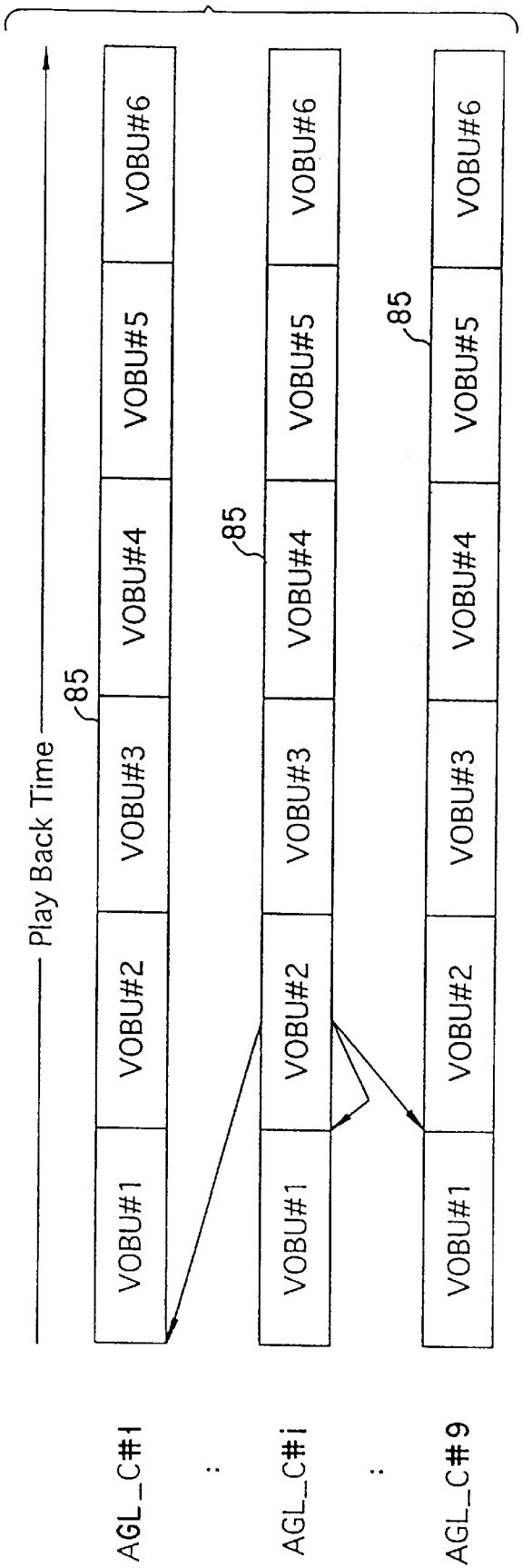
F I G. 48

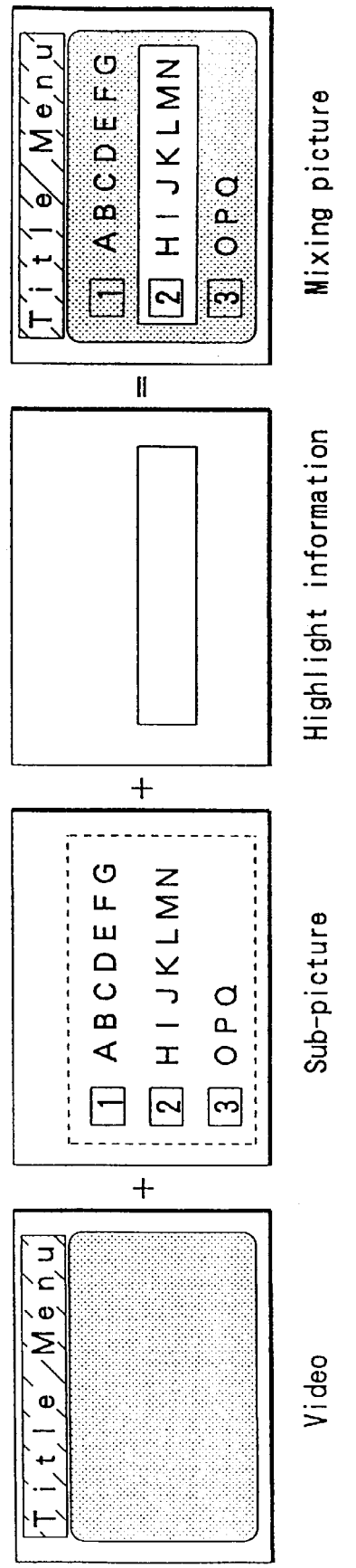
F I G. 50

| HLI | | Contents |
|---|---|---|
| HL_GI | | Highlight General Information |
| BTN_COLIT | | Button Color Information Table |
| BTNIT | | Button Information Table |

FIG. 51

| HL_GI | | Contents |
|---|---|---|
| | (1) HLI_SS | Status of HLI |
| | (2) HLI_S_PTM | Start PTM of HLI |
| | (3) HLI_E_PTM | End PTM of HLI |
| | (4) BTN_SL_E_PTM | End PTM of Button select |
| | (5) BTN_MD | Mode of Button |
| | (6) BTN_SN | Button Start number |
| | (7) BTN_Ns | Number of Buttons |
| | (8) NSBTN_Ns | Number of numerical select Buttons |
| | (9) FSLBTN_N | Forcedly selected Button number |
| | (10) FACBTN_N | Forcedly activated Button number |

FIG. 53

| | | | | | | | |
|---|---|---|---|---|---|---|---|
| b47 | b46 | b45 | b44 | b43 | b42 | b41 | b40 |
| BTN_COLN | Start X-coordinate (upper bits) | | | | | | |
| b39 | b38 | b37 | b36 | b35 | b34 | b33 | b32 |
| Start X-coordinate (lower bits) | | | Reserved (0) | | | End X-coordinate (upper bits) | |
| b31 | b30 | b29 | b28 | b27 | b26 | b25 | b24 |
| End X-coordinate (lower bits) | | | | | | | |
| b23 | b22 | b21 | b20 | b19 | b18 | b17 | b16 |
| Auto action mode | | | Start Y-coordinate (upper bits) | | | | |
| b15 | b14 | b13 | b12 | b11 | b10 | b9 | b8 |
| Start Y-coordinate (lower bits) | | | Reserved (0) | | | End Y-coordinate (upper bits) | |
| b7 | b6 | b5 | b4 | b3 | b2 | b1 | b0 |
| End Y-coordinate (lower bits) | | | | | | | |

(BTN_POSI)

F I G. 58

DSI

| | Content |
|---|---|
| DSI_GI | DSI General Information |
| SML_AGLI | Angle Information |
| VOBU_SRI | VOBunit search Information |
| SYNCI | Synchronus Playback Information |

F I G. 59

DSI_GI

| | Content |
|---|---|
| NV_PCK_SCR | SCR of NV Pack |
| NV_PCK_LBN | LBN of NV Pack |
| VOBU_EA | VOBU End Address |
| VOBU_IP_EA | First I-picture End Address |
| VOBU_VOB_IDN | VOBU ID Number |
| VOBU_C_IDN | Cell ID Number of VOBU |

F I G. 60

SML_AGLI

| | Content |
|---|---|
| SML_AGL_C1_DSTA | Destination Address of Angle Cell Number 1 |
| SML_AGL_C2_DSTA | Destination Address of Angle Cell Number 2 |
| SML_AGL_C3_DSTA | Destination Address of Angle Cell Number 3 |
| SML_AGL_C4_DSTA | Destination Address of Angle Cell Number 4 |
| SML_AGL_C5_DSTA | Destination Address of Angle Cell Number 5 |
| SML_AGL_C6_DSTA | Destination Address of Angle Cell Number 6 |
| SML_AGL_C7_DSTA | Destination Address of Angle Cell Number 7 |
| SML_AGL_C8_DSTA | Destination Address of Angle Cell Number 8 |
| SML_AGL_C9_DSTA | Destination Address of Angle Cell Number 9 |

F I G. 61

SYNCI

| | Content |
|---|---|
| A_SYNCA 0 to 7 | Target Audio Pack Address |
| SP_SYNCA 0 to 31 | VOBU Start Address of Target SP pack |

F I G. 66

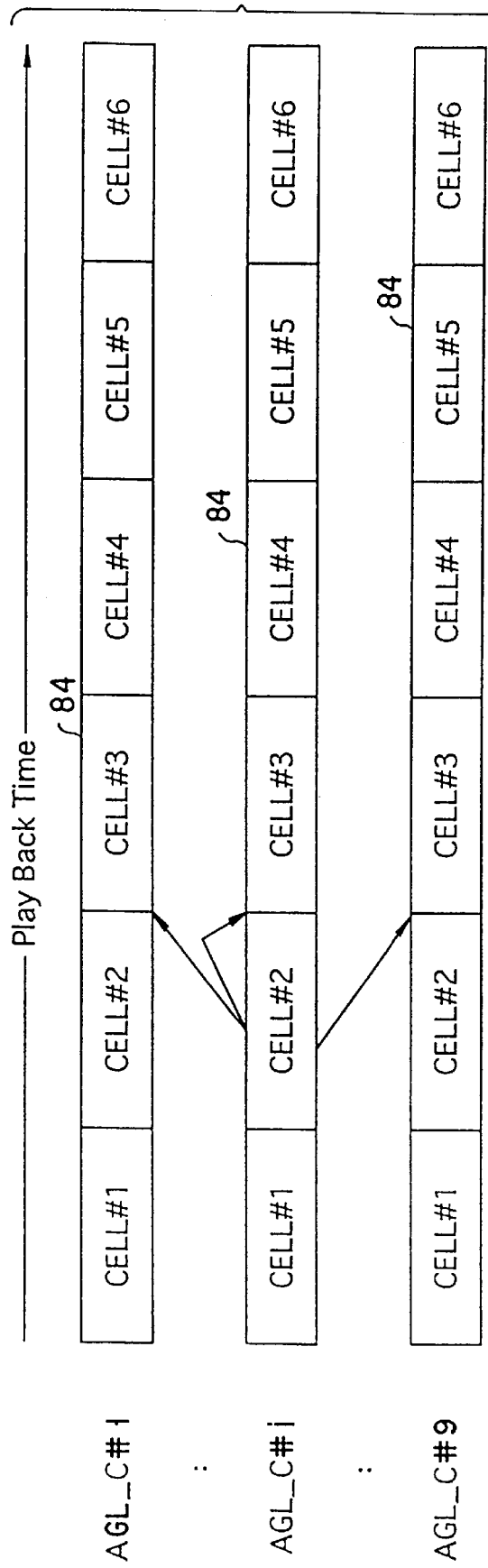
F I G. 62

| VOBU_SRI | Content |
|---|---|
| FWDA240 | +240 VOBU Start Address |
| FWDA120 | +120 VOBU Start Address |
| FWDA60 | +60 VOBU Start Address |
| FWDA20 | +20 VOBU Start Address |
| FWDA15 | +15 VOBU Start Address |
| FWDA14 | +14 VOBU Start Address |
| FWDA13 | +13 VOBU Start Address |
| FWDA12 | +12 VOBU Start Address |
| FWDA11 | +11 VOBU Start Address |
| FWDA10 | +10 VOBU Start Address |
| FWDA9 | +9 VOBU Start Address |
| FWDA8 | +8 VOBU Start Address |
| FWDA7 | +7 VOBU Start Address |
| FWDA6 | +6 VOBU Start Address |
| FWDA5 | +5 VOBU Start Address |
| FWDA4 | +4 VOBU Start Address |
| FWDA3 | +3 VOBU Start Address |
| FWDA2 | +2 VOBU Start Address |
| FWDA1 | +1 VOBU Start Address |
| BWDA1 | -1 VOBU Start Address |
| BWDA2 | -2 VOBU Start Address |
| BWDA3 | -3 VOBU Start Address |
| BWDA4 | -4 VOBU Start Address |
| BWDA5 | -5 VOBU Start Address |
| BWDA6 | -6 VOBU Start Address |
| BWDA7 | -7 VOBU Start Address |
| BWDA8 | -8 VOBU Start Address |
| BWDA9 | -9 VOBU Start Address |
| BWDA10 | -10 VOBU Start Address |
| BWDA11 | -11 VOBU Start Address |
| BWDA12 | -12 VOBU Start Address |
| BWDA13 | -13 VOBU Start Address |
| BWDA14 | -14 VOBU Start Address |
| BWDA15 | -15 VOBU Start Address |
| BWDA16 | -16 VOBU Start Address |
| BWDA20 | -20 VOBU Start Address |
| BWDA60 | -60 VOBU Start Address |
| BWDA120 | -120 VOBU Start Address |
| BWDA240 | -240 VOBU Start Address |

F I G. 63

FORWARD ADDRESS (FWDANn)

| b31 | b30 | b29 | b28 | b27 | b26 | b25 | b24 |
|---|---|---|---|---|---|---|---|
| V_FWD _Exist 1 | V_FWD _Exist 1 | \multicolumn{6}{l|}{A_FWDn[29...24]} |

| b23 | b24 | b25 | b26 | b27 | b28 | b29 | b30 |
|---|---|---|---|---|---|---|---|
| \multicolumn{8}{l|}{A-FWDn[23...16]} |

| b15 | b14 | b13 | b12 | b11 | b10 | b9 | b8 |
|---|---|---|---|---|---|---|---|
| \multicolumn{8}{l|}{A-FWDn[15...8]} |

| b7 | b6 | b5 | b4 | b3 | b2 | b1 | b0 |
|---|---|---|---|---|---|---|---|
| \multicolumn{8}{l|}{A-FWDn[7...0]} |

F I G. 64

BACKWARD ADDRESS (BWDANn)

| b31 | b30 | b29 | b28 | b27 | b26 | b25 | b24 |
|---|---|---|---|---|---|---|---|
| V_BWD _Exist 1 | V_BWD _Exist 1 | \multicolumn{6}{l|}{A_BWDn[29...24]} |

| b23 | b24 | b25 | b26 | b27 | b28 | b29 | b30 |
|---|---|---|---|---|---|---|---|
| \multicolumn{8}{l|}{A-BWDn[23...16]} |

| b15 | b14 | b13 | b12 | b11 | b10 | b9 | b8 |
|---|---|---|---|---|---|---|---|
| \multicolumn{8}{l|}{A-BWDn[15...8]} |

| b7 | b6 | b5 | b4 | b3 | b2 | b1 | b0 |
|---|---|---|---|---|---|---|---|
| \multicolumn{8}{l|}{A-BWDn[7...0]} |

F I G. 65

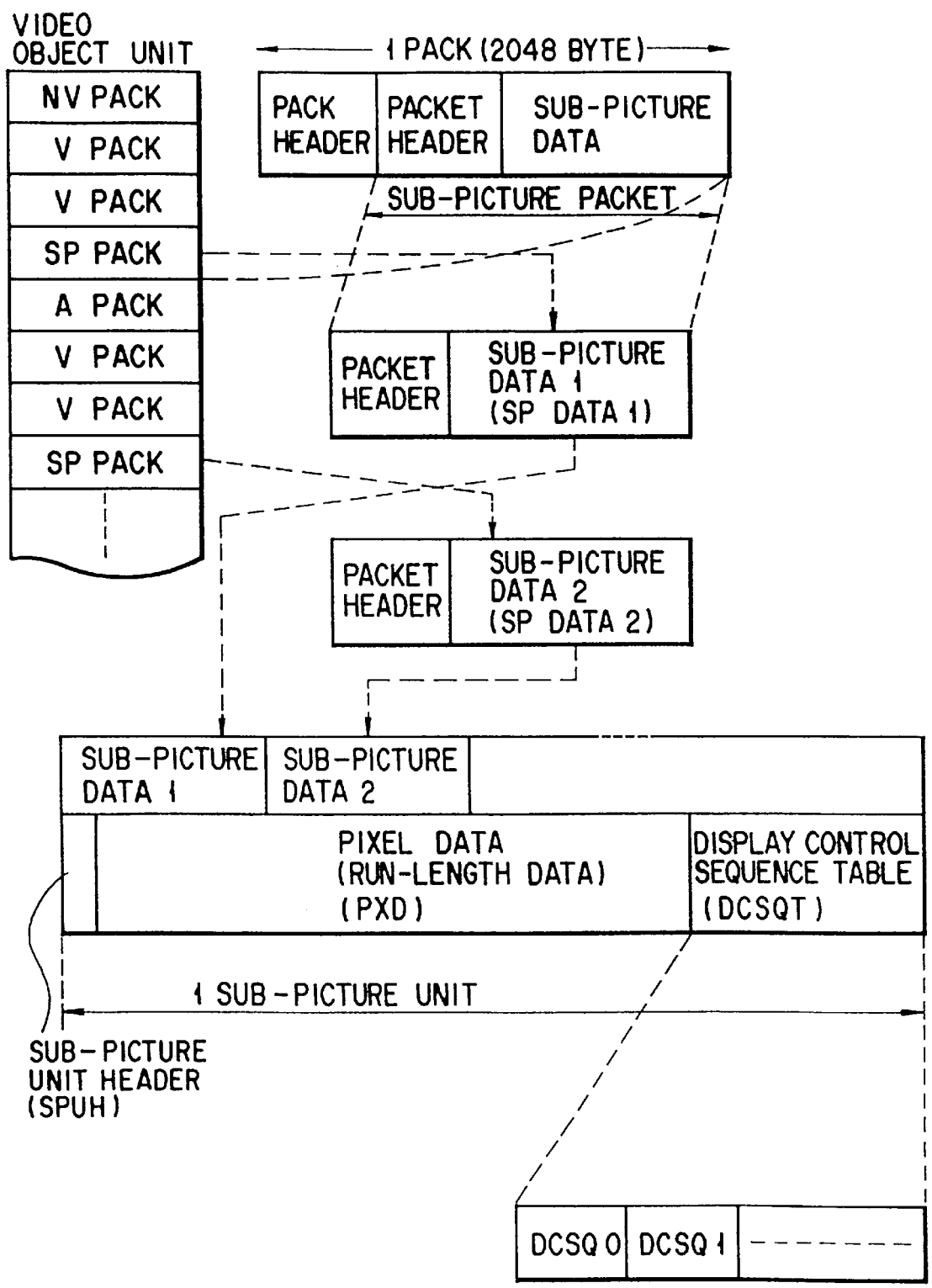
F I G. 67

SPUH

| | Contents |
|---|---|
| SPDSZ | Size of sub-picture unit |
| SPDCQTA | Start Address of Display Control Sequence Table |

F I G. 68

DCSQT

| | Contents |
|---|---|
| DCSQ0 | Display Control sequence 0 |
| DCSQ1 | Display Control sequence 1 |
| ⋮ | ⋮ |
| ⋮ | ⋮ |
| DCSQn | Display Control sequence n |

F I G. 69

DCSQ

| | Contents |
|---|---|
| SPNDCSQA | Address following Display Control Sequence |
| SPDCCMD1 | Display Control Command 1 |
| ⋮ | ⋮ |

F I G. 70

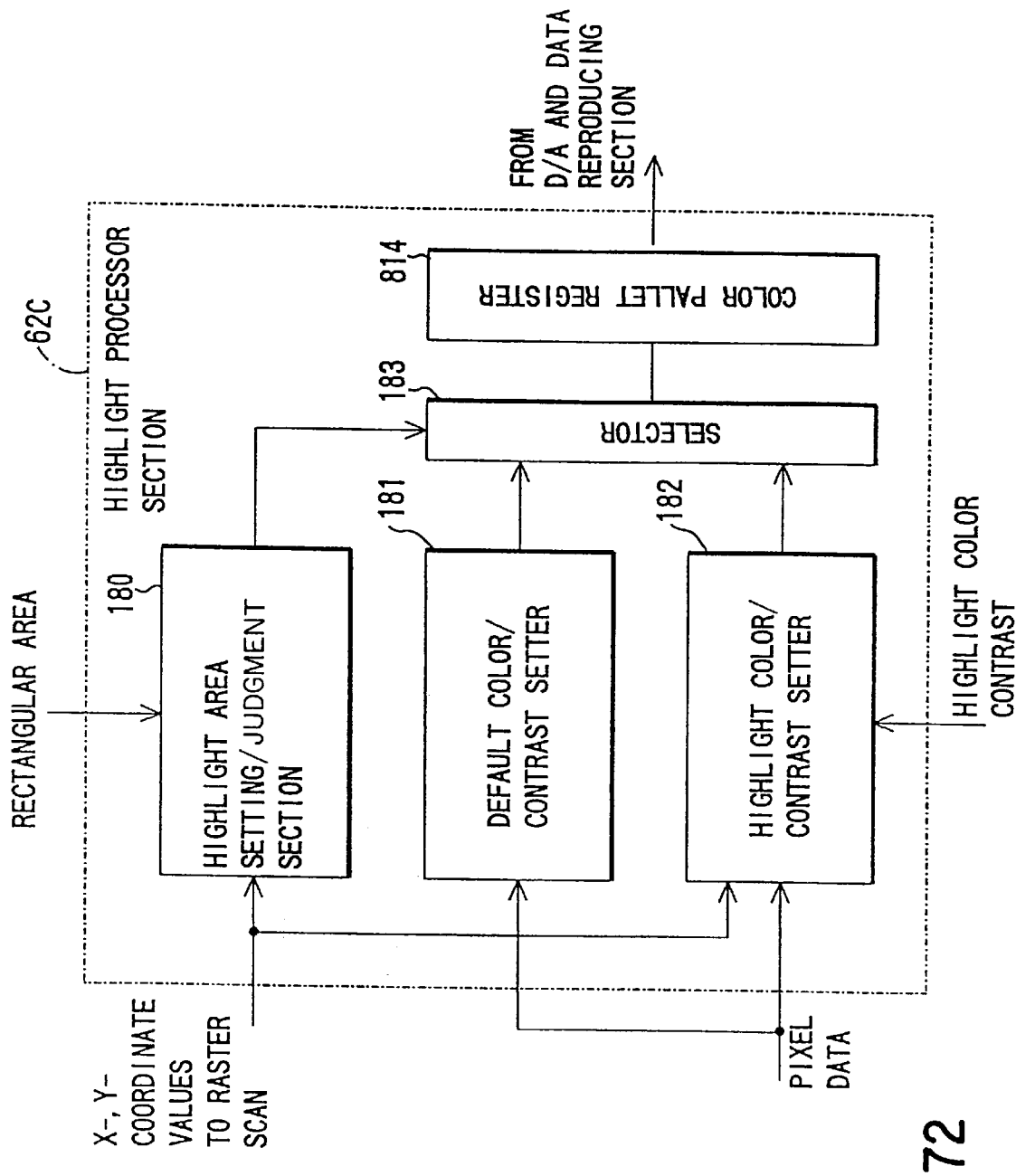
F I G. 72

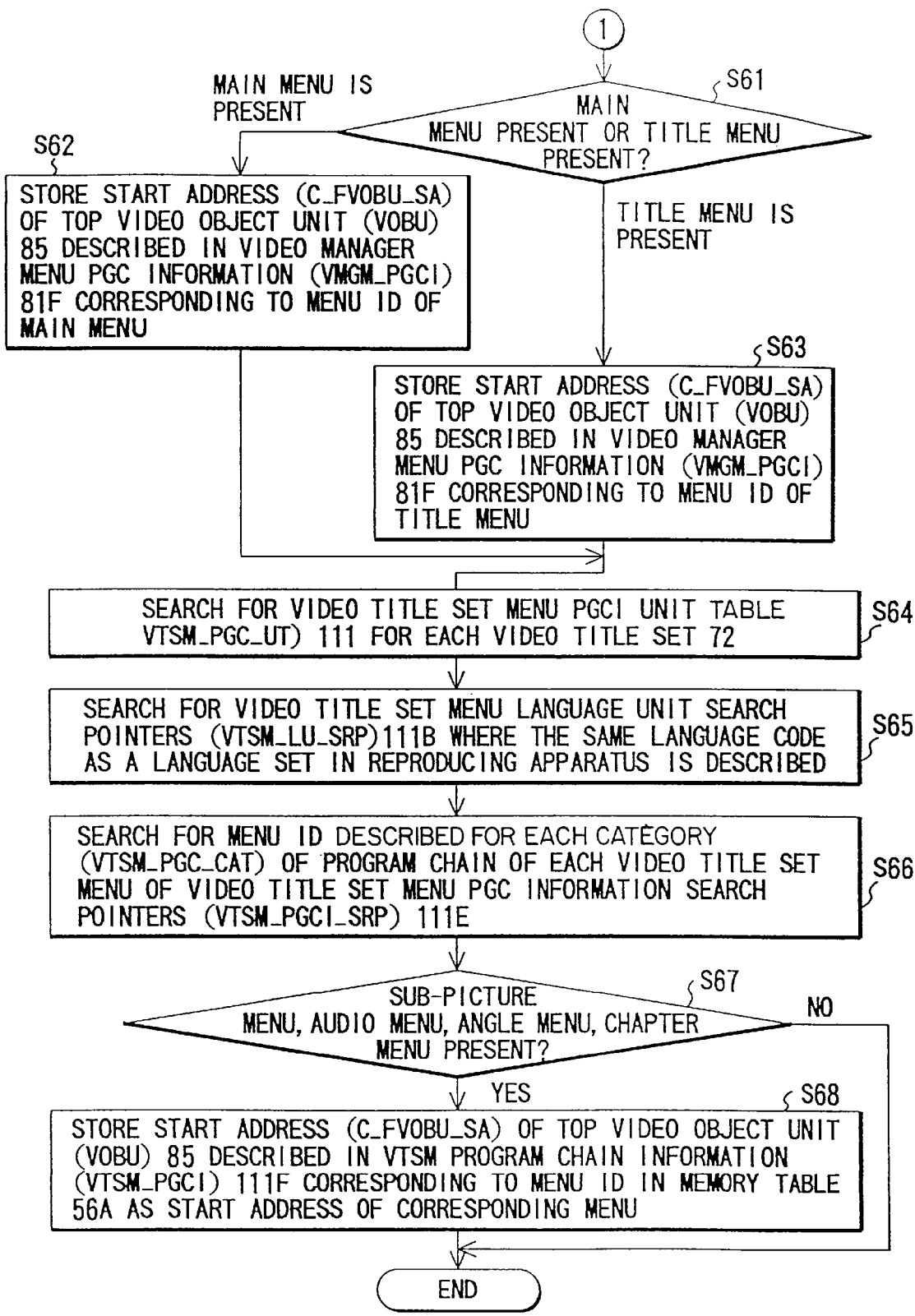
F I G. 74

| TYPE | START ADDRESS OF TOP VIDEO OBJECT UNIT |
|---|---|
| MAIN MENU | C_FVOBU_SA OF VOBU DESCRIBED IN VMGM_PGCI |
| TITLE MENU | C_FVOBU_SA OF VOBU DESCRIBED IN VMGM_PGCI |
| AUDIO MENU OF TITLE 1 | C_FVOBU_SA OF VOBU DESCRIBED IN VMGM_PGCI |
| AUDIO MENU OF TITLE 2 | C_FVOBU_SA OF VOBU DESCRIBED IN VMGM_PGCI |
| ⋮ | ⋮ |
| AUDIO MENU OF TITLE 1 | C_FVOBU_SA OF VOBU DESCRIBED IN VMGM_PGCI |
| AUDIO MENU OF TITLE 2 | C_FVOBU_SA OF VOBU DESCRIBED IN VMGM_PGCI |
| ⋮ | ⋮ |
| SUB-PICTURE MENU OF TITLE 1 | C_FVOBU_SA OF VOBU DESCRIBED IN VMGM_PGCI |
| SUB-PICTURE MENU OF TITLE 2 | C_FVOBU_SA OF VOBU DESCRIBED IN VMGM_PGCI |
| ⋮ | ⋮ |
| ANGLE MENU OF TITLE 1 | C_FVOBU_SA OF VOBU DESCRIBED IN VMGM_PGCI |
| ANGLE MENU OF TITLE 2 | C_FVOBU_SA OF VOBU DESCRIBED IN VMGM_PGCI |
| ⋮ | ⋮ |

FIG. 75

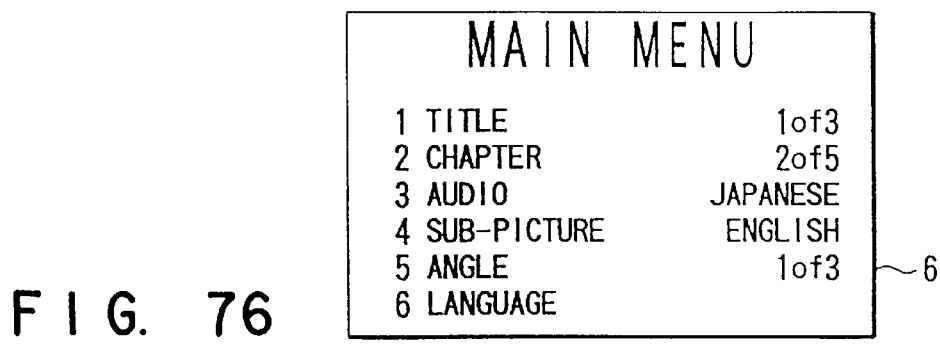

FIG. 76

| Title information | Chapter information |
|---|---|
| 1) from New York  2) from Paris | 1) Metropolitan  2) Manhattan  3) 5th street |
| FIG. 77A | FIG. 77B |

| Audio information | Subtitle information |
|---|---|
| 1) English  2) French  3) Japanese | 1) English  2) French |
| FIG. 77C | FIG. 77D |

Angle information
1) Left
2) Right
3) Center

FIG. 77E

Mixing picture

Sub-picture

Highlight information

Video

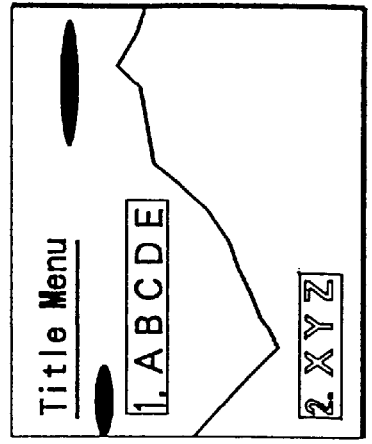
FIG. 80B SUB-PICTURE
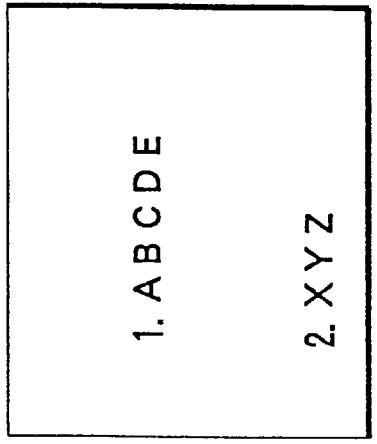
FIG. 80A VIDEO
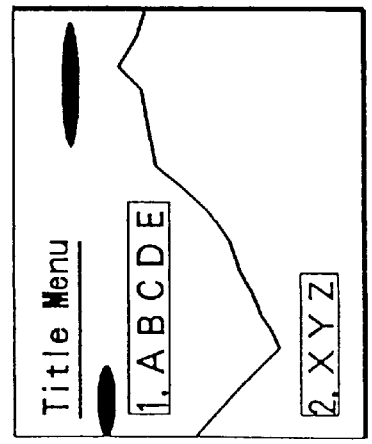
FIG. 80E
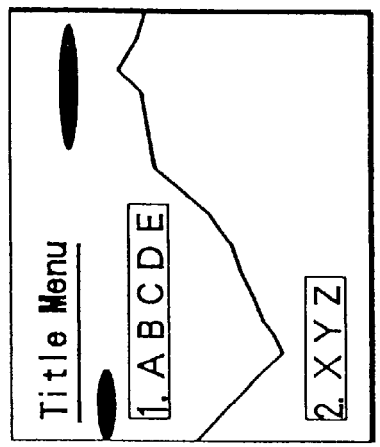
FIG. 80D
FIG. 80C

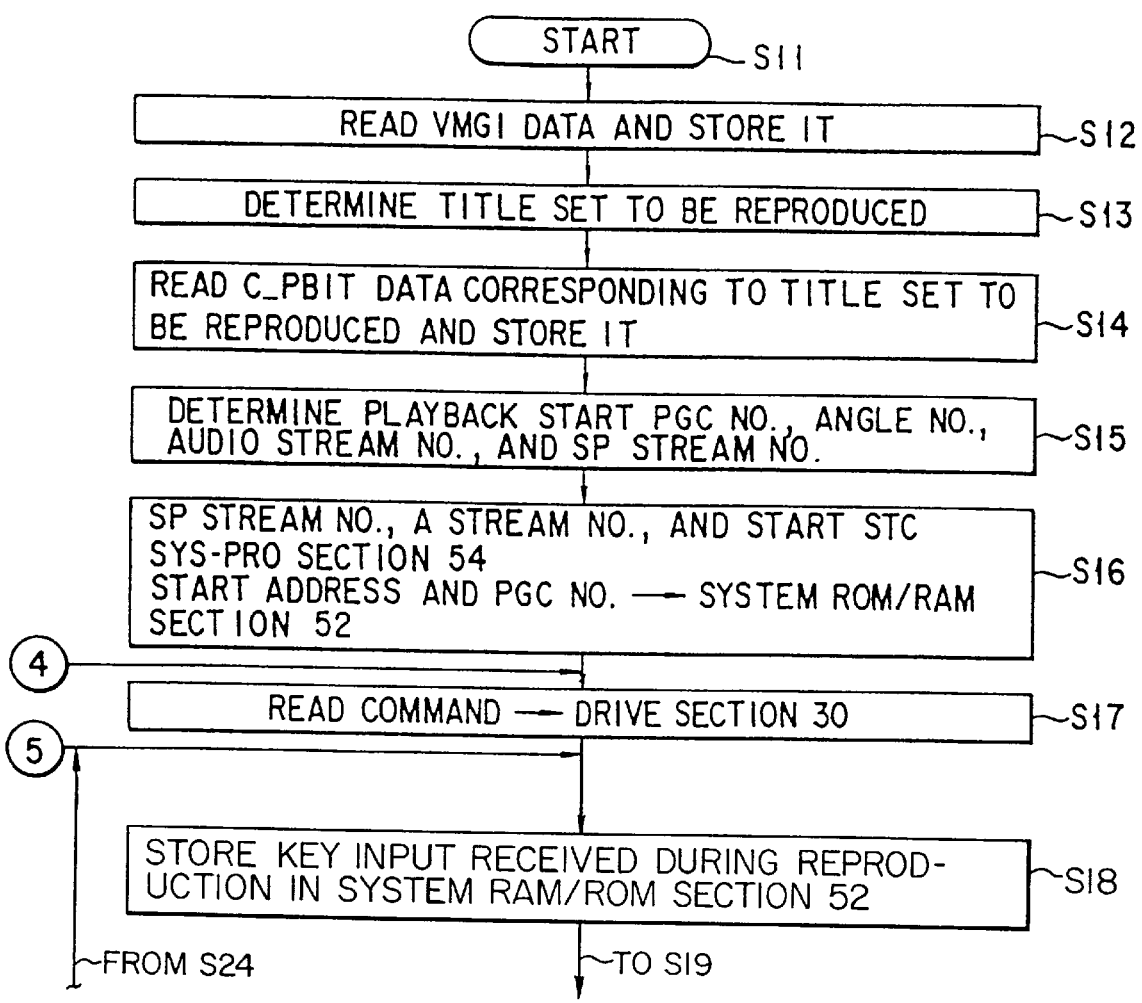
F I G. 82

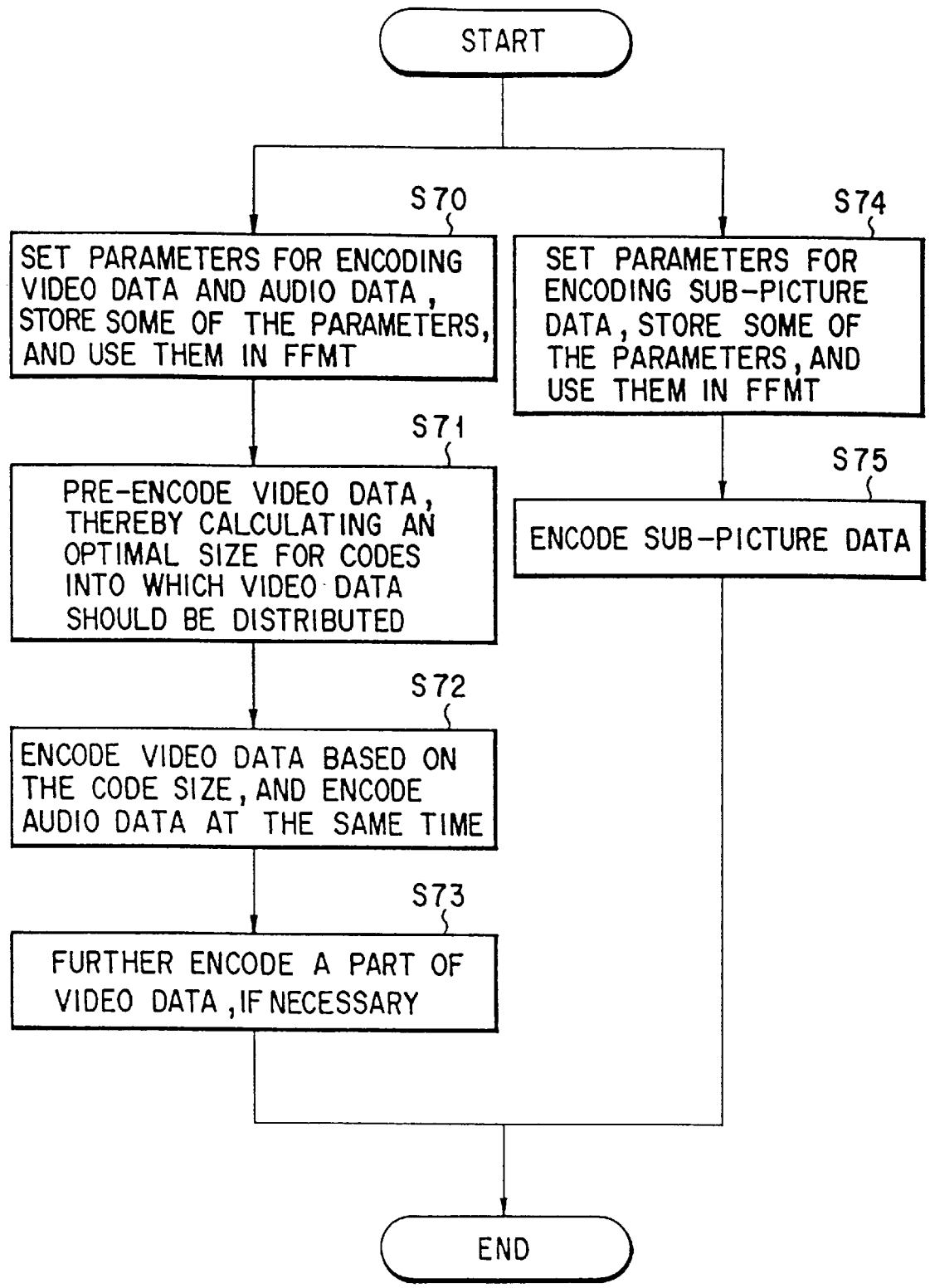
F I G. 87

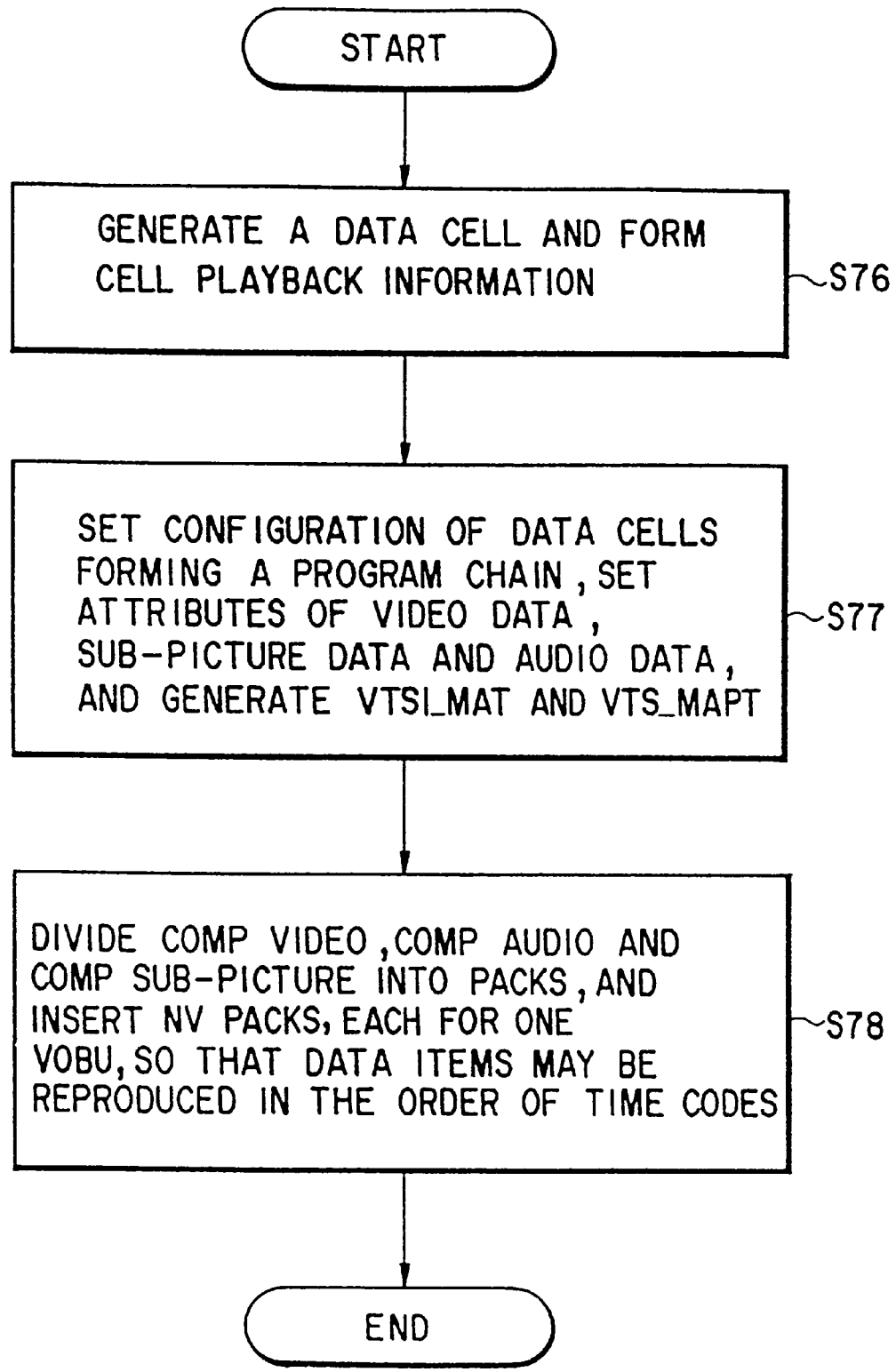
F I G. 88

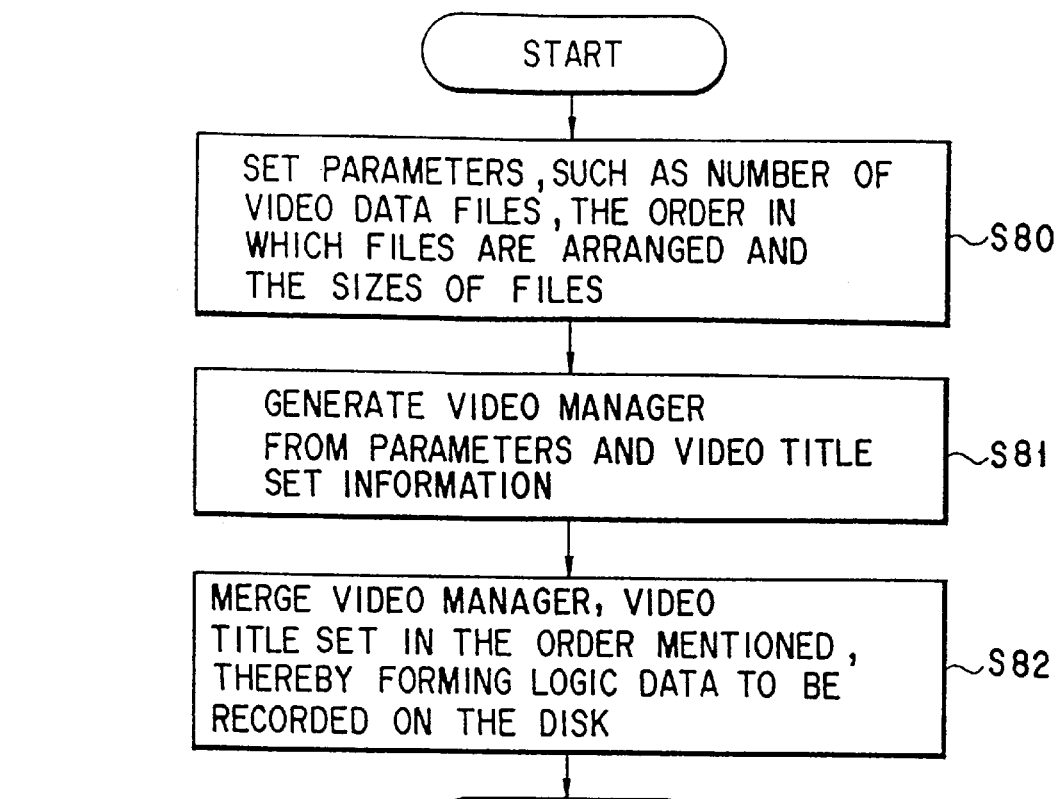
F I G. 90
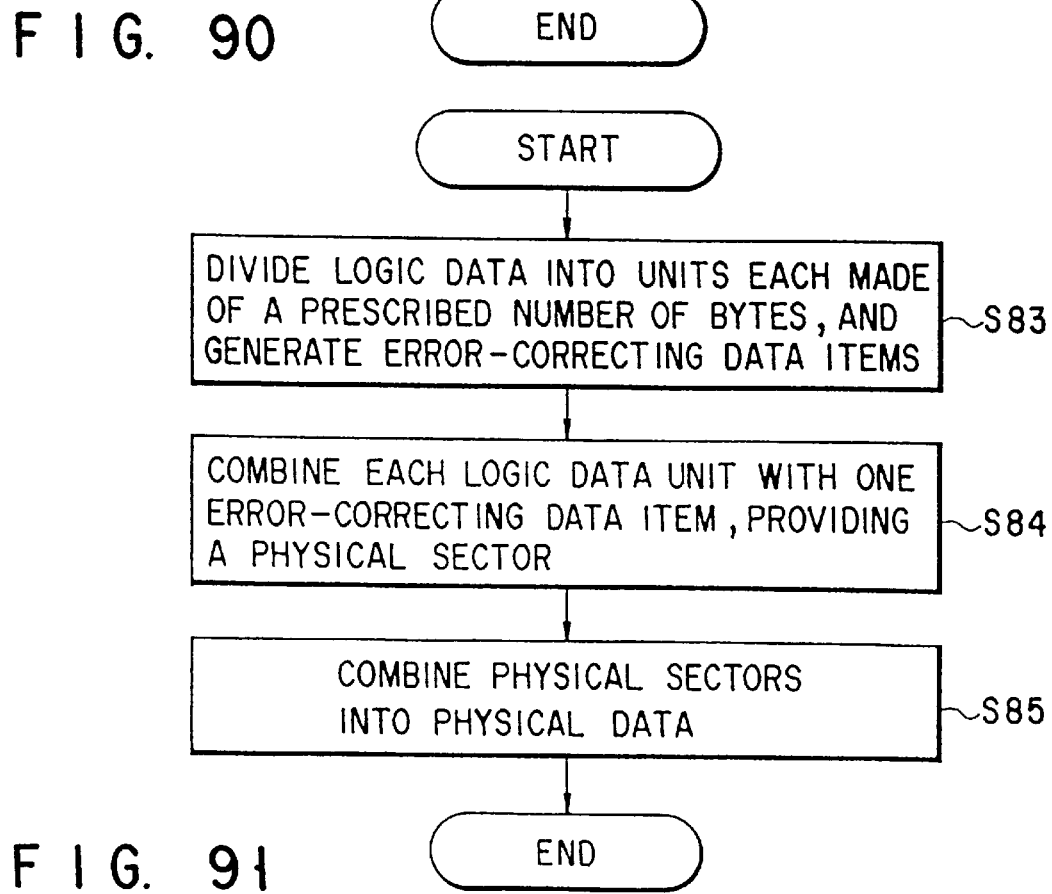
F I G. 91

RECORDING MEDIUM, APPARATUS AND METHOD FOR RECORDING DATA ON THE RECORDING MEDIUM, APPARATUS AND METHOD FOR REPRODUCING DATA FROM THE RECORDING MEDIUM

This is a division of application Ser. No. 08/635,245, filed Apr. 12, 1996.

BACKGROUND OF THE INVENTION

1. Field of the Invention

This invention relates to a recording medium such as an optical disk for recording data corresponding to different objects and to different types of compressed dynamic images and, voice data, an apparatus for recording the data on the recording medium, a method of recording the data on the recording medium, an apparatus for reproducing the data from the recording medium and a method of reproducing the data from the recording medium.

2. Description of the Related Art

Conventionally, when a menu is provided in video image data, a selection item is superimposed on a displayed image using a character generator of how a reproducing apparatus irrespective of the image or image data including the selection item is prepared.

When the number of character codes corresponding to a selection item (or an action item) is contained in the video data, the reproducing apparatus can determine and display a position using the character generator. The display color of the character generator corresponding to the selection item represented by selected number can be altered when a user's selection is made. Hence, selected result can be recognized by the user. However, according to the video data, the conventional system has disadvantages in that the content and the language for displaying the selection item are not known, and the preparation of the character generator corresponding to the reproducing apparatus is actually impossible.

When menu data is formed as the video image, the only burden on the reproducing apparatus is to recognize the selection item corresponding to the user's selected result. It is therefore necessary to call and display new image data corresponding to the selection number. Hence, it takes extended time to display the new image for the recognition and user's erroneous operation will result.

Specifically, when the image data including the selection result is prepared, it is necessary to prepare the following three video data:

(a) video data of the state that any of the selection items "1. ABCDC" and "2. XYZ" is selected.

(b) video data of the state that selection item "2. XYZ" is selected, and (c) video data of the state that selection item "2. XYZ" is selected. The reproducing apparatus selects necessary image data for reproduction in response to the user's selected result, and hence a menu screen reflecting the user's selected result.

However, when a new reproducing process is executed, it takes several seconds until the menu screen reflecting the user's selections results. Therefore, it is disadvantageous in that the user is not able to select for a queue time, causing an increase in the possibility of executing erroneously.

When the selection item of the menu is displayed as the image data for forming the menu on the reproducing apparatus, only the video data having no corresponding selection item may be prepared, the selection item to be used for forming the menu is simultaneously recorded on the corresponding character code. Hence, the selection item selected in response to the menu is determined at the reproducing apparatus side.

However, the size, the shape and the language of the character to be represented as the selection item are all determined according to the capacity of the reproducing apparatus. Thus, a tile manufacturer side for forming the menu can form only menu screen having a limit, and it has a disadvantage that the load is increased in the reproducing apparatus.

SUMMARY OF THE INVENTION

The object of present invention is to provide a reproducing apparatus, which can respond responsively to the users selected result with small real time burden on the apparatus by utilizing video data having video data and sub-picture data.

Another object of the present invention is to provide a reproducing apparatus in which various menus can be easily formed by altering highlight information corresponding to the selection item (or action item) of a sub-picture image, namely the color and the contrast of the character according to the video data as the background image of the menu and the sub-picture data of the selection item (or action item) of the menu.

To accomplish the foregoing objects according to the present invention, there is provided a recording medium comprising: a management area formed on a partial area and a data area formed on the other area; the data area recording at least one video data and at least one sub-picture data capable of being reproduced in the same time zone as the video data; at least one menu information corresponding to various contents of the video data to be used for confirming or selecting recorded by the video data and the sub-picture data; the video data constituting the menu information being a background image and the sub-picture data being an selection item or an action item; control data of the selection item or the action item composed of the sub-picture data being recorded on the data area corresponding to the video data.

Further, according to another preferred aspect, there is provided a recording apparatus for recording at least one video data and at least one sub-picture data capable of being reproduced in the same time zone as the video data on the data area of a recording medium having a management area on a partial area and a data area on the other area comprising: first supply means for supplying as the video data a background image of at least one menu information corresponding to various contents of the video data used in the case of confirming or selecting the content of the video data; second supply means for supplying sub-picture data as the selection item or the action item of the menu information capable of being reproduced in the same time zone as the video data; first encoding means for encoding the video data supplied from the first supply means; second encoding means for encoding the sub-picture data supplied from the second supply means; designating means for designating the control content of the selection item or the action item of the menu information; generating means for generating the control data of the selection item or the action item designation by the designating means; and recording means for recording the video data encoded by the first encoding means, the sub-picture data encoded by the second encoding means and the control data generated by the generating means on the data area of the recording medium.

According to still another preferred aspect, there is provided a recording apparatus for recording at least one video data, at least one sub-picture data capable of being reproduced in the same time zone as the video data and at least on audio data capable of being reproduced in the same time zone as the video data on a data area of a recording medium having a management area on a partial area and the data area on the other area comprising: first supply means for supplying as the video data a background image of at least one menu information corresponding to various contents of the video data used in the case of confirming or selecting the content of the video data; second supply means for supplying sub-picture data as the selection item or the action item of the menu information capable of being reproduced in the same time zone as the video data; third supply means for supplying audio data corresponding to the video data capable of being reproduced in the same time zone as the video data; first encoding means for encoding the video data supplied from the first supply means; second encoding means for encoding the sub-picture data supplied from the second supply means; third encoding means for encoding audio data supplied by the third supply means; designating means for designating the control content of the selection item or the action item of the menu information; generating means for generating a control data of the selection item or the action item designated by the designating means; and recording means for recording the video data encoded by the first encoding means, the sub-picture data encoded by the second encoding means, audio data encoded by the third encoding means and the control data generated by the generating means on the data area of the recording medium.

According to still another preferred aspect, there is provided a reproducing apparatus for reproducing video data and sub-picture data from a recording medium formed with a management area on the partial area and a data area on the other area, recorded on the data area with at least one video data and at least sub-picture image and control data capable of being reproduced in the same time zone as the video data, recorded with background image of at least one menu information corresponding to various content of the video data to be used in the case of confirming or selecting the content of the video data on the video data, recorded with selection item or action item of the menu information as sub-picture data and recorded with the control information of the selection item or the action item of the menu information as control data comprising: reading means for reading the video data, the sub-picture data and the control data of the data area of the recording medium; and converting means for converting the video data read by the reading means and converting the sub-picture data read by the reading means based on the control data read by the reading means.

According to still another preferred aspect, there is provided a reproducing apparatus for reproducing video data and sub-picture data from a recording medium formed with a management area on the partial area and a data area on the other area, recorded on the data area with at least one video data and at least sub-picture image at least one audio data and at least one control data capable of being reproduced in the same time zone as the video data, recorded with background image of at least one menu information corresponding to various content of the video data to be used in the case of confirming or selecting the content of the video data on the video data, recorded with selection item or action item of the menu information as sub-picture data and audio data and recorded with the control information of the selection item or the action item of the menu information as control data comprising: reading means for reading the video data, the sub-picture data, audio data and the control data of the data area of the recording medium; and converting means for converting the video data read by the reading means and audio data as reproduced output and converting the sub-picture data read by the reading means based on the control data read by the reading means.

According to still another preferred aspect, there is provided a communicating system for reading video data and sub-picture data from a recording medium formed with a management area on the partial area and a data area on the other area, recorded on the data area with at least one video data and at least sub-picture data and control data capable of being reproduced in the same time zone as the video data, recorded with background image of at least one menu information corresponding to various content of the video data to be used in the case of confirming or selecting the content of the video data on the video data, recorded with selection item or action item of the menu information as sub-picture data and recorded with the control information of the selection item or the action item of the menu information as control data and externally communicating the same comprising: reading means for reading the video data, the sub-picture data and the control data of the data area of the recording medium; communicating means for communicating the video data, the sub-picture data and the control data read by the reading means to the exterior; and converting means for converting the video data communicated by the communicating means into reproduced output and converting the sub-picture data communicated by the communicating means based on the control data read communicated by the communicating means into the reproduced output.

According to still another preferred aspect, there is also provided a communicating system for reading video data and sub-picture data from a recording medium formed with a management area on the partial area and a data area on the other area, recorded on the data area with at least one video data and at least sub-picture data at least one audio data and at least one control data capable of being reproduced in the same time zone as the video data, recorded with background image of at least one menu information corresponding to various content of the video data to be used in the case of confirming or selecting the content of the video data on the video data, recorded with selection item or action item of the menu information as sub-picture data and audio data and recorded with the control information of the selection item or the action item of the menu information as control data and communicating the same to the exterior comprising: reading means for reading the video data, the sub-picture data, audio data and the control data of the data area of the recording medium; communicating means for communicating the video data, the sub-picture data, audio data and the control data read by the reading means; and converting means for converting the video data communicated by the communicating means and audio data into reproduced output and converting the video data read and audio data communicated by the communicating means into reproduced output and converting the sub-picture data read based on the control data communicated by the communicating means.

Additional objects and advantages of the invention will be set forth in the description, which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 1 is a schematic block diagram of an optical disk apparatus according to an embodiment of the present invention;

FIG. 4 is a schematic diagram of a key/display section in FIG. 1;

FIG. 5 is a schematic diagram of a remote controller in FIG. 1;

FIG. 6 shows the structure of the logic format of the optical disk of FIG. 5;

FIG. 7 shows the structure of the video manager of FIG. 6;

FIG. 10 shows the parameters and contents of the video manager information management table information (VMGI_MAT) in the video manager (VMGI) of FIG. 7;

FIG. 21 shows the parameters and contents of the video title set information management table (VTSI_MAT) of the video title set information (VTSI) of FIG. 20;

FIG. 23 illustrates the contents of the sub-picture stream attribute (VTS_SPST_ATR) of the video title set (VTS) in FIG. 6;

FIG. 24 illustrates the structure of the video title set program chain information table (VTS_PGCIT) of the video title set (VTS) of FIG. 20;

FIG. 25 shows the parameters and contents of the information (VTS_PGCITI) in the video title set program chain information table (VTS_PGCIT) of FIG. 24;

FIG. 26 shows the parameters and contents of the search pointer (VTS_PGCIT_SRP) corresponding to the program chain in the video title set program chain information table (VTS_PGCIT) of FIG. 24;

FIG. 27 illustrates the structure of the program chain information (VTS_PGCI) in the video set corresponding to the program chain in the video title set program chain information table (VTS_PGCIT) of FIG. 24;

FIG. 28 shows the parameters and contents of the program chain general information (PGC_GI) in the program chain information (VTS_PGCI) of FIG. 27;

FIG. 29 shows the structure of a category (PGC_CAT) of a program chain (PGC) of general information (PGC_GI) of the program chain in FIG. 28;

FIG. 30 shows the structure of the contents (PGC_CNT) of the general information (PGC_GI) of the program chain in FIG. 28;

FIG. 31 illustrates the structure of a program chain map (PGC_PGMAP) of the program chain information (VTS_PGCI) of FIG. 27;

FIG. 32 shows the parameters and contents of the entry cell numbers (ECELLN) corresponding to the programs written in the program chain map (PGC_PGMAP) of FIG. 31;

FIG. 33 illustrates the structure of the cell playback information table (C_PBIT) of the program chain information (VTS_PGCI) of FIG. 27;

FIG. 34 shows the parameters and contents of the cell playback information (C_PBI) of FIG. 33;

FIG. 35 illustrates the structure of the cell position information (C_POSI) in the program chain information (VTS_PGCI) of FIG. 28;

FIG. 36 shows the parameters and contents of the cell position information (C_POSI) of FIG. 35;

FIG. 43 illustrates the structure of the navigation pack of FIG. 8;

FIG. 44 illustrates the structure of the video pack, audio pack, sub-picture pack, or VBI pack of FIG. 8;

FIG. 45 shows the parameters and contents of the playback control information (PCI) in the navigation pack of FIG. 43;

FIG. 46 shows the parameters and contents of the general information (PCI_GI) in the playback control information (PCI) of FIG. 45;

FIG. 47 shows the parameters and contents of the angle information (NSML_AGLI) in the playback control information (PCI) of FIG. 45;

FIG. 48 is a diagram to help explain how to change the angle using the angle information (NSML_AGLI) in the playback control information (PCI) of FIG. 47;

FIG. 50 is a view for explaining a video image, a sub-picture, highlight information and mixing image formed from them;

FIG. 51 illustrates parameter and content of the highlight information (HLI) in reproduction control information (PCI) shown in FIG. 45;

FIG. 53 illustrates parameter and content of highlight general information (HL_GI) in highlight information (HLI) shown in FIG. 51;

FIG. 58 is a view showing the detail of description content of button position information (BTN_POSI) in button information (BTNI) shown in FIG. 57;

FIG. 59 shows the parameters and contents of the data search information (DSI) in the navigation pack of FIG. 43;

FIG. 60 shows the parameters and contents of the DSI general information (DSI_GI) in the data search information of FIG. 59;

FIG. 61 shows the parameters and contents of the angle information (SML_AGLI) in the data search information of FIG. 59;

FIG. 62 is a diagram to help explain how to change the angle using the angle information (SML_AGLI) in the data search information (DSI) of FIG. 61;

FIG. 63 shows the parameters and contents of the search information (VOBU_SRI) for the video object unit (VOBU) of FIG. 59;

FIG. 64 illustrates bit maps describing the forward addresses (FWDA) of the search information (VOBU_SRI) on the video object unit (VOBU) of FIG. 59;

FIG. 65 illustrates bit maps describing the backward addresses (BWDA) of the search information (VOBU_SRI) on the video object unit (VOBU) of FIG. 59;

FIG. 66 shows the parameters and contents of the synchronizing playback information (SYNCI) on the video object unit (VOBU) of FIG. 59;

FIG. 67 illustrates the configuration of sub-picture unit;

FIG. 68 illustrates parameter and content of sub-picture unit header (SPUH) of sub-picture unit shown in FIG. 67;

FIG. 69 illustrates parameter and content of display control sequence table of sub-picture unit shown in FIG. 67;

FIG. 70 illustrates parameter and content of display control sequence (DCSQ) shown in FIG. 69;

FIG. 72 illustrates the configuration of a highlight processor section;

FIGS. 73 and 74 present flowcharts for detecting the total number of titles on an optical disk, the number of chapters (programs) for each title, the number and languages of audio streams for each title, and the number and languages of sub-picture streams for each title;

FIG. 75 is a diagram exemplifying what is stored in a memory table;

FIG. 76 is a diagram showing an example of the reproduced image of a main menu;

FIGS. 77A through 77E show examples of the reproduced images of a title menu, a chapter menu, an audio menu, a sub-picture menu and an angle menu;

FIGS. 79A to 79D and 80A to 80E are views for explaining video, sub-picture, highlight information and a combined image of them;

FIGS. 82, 83 and 84 are flowcharts of the procedure for reproducing the video data in the normal mode from an optical disk having logic formats shown in FIGS. 6 to 66;

FIG. 87 is a flowchart for an encoding process of FIG. 86;

FIG. 88 is a flowchart for combining the video data, audio data, and sub-picture data all encoded according to the flow of FIG. 87 to create a video data file;

FIG. 90 is a flowchart for creating logic data to be recorded on a disk in the disk formatter of FIG. 89;

FIG. 91 is a flowchart for creating from the logic data the physical data to be recorded on a disk.

DETAILED DESCRIPTION OF THE PREFERRED EMBODIMENT

Hereinafter, referring to the accompanying drawings, an optical disk reproducing apparatus according to an embodiment of the present invention will be explained.

Figure 2:
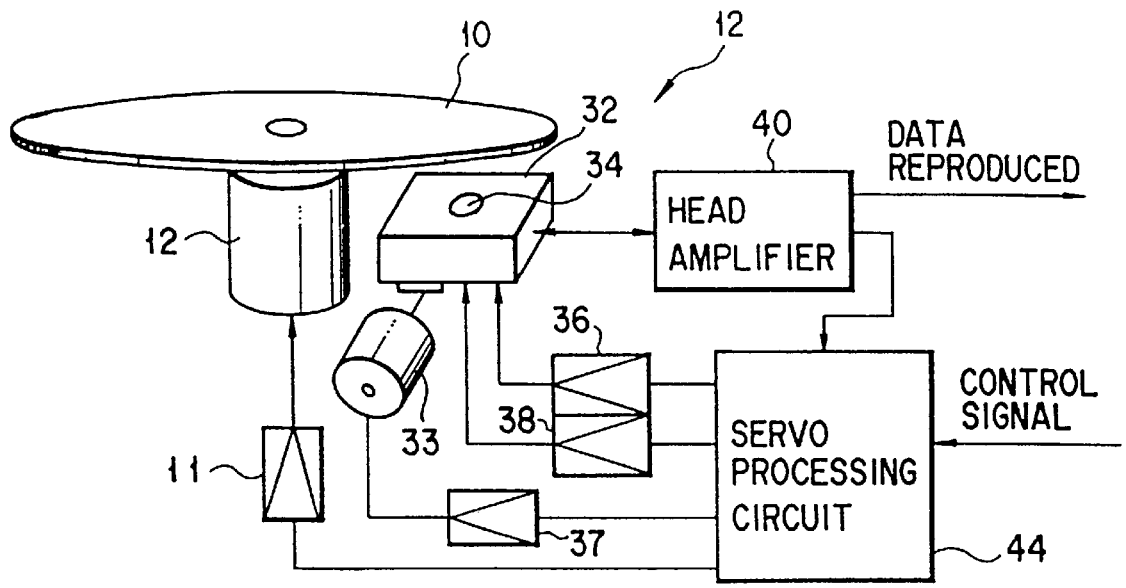
FIG. 2 is a detailed block diagram of the mechanical section of the disk drive unit of FIG. 1.
Figure 3:
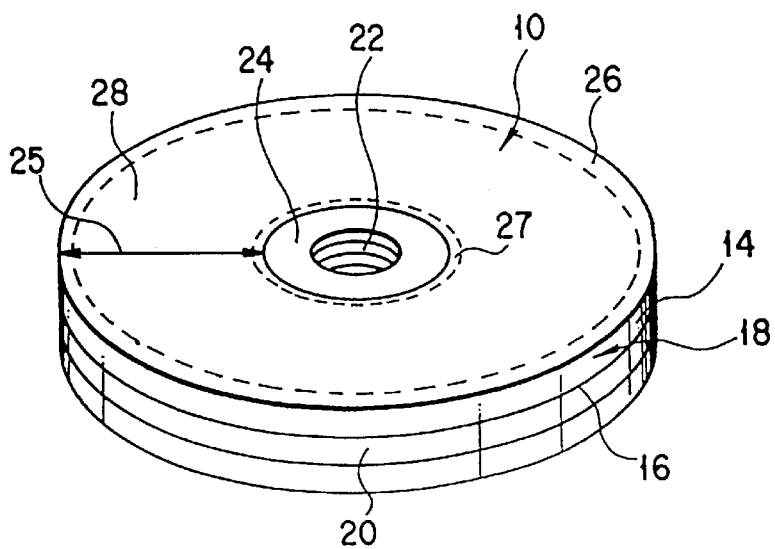
FIG. 3 is a schematic perspective view of the structure of an optical disk loaded in the disk drive unit of FIG. 1.

FIG. 1 is a block diagram of an optical disk reproducing apparatus that reproduces the data from an optical disk associated with an embodiment of the present invention. FIG. 2 is a block diagram of the disk drive section that drives the optical disk shown in FIG. 1. FIG. 3 shows the structure of the optical disk shown in FIGS. 1 and 2.

As shown in FIG. 1, the optical disk reproducing apparatus comprises a key/display section 4, a monitor section 6, and a speaker section 8. When the user operates the key/display section 4, this causes the recorded data to be reproduced from an optical disk 10. The recorded data contains video data (main-picture data), sub-picture data, and audio data, which are converted into video signals and audio signals. The monitor section 6 displays images according to the audio signals and the speaker section 8 generates sound according to the audio signals.

It is known that the optical disk 10 is available with various structures. For instance, one type of the optical disk 10 is a read-only disk on which data is recorded with a high density as shown in FIG. 3. The optical disk 10, as shown in FIG. 3, is made up of a pair of composite layers 18 and an adhesive layer 20 sandwiched between the composite disk layers 18. Each of the composite disk layers 18 is composed of a transparent substrate 14 and a recording layer or a light-reflecting layer 16. The disk layer 18 is arranged so that the light-reflecting layer 16 may be in contact with the surface of the adhesive layer 20. A center hole 22 is made in the optical disk 10. On the periphery of the center hole 22 on both sides, clamping areas 24 are provided which are used to clamp the optical disk 10 during its rotation. When the disk 10 is loaded in the optical disk apparatus, the spindle of a spindle motor 12 shown in FIG. 2 is inserted into the center hole 22. As long as the disk is being rotated, it continues clamped at the clamping areas 24.

As shown in FIG. 3, the optical disk 10 has an information zone 25 around the clamping zone 24 on each side, the information zone allowing information to be recorded on the optical disk 10. In the information zone 25, the outer circumference area is determined to be a lead-out area 26 in which no information is normally recorded, the inner circumference area adjoining the clamping area 24 is determined to be a lead-in area 27 in which no information is normally recorded, and the area between the lead-out area 26 and the lead-in area 27 is determined to be a data recording area 28.

At the recording layer 16 in the information area 25, a continuous spiral track is normally formed as an area in which data is to be recorded. The continuous track is divided into a plurality of physical sectors, which are assigned serial numbers. On the basis of the sectors, data is recorded. The data recording area 28 in the information recording area 25 is an actual data recording area, in which management data, video data, sub-picture data, and audio data are recorded in the form of pits (that is, in the form of changes in the physical state) as explained later. With the read-only optical disk 10, a train of pits is previously formed in the transparent substrate 14 by a stamper, a reflecting layer is formed by evaporation on the surface of the transparent substrate 14 in which the pit train is formed, and the reflecting layer serves as the recording layer 16. In the read-only optical disk 10, a groove is normally not provided as a track and the pit train in the surface of the transparent substrate 14 serves as a track.

The optical disk apparatus 12, as shown in FIG. 1, further comprises a disk drive section 30, a system CPU section 50, a system ROM/RAM section 52, a system processor section 54, a data RAM section 56, a video decoder section 58, an audio decoder section 60, a sub-picture decoder section 62, and a D/A and data reproducing section 64, and the menu generator 56. The system processor section 54 is provided with a system time clock (STC) 54A and a register 54B. The video decoder section 58, audio decoder section 60, and sub-picture decoder section 62 are also provided with system time clocks (STC) 58A, 60A, 62A, respectively.

As shown in FIG. 2, the disk drive section 30 contains a motor driving circuit 11, a spindle motor 12, an optical head 32 (i.e., an optical pickup), a feed motor 33, a focus circuit 36, a feed motor driving circuit 37, a tracking circuit 38, a head amplifier 40, and a servo processing circuit 44. The optical disk 10 is placed on the spindle motor 12 driven by the motor driving circuit 11 and is rotated by the spindle motor 12. The optical head 32 is located under the optical disk 10; it projects a laser beam on the optical disk 10. The optical head 32 is placed on a guide mechanism (not shown). The feed motor driving circuit 37 is provided to supply a driving signal to the feed motor 33. The motor 33 is driven by the driving signal and moves the optical head 32 in and out across the radius of the optical disk 10. The optical head 32 is provided with an object lens 34 positioned so as to face the optical disk 10. The object lens 34 is moved according to the driving signal supplied from the focus circuit 36 so as to move along its optical axis.

To reproduce the data from the above optical disk, the optical head 32 projects a laser beam on the optical disk 10 via the object lens 34. The object lens 34 is moved little by little across the radius of the optical disk 10 according to the driving signal supplied from the tracking circuit 38. Furthermore, the object lens 34 is moved along its optical axis according to the driving signal supplied from the focusing circuit 36 so that its focal point may be positioned on the recording layer 16 of the optical disk 10. This causes the laser beam to form the smallest beam spot on the spiral track (i.e., the pit train), enabling the beam spot to trace the track. The laser beam is reflected from the recording layer 16 and returned to the optical head 32. The optical head 32 converts the beam reflected from the optical disk 10 into an electric signal, which is supplied from the optical head 32 to the servo processing circuit 44 via the head amplifier 40. From the electric signal, the servo processing circuit 44 produces a focus signal, a tracking signal, and a motor control signal which it supplies these signals to the focus circuit 36, tracking circuit 38, and motor driving circuit 11, respectively.

Therefore, the object lens 34 is moved along its optical axis and across the radius of the optical disk 10; its focal point is positioned on the recording layer 16 of the optical disk 10, the laser beam forming the smallest beam spot on the spiral track. Furthermore, the spindle motor 12 is rotated by the motor driving circuit 11 at a specific rotating speed. This allows the beam to track at, for example, a constant linear speed.

The system CPU section 50 of FIG. 1 supplies a control signal serving as an access signal to the servo processing circuit 44. In response to the control signal, the servo processing circuit 44 supplies a head-moving signal to the feed motor driving circuit 37, which supplies a driving signal to the feed motor 33. Then, the feed motor 33 is driven, causing the optical head 32 to move across the radius of the optical disk 10. Then, the optical head 32 accesses a specific sector formed at the recording layer 16 of the optical disk 10. The data is reproduced from the specific sector by the optical head 32, which then supplies it to the head amplifier 40. The head amplifier 40 amplifies the reproduced data, which is outputted at the disk drive section 30.

The reproduced data is transferred and stored in a data RAM section 56 by the system processor section 54 which is controlled by the system CPU section 50 which is operated in accordance with the programs stored in the system ROM/RAM section 52. The stored reproduced data is processed at the system processor section 54, which sorts the data into video data, audio data, and sub-picture data, which are supplied to the video decoder section 58, audio decoder section 60, and sub-picture decoder section 62, respectively, decoded at the respective decoders. The D/A and data-reproducing section 64 converts the decoded video data, audio data, and sub-picture data into an analog video signal, an analog audio signal, and an analog sub-picture signal, subjects these signal to a mixing process, and supplies the resulting video signal and sub-picture signal to the monitor 6 and the resulting audio signal to the speaker 8. Then, an image is displayed on the monitor section 6 on the basis of the video signal and sub-picture signal, and sound is simultaneously reproduced at the speaker section 8 according to the audio signal.

In the optical disk reproducing apparatus shown in FIG. 1, as a user manipulates the key/display section 4 on the front panel of the main body or the remote controller 5 as a remote terminal connected to the remote control receive section 4A via optical communications using infrared rays, recorded data (i.e., video data, sub-picture data and audio data) is reproduced from the optical disk 10. The reproduced data is converted to an audio signal and video signal in the apparatus. The video signal is reproduced as a video image on the external monitor section 6, and the audio signal is reproduced as from the speaker section 8.

As shown in FIG. 4, the key/display section 4 comprises a power key 4a, microphone input terminals 4b, a playback key 4c, a pause key 4d, a stop key 4e, fast forward and rewind keys 4f, an open/close key 4g for instructing the loading or ejecting of the optical disk 10, indicators 4h, and a load/eject slot 4i for the optical disk 10.

As shown in FIG. 5, the remote controller 5 comprises a power key 5a, numeral keys 5b, a stop key 5c, a playback key 5d, a pause key 5e, a memory key 5f, an open/close key 5g for instructing the loading or ejecting of the optical disk 10, fast forward and rewind keys 5h and 5i, repeat keys 5j for instructing repeating and the repeat range, a menu key 5k for instructing the display of a menu screen, a title key 5k for instructing the display of a title menu screen, and up and down and right and left select keys 5m which are used to select an item on the displayed menu screen.

The detailed operation of the optical disk apparatus of FIG. 1 will be described later with reference to the logic format of the optical disk explained below.

The data recording area 28 between the lead-in area 27 and the lead-out area 26 on the optical disk of FIG. 1 has a volume and file structure as shown in FIG. 6. The structure has been determined in conformity to specific logic format standards, such as Micro UDF or ISO 9660. The data recording area 28 is physically divided into a plurality of sectors as described earlier. These physical sectors are assigned serial numbers. In the following explanation, a logical address means a logical sector number (LSN) as determined in Micro UDF or ISO 9660. Like a physical sector, a logical sector contains 2048 bytes. The numbers (LSN) of logical sectors are assigned consecutively in ascending order as the physical sector number increments.

As shown in FIG. 6, the volume and file structure is a hierarchic structure and contains a volume and file structure area 70, a video manager (VMA) 71, at least one video title set (VTS) #i 72, and another recorded area 73. These areas 70, 71, 72, 73 are aligned with the boundaries between logical sectors. As with a conventional CD, a logical sector is defined as a set of 2048 bytes. Accordingly, one logical sector corresponds to one logical block.

The volume and file structure area 70 corresponds to a management area determined in Micro UDF or ISO 9660. According to the description in the management area, the video manager 71 is stored in the system ROM/RAM section 52. With reference to FIG. 7, the information used to manage video title sets 72 is written in the video manager 71, which is composed of a plurality of files, starting with file #0. In each video title set 72, compressed video data, compressed audio data, compressed sub-picture data, and the reproducing information about these data items are as explained later. Each video title set is composed of a plurality of files 74. The number of video title sets 72 is limited to a maximum of 99. Furthermore, the number of files 74 (from file #j to file #j+9) constituting each video title set 72 is determined to be a maximum of 10. These files 72 are also aligned with the boundaries between logical sectors.

In the other recorded area 73, the information capable of utilizing the aforementioned video title sets 72 is recorded. The other recorded areas 73 are not necessarily provided.

As shown in FIG. 7, the video manager 71 contains at least three items each corresponding to individual files 74. Specifically, the video manager 71 is made up of video manager information (VMGI) 75, a video object set for video manager menu (VMGM_VOBS) 76, and backup of video manager information (VMGI_BUP) 77. Here, the video manager information (VMGI) 75 and the backup of video manager information (VMGI_BUP) 77 are determined to be indispensable items, and the video object set for video manager menu (VMGM_VOBS) 76 is determined to be an selection item. In the video object set 76 for VMGM, the video data, audio data, and sub-picture data about a menu of the volumes of the optical disk managed by the video manager 71 are stored.

By the video object set 76 for VMGM (VMGM_VOBS), the volume name of the optical disk 10, the sound accompanying the volume name representation, and the description of the sub-picture are displayed. At the same time, selectable items are provided in the form of sub-pictures as in video reproduction explained later. For example, the video object set 76 for VMGM (VMGM_VOBS) indicates that the optical disk 10 contains the video data representing the matches a boxer played until he won a world championship. Specifically, a fighting pose of boxer X, together with a volume name, such as the glorious history of boxer X, is reproduced in the form of video data and, at the same time, his theme song is reproduced in sound and his chronological table is provided in a sub-picture. Furthermore, the user is asked which language option to select, English or Japanese, in doing the narration of the matches. At the same time, the user is asked whether a caption in another language should be provided in a sub-picture or which language option should be selected for a caption. Thus, for example, the VMGM video object set 76 (VMGM_VOBS) provides the user with preparations to watch a video of a match of boxer X in English speech with a sub-picture using Japanese captions.

Here, the structure of a video object set (VOBS) 82 will be described with reference to FIG. 8 which shows an example of a video object set (VOBS) 82. The video object set (VOBS) 82 comes in three types for two menus and a title. Specifically, the video object set (VOBS) 82 contains the video title set for video manager menu (VMGM_VOBS) 76, a video object set (VTSM_VOBS) 95 (FIG. 20) for a menu in the video title sets 72, and a video object set (VTSTT_VOBS) 82 for the titles of at least one video title set 72, in a video title set (VTS) 72 as explained later. Each video object set 82 has the same structure except that their uses differ.

Figure 8:
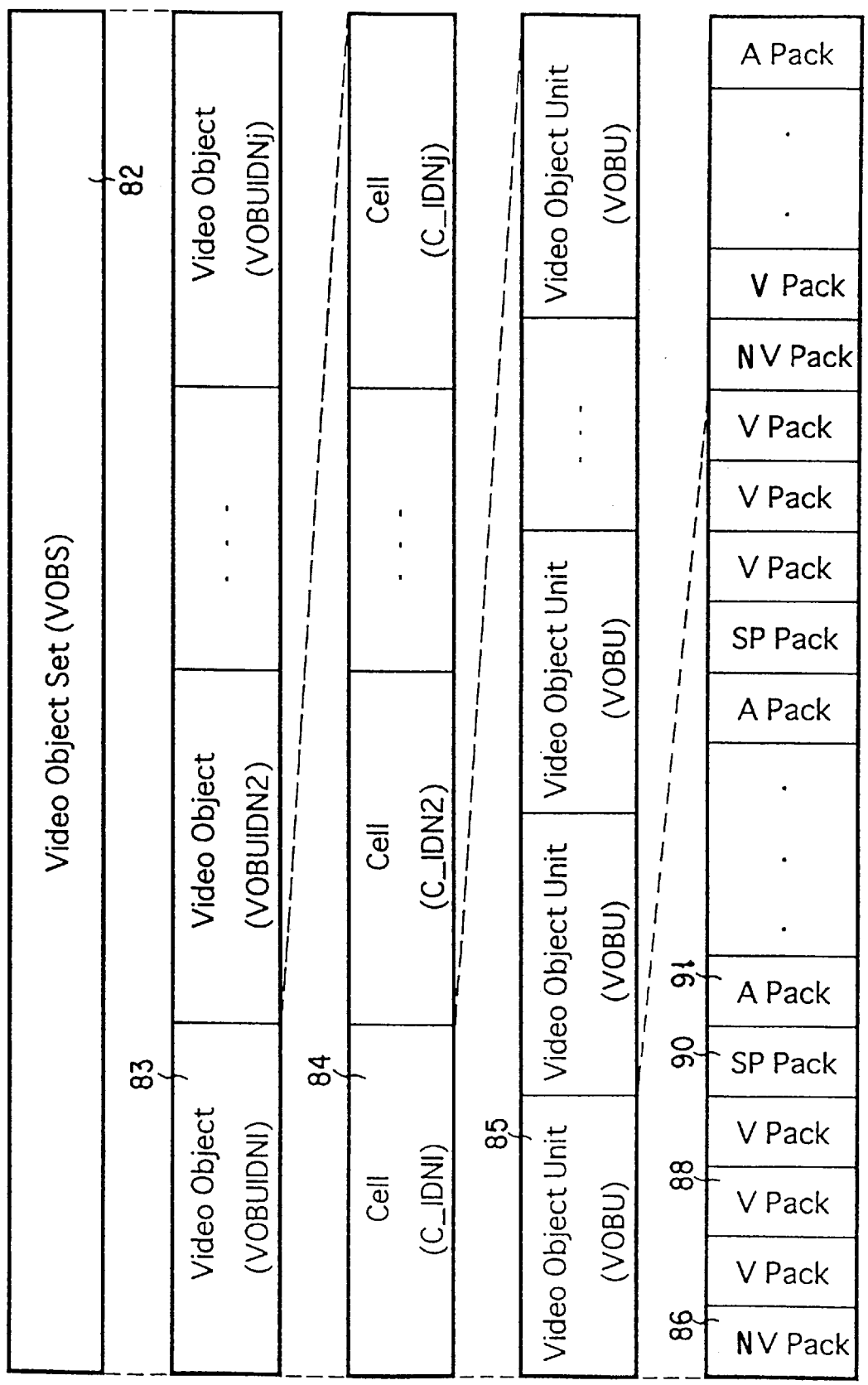
FIG. 8 shows an example of the structure of the video object set (VOBS) shown in FIG. 7.

As shown in FIG. 8, a video object set (VOBS) 82 is defined as a set of one or more video objects (VOB) 83. The video objects 83 in a video object set (VOBS) 82 are used for the same application. A video object set (VOBS) 82 for menus is usually made up of one video object (VOB) 83 and stores the data used to display a plurality of menu screens. In contrast, a video object set (VTSTT_VOBS) 82 for title sets is usually composed of a plurality of video objects (VOB) 83.

When the aforementioned video of a boxing match is taken as an example, a video object (VOB) 83 corresponds to the video data of each match engaged by boxer X. Specifying a particular video object (VOB) 83 enables, for example, boxer X's eleventh match for a world championship to be reproduced on a video. The video object set (VTSM_VOBS) 95 for a menu of the video title sets 72 contains the menu data for the matches played by boxer X. According to the presentation of the menu, a particular match, for example, boxer X's eleventh match for a world championship, can be specified. In the case of a usual single story movie, one video object (VOB) 83 corresponds to one video object set (VOBS) 82. One video stream is completed with one video object set (VOBS) 82. In the case of a collection of animated cartoons or an omnibus movie, a plurality of video streams each corresponding to individual stories are provided in a single video object set (VOBS) 82. Each video stream is stored in the corresponding video object 83. Accordingly, the audio stream and sub-picture stream related to the video stream are also completed with each video object (VOB) 83.

An identification number (IDN#j) is assigned to a video object (VOB) 83. Whereby the video object (VOB) 83 can be identified. A video object (VOB) 83 further comprises one or more such cells 84. Although a usual video stream is made up of a plurality of cells 84, a menu video stream, or a video object (VOB) 83 may be composed of one cell 84. A cell 84 is likewise assigned an identification number (C_IDN#j). Whereby the cell 84 is identified. At the time of the change of the angle explained later, the angle is changed by specifying the cell number.

Here, the term angle is used to signify a change in an angle at which an object is viewed in the field of the films. In an example of a boxing match, angle signifies that the same knockout scene can be seen from different angles: e.g., a scene viewed from the champion, a scene viewed from the challenger, or a scene viewed from the judge. An angle may be selected by the user as he or she wishes, or the same scene may be repeated while the angle is being changed automatically as the story advances. Furthermore, the angle may be changed after the beginning of the same scene has been reached; e.g., the scene is changed the moment that the boxer dealt the opponent a counter and then a scene where the counter is dealt again is played. The angle may also be changed at the scene following the current scene; e.g., the angle is changed the moment that the boxer has dealt the opponent a counter. To achieve any angle change, a navigation pack explained in detail later is provided in a video object unit (VOBU) 85.

Figure 9:
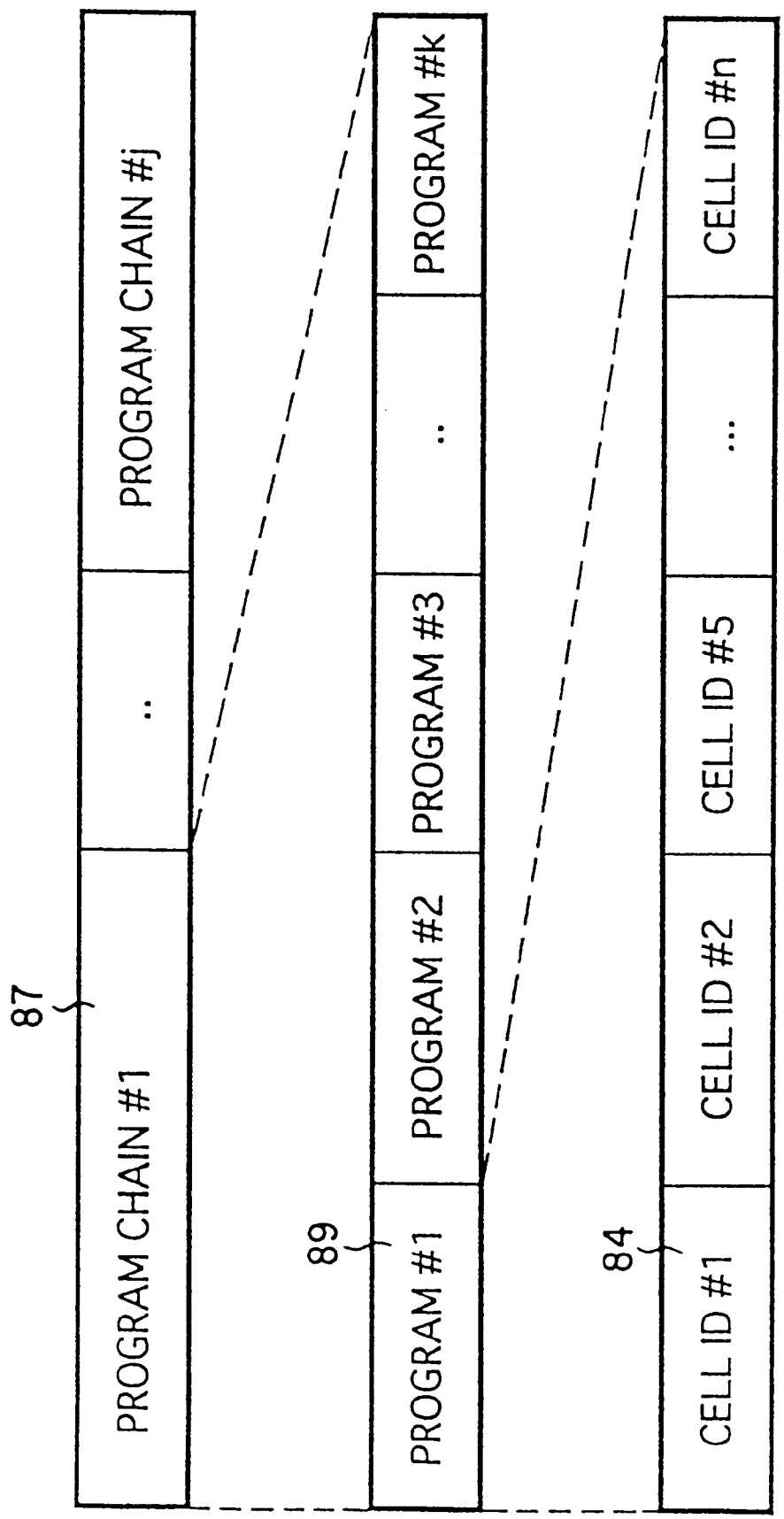
FIG. 9 is a diagram to help explain the structure of the video object unit of FIG. 8.

As shown in FIG. 8, each cell 84 is composed of one or more video object units (VOBU) 85, normally a plurality of video object units (VOBU) 85. Here, a video object unit (VOBU) 85 is defined as a pack train having a navigation pack (NV pack) 86 at its head. Specifically, a video object unit (VOBU) 85 is defined as a set of all the packs recorded, starting at a navigation pack (NV pack) 86 to immediately in front of the next navigation pack. The reproducing time of the video object unit (VOBU) 85 corresponds to the reproducing time of the video data made up of one or more GOP (Group of Pictures) contained in the video object unit (VOBU) 85 as shown in FIG. 9. The maximum reproducing time is determined to be 0.4 or more second and less than one second. In MPEG, one GOP is defined as compressed image data, which corresponds to about 15 frames to be played back for, usually, 0.5 second.

When the video data includes a video object unit as illustrated in FIG. 8, GOPs each composed of a video pack (V pack) 88, a sub-picture pack (SP pack) 90 and an audio pack (A pack) 91, all complying to the MPEG standards, are arranged, producing a video wide data stream. Regardless of the number of GOPs, a video object (VOBU) 83 is determined based on the time required for producing a GOP. The video object (VOBU) 83 has a navigation pack (NV) pack 86 arranged at its head. Any reproduced data, whether audio data, sub-picture data, or audio/sub-picture data, consists of one more video object units (VOB). Thus, even if a video object unit is composed of audio packs only, these audio packs will be reproduced within the time for reproducing the video object unit. The procedure of reproducing these packs will be explained later in detail, along with the procedure of reproducing the navigation pack (NV pack) 86.

The video manager 71 will be explained with reference to FIG. 7. The video manager information 75 placed at the head of the video manager 71 contains the information used to search for titles and the information used to manage the video title sets (VTS) 72 such as the information used for reproduction of a video manager menu. The video manager information 75 contains at least four tables 78, 79, 80, 81 in the order shown in FIG. 7. Each of these tables 78, 79, 80, 81 is aligned with the boundaries between logical sectors. A first table 78, a video manger information management table (VMGI_MAT) 78 is a mandatory table in which the size of the video manager 71, the starting address of each piece of the information in the video manager 71, and the attribute information about the video object set (VMGM_VOBS) 76 for a video manager menu are written.

Written in a second table of the video manager 71, a title search pointer table 79 (TT_SRPT), is an entry program chain (EPGC) of the video titles (VTS) 72 contained in the optical disk 10 that are selectable according to the entry of a title number from the key/display section 4 on the apparatus or the selection of a title number via the remote controller 5.

Here, a program chain 87 is a set of programs 89 that reproduce the story of a title as shown in FIG. 9. Continuous reproduction of a program chain 87 completes the movie of a title. Therefore, the user can start to see the movie from a particular scene of the movie by specifying an appropriate program 89.

In a third table of the video manager 71, a video title set attribution table (VTS_ATRT) 80, the attribute information for video title sets (VTS) 72 in the volume of the optical disk 10 is written. Specifically, in this table 80, the following items are written as attribute information: the number of video title sets, video title set numbers, video attributes, such as a video data compression scheme, audio stream attributes, such as an audio coding mode, and sub-picture attributes, such as the type of sub-picture display.

Described in a video manager menu PGCI unit table (VMGM_PGCI_UT) 81, the fourth table of the video manager 71, is information about the video object set (VMGM_VOBS) 76 for the video manager menu.

The video manager menu PGCI unit table (VMGM_PGCI_UT) 81 is essential when the video manager menu (VMGM) is present in the video object set (VMGM_VOBS) 76 for the video manager menu.

The contents of the video manager information management table (VMGI_MAT) 78 and the title search pointer table (TT_SRPT) 79 will be explained in detail with reference to FIGS. 10, 11, 12, and 13.

As shown in FIG. 10, written in the video manager information management table (VMGI_MAT) 78 are a video manager identifier (VMG_ID), the size of video manager information (VMGI_SZ) in logical blocks (as mentioned above one logical block contains 2048 bytes), the version number (VERN) of the optical disk 10 complying with the digital versatile disk video specification, and the category of video manager 71 (VMG_CAT).

In the category of video manager 71 (VMG_CAT), a flag indicates whether or not the DVD video directory prohibits copying. Also written in the table (VMGI_MAT) are a volume set identifier (VLMS_ID), the number of video title sets (VTS_Ns), the identifier for a person supplying the data to be recorded on the disk (Provider Unique ID: PVR_ID), a video manager menu video object set start address (VNGM_VOBS_SA), the end address (VMGI_MAT_EA) of a volume manager information management table (VMGI-MAT) 78, and the start address (TT_SRPT_SA) of a title search pointer table (TT_SRPT) 79. The start address (VMGM_PGCI_UT_SA) of the video manager menu PGCI unit table (VMGM_PGCI_UT) 81 is described in this table 78. When there is no video manager menu PGCI unit table (VMGM_PGCI_UT) 81, "00000000h" is described at the start address. The end address of VMGI_MAT 78 (VMGI_MAT_EA) and the start address of TT_SRPT (TT_SRPT_SA) 79 are represented by the number of logical blocks, relative to the first logical block.

Furthermore, in the table 78, the start address (VTS_ATRT_SA) of the attribute table (VTS_ATRT) 80 of video title sets (VTS) 72 is represented by the number of bytes, relative to the first byte in the VMGI manager information table (VMGI_MAT) 71, and the video attribute (VMGM_V_ATR) of the video manager menu (VMGM) is written. Further written in the table 78 are the number of audio streams (VMGM_AST_Ns) in the video manager menu (VMGM), the attributes of audio streams (VMGM_AST_ATR) in the video manager menu (VMGM), the number of sub-picture streams (VMGM_SPST Ns) in the video manager menu (VMGM), and the attributes of sub-picture streams (VMGM_SPST_ATR) in the video manager menu (VMGM).

Figures 11, 12, 13:
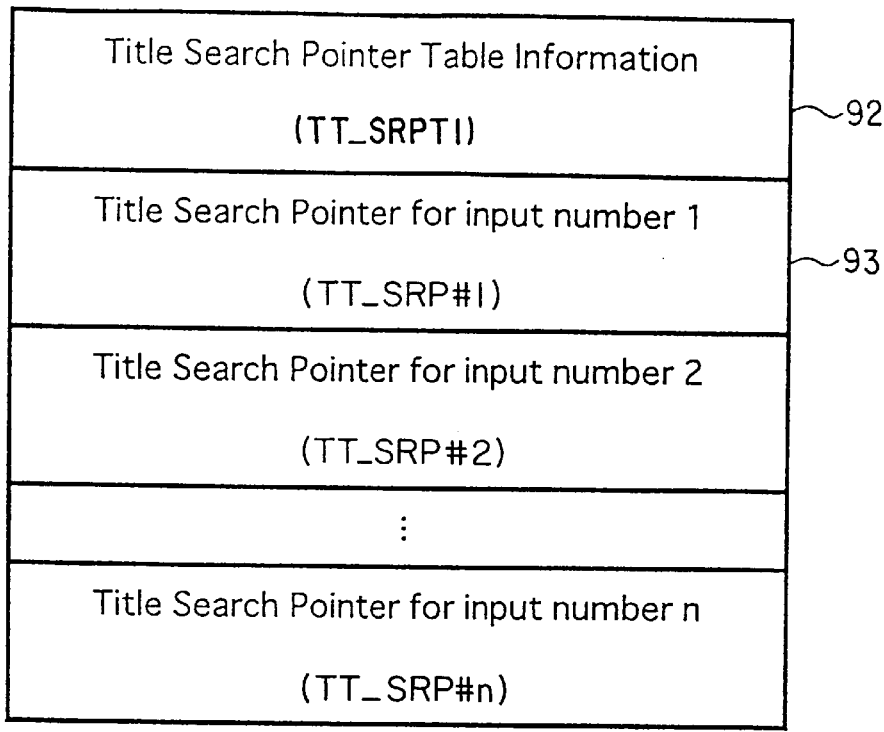
FIG. 11 shows the structure of the title search pointer table (TT_SRPT) in the video manager information (VMGI) of FIG. 7.
FIG. 12 shows the parameters and contents of the title search pointer table information (TT_SRPTI) in the title search pointer table (TT_SRPT) of FIG. 11.
FIG. 13 shows the parameters and contents of the title search pointer (TT_SRP) corresponding to the input number in the title search pointer table (TT_SRPT) of FIG. 11.

In the title search pointer table (TT_SRPT) 79, as shown in FIG. 11, the title search pointer table information (TT_SRPTI) is first written and then followed by as many consecutively written title search pointers for input numbers 1 to n (n≦99) as are needed. When corresponding to only the reproducing data for one title (for example, when only the video data for one title is stored in the volume of the optical disk), only one title search pointer (TT_SRP) 93 is written in the table (TT_SRPT) 79.

As shown in FIG. 12, the title search pointer table information (TSPTI) 92 contains the number of title search pointers (TT_Ns) and the end address (TT_SRPT_EA) of the title search pointer table (TT_SRPT) 79. The address (TT_SRPT_EA) is represented by the number of bytes, relative to the first byte in the title search pointer table (TT_SRPT) 79.

Furthermore, as shown in FIG. 13, each title search pointer (TT_SRP) 93 contains the number of part-of-titles (PTT_Ns) as the number of chapters (programs), the video title set number (VTSN) the title number (VTS_TTN) of the video title set 72, and the start address (VTS_SA) of the video title set 72. The contents of the title search pointer (TT_SRP) 93 specifies a video title set 72 to be reproduced and a location in which the video title set 72 is to be stored. The start address (VTS_SA) of the video title set 72 is represented by the number of logical blocks in connection with the title set 72 specified by the video title set number (VTSN).

The details of what is described in the video manager menu PGCI unit table information (VMGM_PGCI_UT) 81 will now be discussed with reference to FIGS. 14 through 19.

Figures 14, 15, 16:
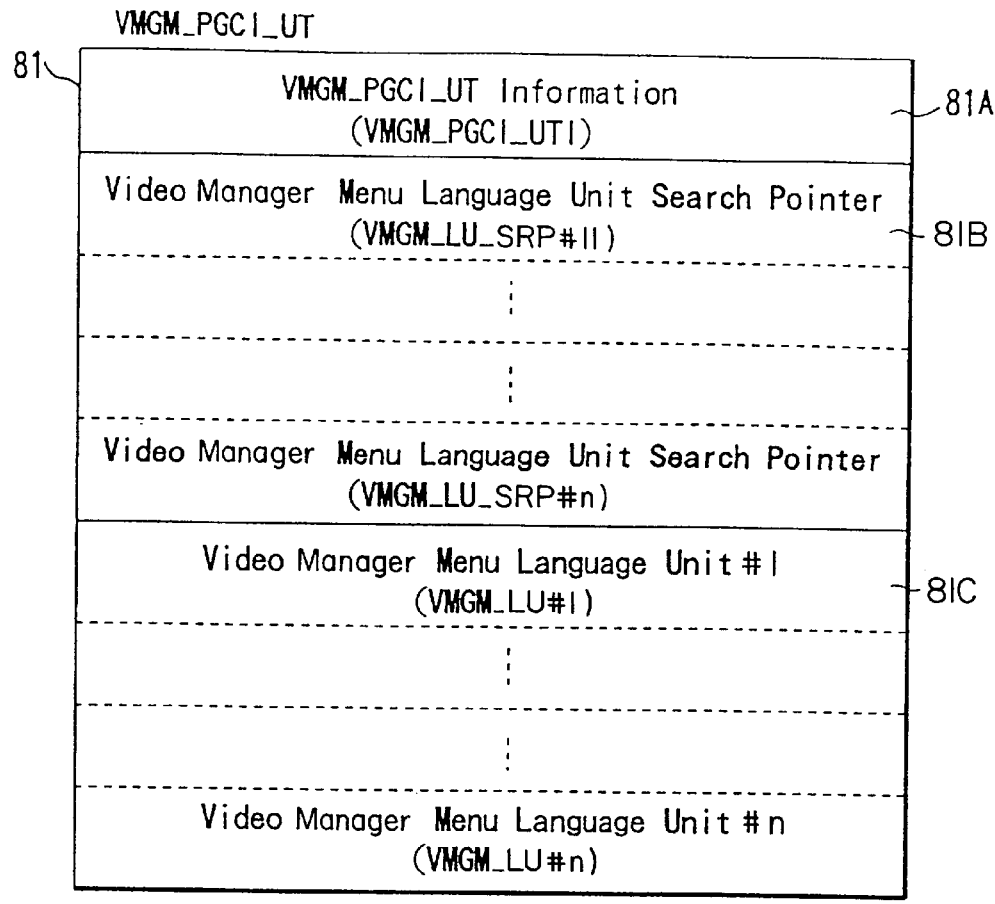
FIG. 14 depicts the structure of a video manager menu Program Chain Information (PGCI) unit table (VMGM_PGCI_UT) shown in FIG. 7.
FIG. 15 illustrates the parameters and contents of video manager menu PGCI unit table information (VMGM_PGCI_UTI) in FIG. 14.
FIG. 16 illustrates the parameters and contents of a video manager menu language unit search pointer (VMGM_LU_SRP) in FIG. 14.

The video manager menu PGCI unit table information (VMGM_PGCI_UT) 81 shown in FIG. 14 is essential when the video object set (VMGM_VOBS) 76 for the video manager menu is provided, and information about a program chain for reproducing the video manager menu (VMGM) provided for each language is described in this table 81. By referring to the video manager menu PGCI unit table (VMGM_PGCI_UT) 81, the program chain of the specified language in the video object set for VMG menu (VMGM_VOBS) 76 can be acquired to be reproduced as a menu.

The video manager menu PGCI unit table (VMGM_PGCI_UT) 81 contains video manager menu PGCI unit table information (VMGM_PGCI_UTI) 81A, n video manager menu language unit search pointers (VMGM_LU_SRP) 81B, and n video manager menu language units (VMGM_LU) 81C in the named order as shown in FIG. 14.

The video manager menu PGCI unit table information (VMGM_PGCI_UTI) 81A contains information about the table 81. The video manager menu language unit search pointers (VMGM_LU_SRP) 81B are described in the order associated having video manager menus #1 to #n which contain language codes and descriptions about the pointers to search for the video manager menu language units (VMGM_LU) 81C. Described in each video manager menu language unit (VMGM_LU) 81C are the category and start address of the program chain of the associated video manager menu.

Figures 17, 18, 19:
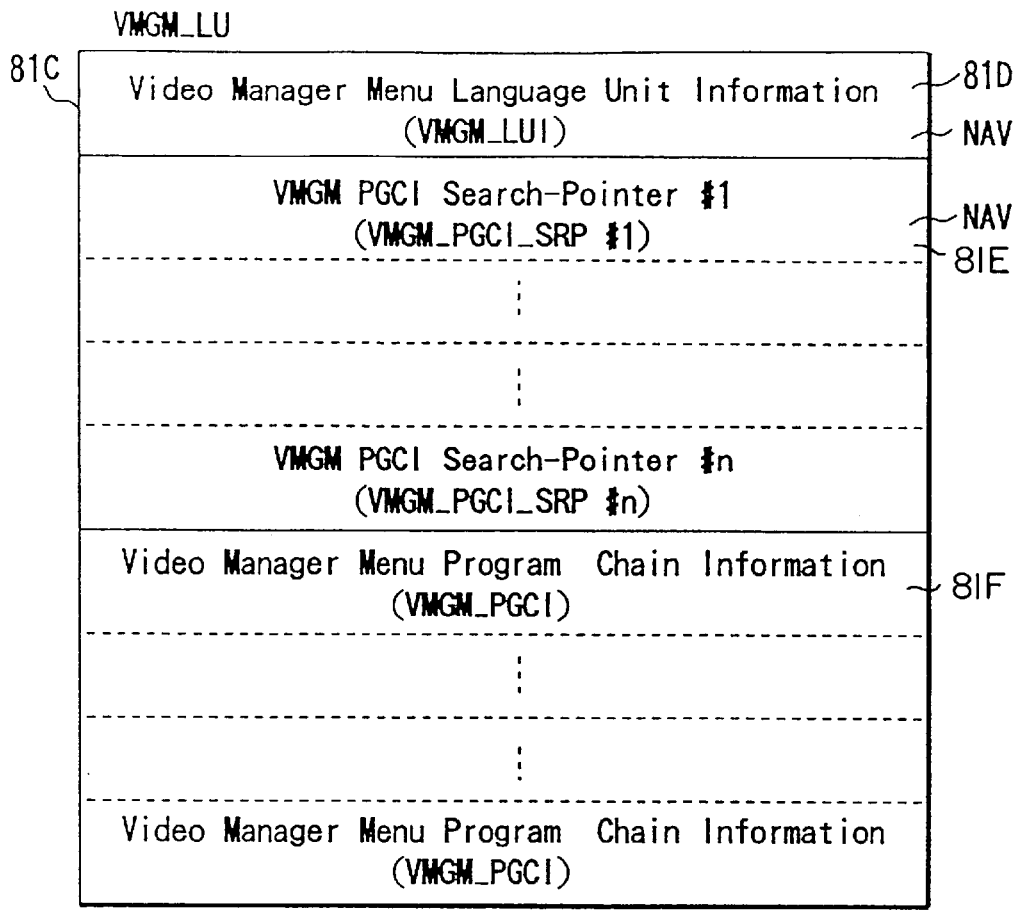
FIG. 17 shows the structure of video manager menu language unit (VMGM_LU) in FIG. 14.
FIG. 18 depicts the parameters and contents of video manager menu language unit information (VMGM_LUI)
FIG. 19 illustrates the parameters and contents of video manager menu PGC information search pointer (VMGM_PGCI_SRP)

More specifically, as shown in FIG. 15, the video manager menu PGCI unit table information (VMGM_PGCI_UTI) 81A contains the number of the video manager menu language units (VMGM_LU) 81C as a parameter (VMGM_LU_Ns) and the end address of the video manager menu language units (VMGM_LU) 81C as a parameter (VMGM_PGCI_UT_EA). As shown in FIG. 16, each video manager menu language unit search pointer (VMGM_LU SRP) 81B contains a video manager menu language code as a parameter (VMGM_LCD) and the start address of the associated video manager menu language unit (VMGM_LU) 81C as a parameter (VMGM_LU_SA). Each video manager menu language unit (VMGM_LU) 81C consists of video manager menu language unit information (VMGM_LUI) 81D, video manager menu PGC information search pointers (VMGM_PGCI_SRP) 81E and video manager menu PGC information (VMGM_PGCI) 81F in the named order as shown in FIG. 17. The video manager menu language unit information (VMGM_LUI) 81D contains information about this table 81C. The video manager menu PGC information search pointers (VMGM_PGCI_SRP) 81E are described in the order associated with the video manager menus #1 to #n and contain the categories of the program chains of the video manager menus and descriptions about the pointers to search for the video manager menu PGC information (VMGM_PGCI) 81F, described in the order associated with the video manager menus #1 to #n.

The video manager menu PGC information (VMGM_PGCI) 81F contains information about the program chain of the video manager menu or VMGM program chain information (VMGM_PGCI).

More specifically, as shown in FIG. 18, the video manager menu language unit information (VMGM_LUI) 81D contains the number of pieces of the VMGM program chain information (VMGM_PGCI) 81f as a parameter (VMGM_PGCI_Ns) and the end address of the video manager menu language unit information (VMGM_LUI) 81D as a parameter (VMGM_LUI_EA). As shown in FIG. 19, each video manager menu PGC information search pointer (VMGM_PGCI_SRP) 81E contains the category of the program chain of the associated video manager menu as a parameter (VMGM_PGC_CAT) and the start address of the associated VMGM program chain information (VMGM_PGCI) 81F as a parameter (VMGM_PGCI_SA).

Described in the category (VMGM_PGC_CAT) of the program chain of the video manager menu are a flag indicating whether or not there is an entry of this PGC and a menu ID indicating if it is a menu. The menu ID indicates a title menu when it is "0010".

The structure of the logic format of the video title set 72 shown in FIG. 6 will be described with reference to FIG. 20. In each video title set (VTS) 72, four items are written in the order shown in FIG. 20. Each video title set (VTS) 72 is made up of one or more video titles having common attributes. The video title set information (VTSI) 94 contains the management information on the video titles, including the information on entry search points, the information on playback of video object sets 72, the information on playback of title set menus (VTSM), and the attribute information on video object sets 72.

Each video title set 72 is provided with the backup of the video title set information (VTSI_BUP) 97. Between the video title set information (VTSI) and the backup of the information (VTSI_BUP) 97, a video object set for video title set menus (VTSM_VOBS) 95 and a video object set for video title set titles (VTSTT_VOBS) 96 are arranged. Both of the video object sets (VTSM_VOBS and VTSTT_VOBS) 95, 96 have the structure shown in FIG. 8, as explained earlier.

The video title set information (VTSI) 94, the backup of the information (VTSI_BUP) 97, and the video object set (VTSTT_VOBS) 96 for video title set titles are items indispensable to the video title set 72. The video object set (VTSM_VOBS) 96 for video title set menus is an option provided as the need arises.

Figure 20:
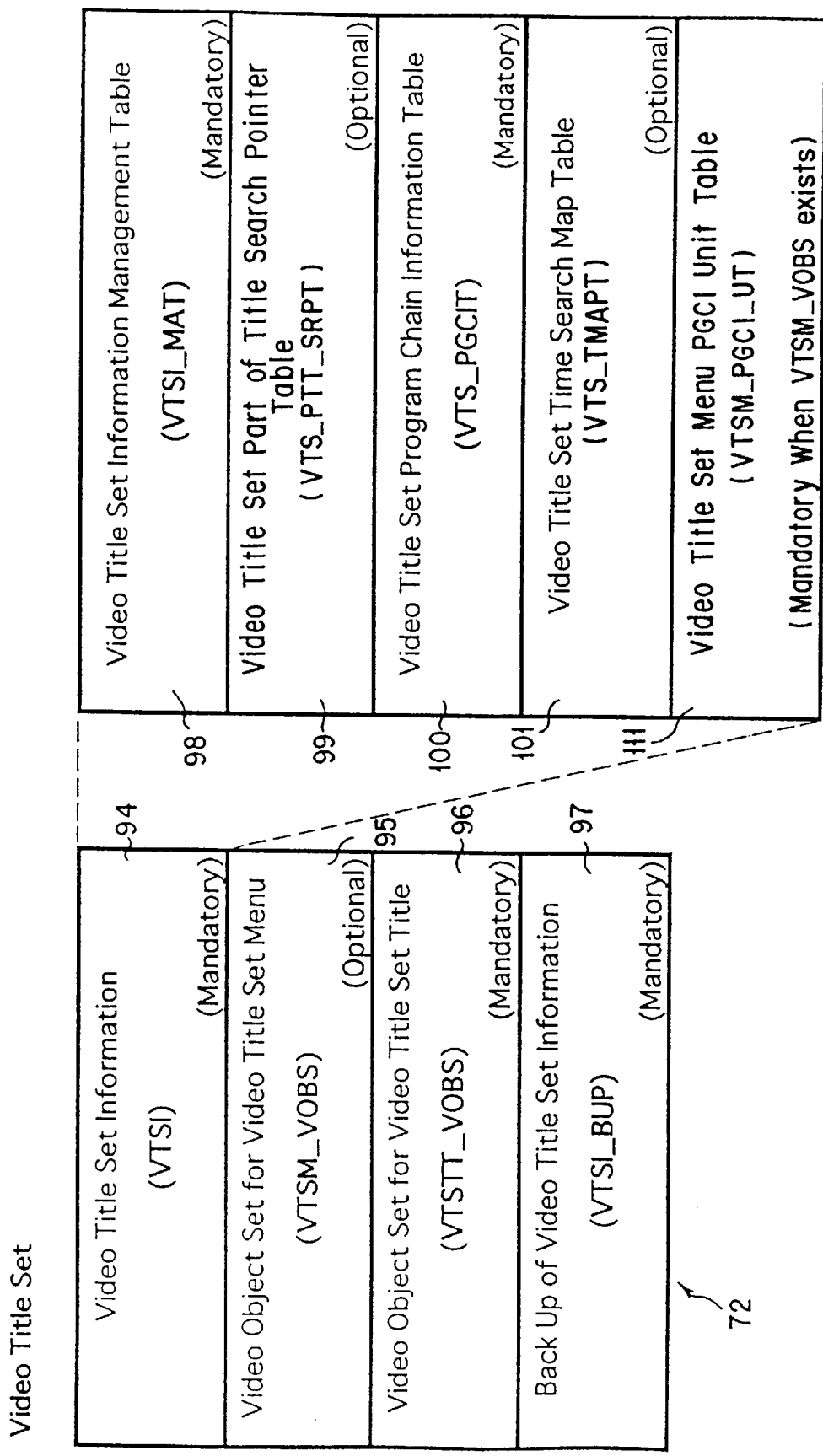
FIG. 20 illustrates the structure of the video title set of FIG. 6.

The video title set information (VTSI) 94 consists of five tables as shown in FIG. 20. The five tables are forced to align with the boundaries between logical sectors. The video title set information management table (VTSI_MAT) 98, a first table, is a mandatory table, in which the size of the video title set (VTS) 72, the start addresses of each piece of information in the video title set (VTS) 72, and the attributes of the video object sets (VOBS) 96 in the video title set (VTS) 72 are written.

The video title set part of title search pointer table (VTS_PTT_SRPT) 99, a second table, is an optional table provided as the need arises. Written in the table 99 are the program chains (PGC) 87 and/or programs (PG) 89 contained in the video title set 72 that are selectable according to the entry of a title number from the key/display section 4 of the apparatus or the selection of a title number given via the remote controller 5.

The video title set program chain information table (VTS_PGCIT) 100, a third table, is a mandatory table, in which the VTS program chain information (VTS_PGCI) 104 is written. The video title set time map table (VTS_TMAPT) 101, a fourth table, is an optional table provided as the need arises, in which is written information on the recording location, for a specific period of display time for of the video data in each program chain (PGC) 87 in the title set 72 to which the map table (VTS_TMAPT) 101 belongs.

A video title set menu PGCI unit table (VTSM_PGCI_UT) 111, the fifth table, is an essential item when a video object set (VGSM_VOBS) 95 for the video title set menu is provided. The video fifth set menu PGCI unit table contains information about a program chain for reproducing a video title set menu (VTSM) provided for each language. By referring to this video title set menu PGCI unit table (VTSM_PGCI_UT) 111, the program chain of the specified language in the video object set (VTSM_VOBS) 95 can be acquired to be reproduced as a menu.

Next, the video title information management table (VTSI_MAT) 98 and video title set program chain information table (VTSI_PGCIT) 100 shown in FIG. 20 will be described with reference to FIGS. 21 to 30.

FIG. 21 shows the contents of the video title information management table (VTSI_MAT) 98, in which the video title set identifier (VTS_ID), the size of the video title set 72 (VTS SZ), the version number of the DVD video specification (VERN), and the video title set category (VTS_CAT) are written in that order. Furthermore, in the table (VTSI_MAT) 98, the start address (VTSM_VOBS SA) of the video object set (VTSM_VOBS) for VTS menus is expressed by a logical block relative to the first logical block in the video title set (VTS) 72. The start address (VTSTT_VOB_SA) of the video object 83 for titles in the video title set (VTS) 72 is expressed by a logical block (RLBN) relative to the first logical block in the video title set (VTS) 72.

Furthermore, in the table (VTSI_MAT) 98, the end address (VTSI_MAT_EA) of the video title set information management table (VTSI_MAT) 98 is represented by the number of blocks, relative to the first byte in the table (VTSI_MAT) 98 and the start address (VTS_PTT_SRPT_SA) of the video title set part of title search pointer table (VTS_PTT_SRPT) 99 is represented by the number of blocks, relative to the first byte in the video title set information (VTSI) 94.

Still furthermore, in the table (VTSI_MAT) 98, the start address (VTS_PGCIT_SA) of the video title set program chain information table (PGCIT) 100 is expressed by the number of blocks, relative to the first byte of the video title set information (VTSI) 94, and the start address (VTS_TMAPT_SA) of the time search map (VTS_TMAPT) 101 in the video title set (VTS) 72 is expressed by a logical sector relative to the first logical sector in the video title set (VTS) 72. This table (VTSI_MAT) 98 contains the start address (VTSM_PGCI_UT_SA) of the video title set menu PGCI unit table (VTSM_PGCI UT) in terms of the number of relative blocks from the top byte of the video title set information (VTSI) 94. When the video manager menu PGCI unit table (VMGM_PGCI_UT) 81 is not present, "00000000h" is described at the start address. Written in the table (VTSI_MAT) 98 are the video object set (VTSM_VOBS) 95 for the video title set menu (VTSM) in the video title set (VTS) 72, the video attributes (VTS_V_ATR) of the video object set (VTSTT_VOBS) 96 for the titles (VTSTT) in the video title set 72, and the number of audio streams (VTS_AST_Ns) in the video object set (VTSTT_VOBS) 82 for the titles (VTSTT) for the video title sets 72. Here, the video attributes (VTS_V_ATR) include a video compression mode, a frame rate of the TV system, and an aspect ratio for displaying an image on a display unit.

Written in the table (VTSI_MAT) 98 are the audio stream attributes (VTS_AST_ATR) of the video object set (VTST_VOBS) for the titles (VTSTT) in the video title set (VTS). The attributes (VTS_AST_ATR) include an audio encoding mode indicating how audio is encoded, the number of bits used to quantize audio, the number of audio channels and an audio language code.

Furthermore, written in the table (VTSI_MAT) 98 are the number (VTS_SPST_Ns) of sub-picture streams in the video object set 82 for the titles (VTSTT) in the video title set (VTS) 72 and the attributes (VTS_SPST_ATR) of each sub-picture stream. The attributes (VTR_SPST_ATR) for each sub-picture stream include a sub-picture coding mode, a sub-picture display type and a sub-picture language code.

Also written, in the table (VTSI_MAT) 98 are the number (VTSM_AST Ns) of audio streams in the video title set menu (VTSM), the audio stream attributes (VTSM AST_ATR), the number (VTSM_SPST Ns) of sub-picture streams, and the sub-picture stream attributes (VISM_SPST_ATR).

Figure 22:
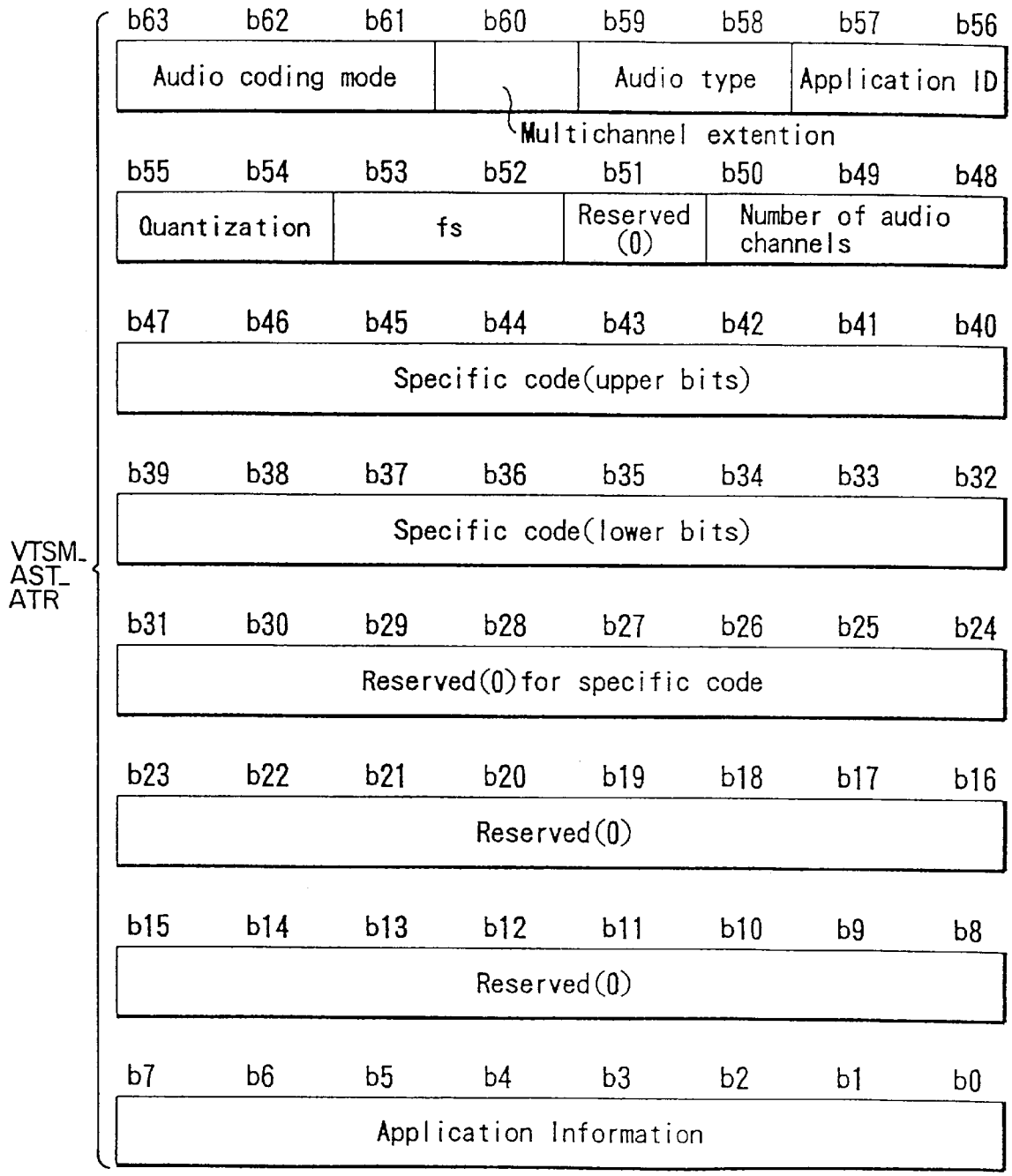
FIG. 22 illustrates the contents of the attribute (VTS_AST_ATR) of an audio stream of a video title set (VTS) in FIG. 6.

As shown in FIG. 22, each audio stream attribute (VTS_AST_ATR) of the video title set (VTS) contains the audio coding mode, the multichannel extension, the audio type, the audio application ID, quantization, the sampling frequency $f_s$, and the number of audio channels from bit number b63 to bit number b48 with bit b51 reserved, and audio stream language codes as specific codes from bit number b47 to bit number b40 and from bit number b39 to bit number b32. Bit number b31 to bit number b24 of this audio stream attribute (VTS_AST_ATR) are reserved for specific codes. Bit number b23 to bit number b8 are reserved for the future use, and bit number b7 to bit number b0 describe application information. When the video object set (VTSM_VOBS) 95 for the VTS menu is not present or that video object set contains no audio stream, "0" is described in each of the bits from bit number b63 to bit number b0.

Specific codes are described in bits b47 to b40 and b39 to b32 where a language code determined by ISO-639 is described as a language symbol when the audio stream type is a language or voice. When the audio stream type is not a language or voice, this area is reserved.

As shown in FIG. 23, each sub-picture stream attribute (VTS_SPST_ATR) of the video object set (VTST_VOBS) 96 for VTSTT contains the sub-picture coding mode, sub-picture display type and sub-picture type from bit number b47 to bit number b40 with bit b44 reserved, and a language code of this sub-picture stream as specific codes from bit number b39 to bit number b32 and from bit number b31 to bit number b24. Bits b23 to b16 are reserved for specific codes. Bits b23 to b8 are reserved for the future use, and bits b15 to b8 describe the specific code extension. Further, bits b7 to b0 are reserved.

The VTS program chain information table (VTS_PGCIT) 100 has a structure as shown in FIG. 24. In the information table (VTS_PGCIT) 100, information on the VTS program chain (VTS_PGC) is written, starting with information (VTS_PGCIT_I) 102 on the information table (VTS_PGCIT) 100 related to the VTS program chain (VTS_PGC). In the information table (VTS_PGCIT) 100, the information (VTS_PGCIT_I) 102 is followed by a number of VTS_PGCI search pointers (VTS_PGCIT_SRP) 103 each VTS_PGCI equal to the number (#1 to #n) of VTS program chains in the information table (VTS_PGCIT) each VTS_PGCI search pointer being used to search for VTS program chains (VTS_PGC). At the end of the table, there are provided a number of information pieces (VTS_PGCI) 104 on the respective VTS program chains (VTS_PGC) equal to the number (from #1 to #n) of VTS program chains (VTS_PGC).

The information (VTS_PGCIT_I) 102 in the VTS program chain information table (VTS_PGCIT) 100 contains the number (VTS_PGC_Ns) of VTS program chains (VTS_PGC), as shown in FIG. 25. The end address (VTS_PGCIT_EA) of the table information (VTS_PGCIT_I) 102 is expressed by the number of bytes, relative to the first byte in the information table (VTS_PGCIT) 100.

Furthermore, as shown in FIG. 26, the VTS_PGCIT search pointer (VTS_PGCIT_SRP) 103 contains the attributes (VTS_PGC_CAT) of the program chains (VTS_PGC) in the video title set (VTS) 72 and the start address (VTS_PGCI_SA) of the VTS_PGC information (VTS_PGCI) 104, the start address being expressed by the number of bytes relative to the first byte in the VTS_PGC information table (VTS_PGCIT) 100. Here, the VTS_PGC attribute (VTS_PGC_CAT) is, for example, an attribute indicating whether an entry program chain (Entry PGC) is the first one to be reproduced. Usually, an entry program chain (PGC) is written before program chains (PGC) that are not entry program chains (PGC). Generally, program chains (PGC) are reproduced in the description order of VTS_PGCIs as shown in FIG. 24.

The PGC information (VTS_PGCI) 104 in the video title set 72 contains four items as shown in FIG. 27. In the PGC information (VTS_PGCI) 104, the program chain general information (PGC_GI) 105 on a mandatory item is first arranged, followed by at least three items that are made mandatory only when there is a video object 83. Specifically, contained as the three items in the PGC information (VTS_PGCI) 104 are a program chain program map (PGC_PGMAP) 106, a cell playback information table (C_PBIT) 107, and a cell position information table (C_POSIT) 108.

As shown in FIG. 28, the program chain general information (PGC_GI) 105 contains the category (PGCI_CAT) of the program chain 87, the contents (PGC_CNT) of the program chain (PGC) 87, and the playback time of the program chain (PGC)87. Written in the category of PGC (PGCI_CAT) are whether the PGC can be copied or not and whether the programs 89 in the PGC are played back continuously or at random. The contents of PGC (PGC_CNT) contains the description of the program chain structure, that is, the number of programs 89, the number of cells 84, and the number of angles in the program chain 87. The playback time of PGC (PGC_PB_TIME) contains the total playback time of the programs 89 in the PGC. The playback time is the time required to continuously play back the programs 89 in the PGC, regardless of the playback procedure. When an angle mode is available, the playback time of angle cell number 1 is the playback time of the angle.

Furthermore, the program chain general information (PGC_GI) 105 contains PGC sub-picture stream control (PGC_SPST_CTL), PGC audio stream control (PGC_AST_CTL), and PGC sub-picture pallet (PGC_SP_PLT). The PGC sub-picture stream control (PGC_SPST_CTL) contains the number of sub-pictures usable in the PGC 89 and the PGC audio stream control (PGC_AST_CTL) likewise contains the number of audio streams usable in the PGC 89. The PGC sub-picture palette (PGC_SP_PLT) contains a set of a specific number of color pallets used in all of the sub-picture streams in the PGC 89.

Furthermore, the PGC general information (PGC_GI) 105 contains the start address (C_PBIT_SA) of the cell playback information table (C_PBIT) and the start address (C_POSIT_SA) of the cell position information table (C_POSIT) 108. Both of the start addresses (C_PBIT_SA and C_POSIT_SA) are represented by the number of logical blocks, relative to the first byte in the VTS_PGC information (VTS PGCI) 105.

For a program chain (PGC) for a menu, as shown in FIG. 29, bit b31 of the category (PGC_CAT) of the program chain describes a PGC entry or a non PGC entry as the entry type, bits b30 to b28 of are reserved for the future use, bits b27 to b24 describe a menu ID indicative of the type of the menu, bits b23 and b22 describe the PGC block mode, bits b21 and b20 describe the PGC block type, bits b19 to b16 describe the program playback control, bits b15 and b14 describe the copy flag, bits b13 and b12 describe the playback management, bits b11 to b8 describe the application type, and bits b7 to b0 are reserved for the future usage.

With regard to the menu ID, "00101" indicates a title menu for use in the video manager information menu (VMGM), "0011" indicates a root menu for use in the video title set menu (VTSM), "0100" indicates a sub-picture menu for use in the video title set menu (VTSM), "0101" indicates an audio menu for use in the video title set menu (VTSM), "0110" indicates an angle menu for use in the video title set menu (VTSM), and "0111" indicates a program menu for use in the video title set menu (VTSM).

When the category (PGC_CAT) of the program chain (PGC) is a program chain (PGC) for a title, bits b30 to b24 describe the number of titles (VTS_TTN), any of numbers 1 to 99, in this program chain (PGC), bits b15 to b8 describe the number of cells, any of 1 to 255, in this program chain (PGC), bits b7 to b4 are reserved for the future use, and bits b3 to b0 describe the number of angles, any one of 1 to 9, in the program chain (PGC).

The program chain program map (PGC_PGMAP) 108 is a map showing the arrangement of the programs_89 in the PGC 87 of FIG. 31. In the map (PGC_PGMAP) 106, the entry cell numbers (ECELLN), the start cell numbers of the individual programs 89, are written in ascending order as shown in FIGS. 31 and 32. In addition, program numbers are allocated, starting at 1, in the order in which the entry cell numbers are written. Consequently, the first entry number in the map (PGC_PGMAP) 106 must be #1.

The cell playback information table (C_PBIT) defines the order in which the cells 84 in the PGC 87 are played back. In the cell playback information table (C_PBIT) 107, pieces of the cell playback information (C_PBI) are written consecutively as shown in FIG. 33. Basically, cells 84 are played back in the order of cell number. The cell playback information (C_PBIT) 108 contains a cell category (C_CAT) as shown in FIG. 34. Written in the cell category (C_CAT) are a cell block mode indicating whether a cell is in the block and if it is in the block, whether the cell is the first one, a cell block type indicating whether a cell 84 is not part of the block or is in an angle block, and an STC discontinuity flag indicating whether the system time clock (STC) must be set again.

An "angle block" of cells is defined as a set of cells 84 having a specific angle. The angle can be changed by replacing one angle block with another. In the case of a baseball video program, for example, an angle block representing a scene taken from the outfield may be replaced by an angle block representing a scene taken from the infield.

Further written in the cell category (C_CAT) are a cell playback mode indicating whether the video object units (VOBU) 85 in the cell 84 are played back continuously or a picture is made still at one video object unit (VOBU) 85 to another in the cell 84, and cell navigation control indicating whether the picture is made still after the playback of the cell or indicating the rest time.

As shown in FIG. 34, the cell playback information table (C_PBIT) 107 contains the cell playback time (C_PBTN) representing the total playback time of the PGC 87. When the PGC 87 has an angle cell block, the playback time of the angle cell number 1 represents the playback time of the angle block.

Further written in the cell playback information table (C_PBIT) 107 are the start addresses (C_FVOBU_SA and C_LVOBU_SA) of the first and last video object unit (VOBS) 85 in the cell 84 expressed by the number of logical sectors relative to the first logical sector in the video object unit (VOBS) 85 in which the cells 84 are written.

The cell position information table (C_POSIT) 108 specifies the identification number (VOB_ID) of the video object (VOB) 85 in the cell used in the PGC 87 and the identification number (Cell_ID) of the cell 84. In the cell position information table (C_POSIT) 108, pieces of the cell position information (C_POSI) corresponding to the cell numbers written in the cell playback information table 107 (shown in FIG. 35) are written in the same order as in the cell playback information table (C_PBIT) 107. The cell position information (C_POSI) contains the identification number (C_VOB_IDN) of the video object unit (VOBS) 85 in the cell 84 and the cell identification number (C_IDN), as shown in FIG. 36.

Figures 37, 38, 39:
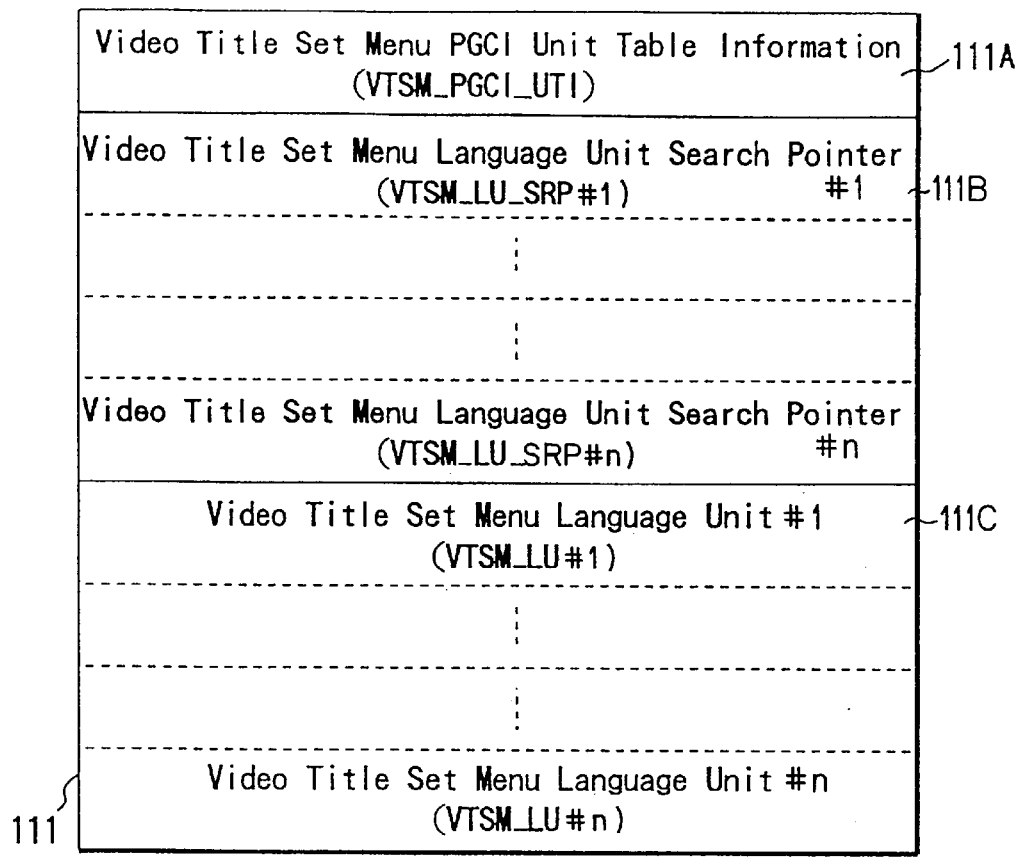
FIG. 37 shows the structure of a video title set menu PGCI unit table (VTSM_PGCI_UT) in FIG. 20.
FIG. 38 depicts the structure of video title set menu PGCI unit table information (VTSM_PGCI_UTI) in FIG. 37.
FIG. 39 shows the structure of a video title set menu PGCI language unit search pointer (VTSM_LU_SRP) in FIG. 37.

FIG. 37 shows the video title set menu PGCI unit table (VTSM_PGCI_UT) 111 of FIG. 20. This table describes language-by-language information of the video title set menu (VTSM). It consists of video title set menu PGCI unit table information (VTSM_PGCI_UTI) 111A, n video title set menu language unit search pointers (VTSM_LU_SRP) 111B and n video title set menu language units (VTSM_LU) 111C in the named order, as shown in FIG. 37.

The video title set menu PGCI unit table information (VTSM_PGCI_UTI) 111A contains information of this table 111. The video title set menu language unit search pointers (VTSM_LU_SRP) 111B are described in the order associated with the video title set menus #1 to #n, and contain descriptions about the pointers to search for the video title set menu language units (VTSM_LU) 111C described in the order associated with the video title set menus #1 to #n. Described in each video title set menu language unit (VTSM_LU) 111C are the category and start address of the program chain of the associated video title set menu.

Figures 40, 41, 42:
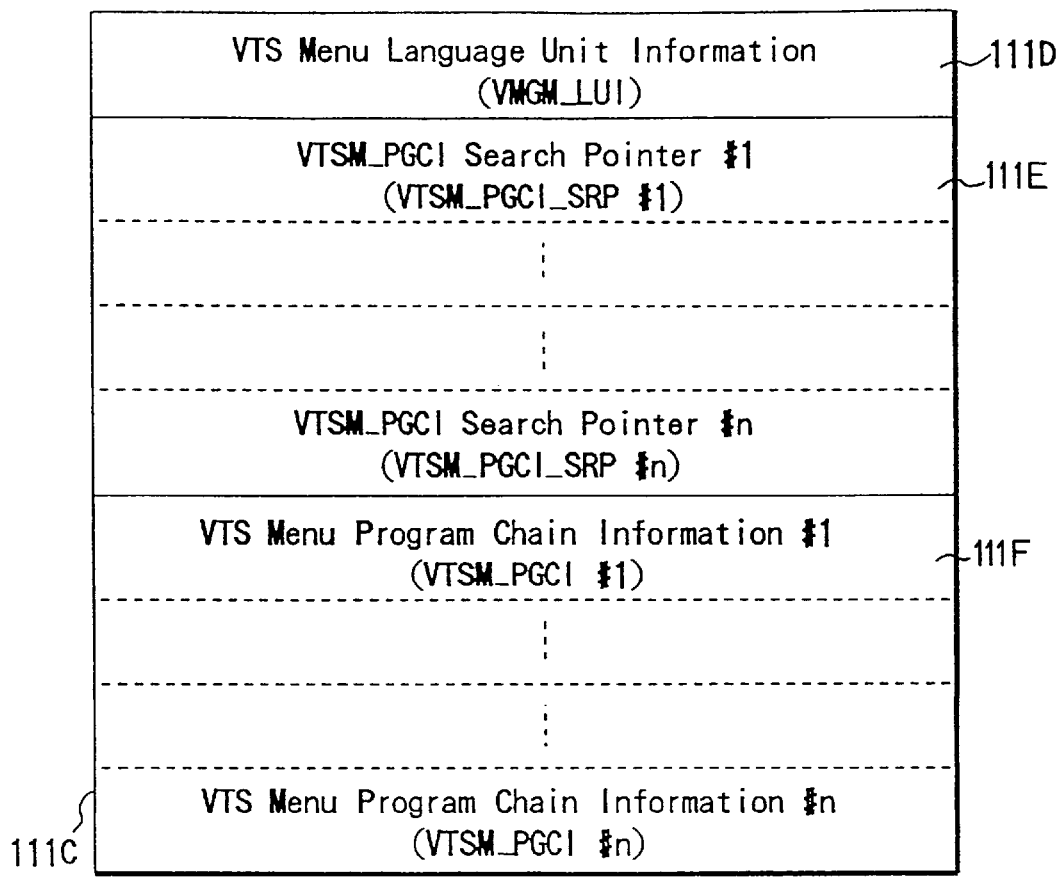
FIG. 40 illustrates the structure of a video title set menu language unit (VTSM_LU) in FIG. 37.
FIG. 41 illustrates the structure of video title set menu language unit information (VTSM_LUI) in FIG. 37.
FIG. 42 illustrates the parameters and contents of a video title set menu PGC information search pointer (VTSM_PGCI_SRP)

More specifically, as shown in FIG. 38, the video title set menu PGCI unit table information (VTSM_PGCI_UTI) 111A contains the number of the video title set menu language units (VTSM_LU) 111C as a parameter (VTSM_LU_Ns) and the end address of the video title set menu language units (VTSM_LU) 111C as a parameter (VTSM_PGCI_UT_EA). As shown in FIG. 39, each video title set menu language unit search pointer (VTSM_LU_SRP) 111B describes a video title set menu language code as a parameter (VTSM_LCD) and the start address of the associated video title set menu language unit (VTSM_LU) 111C as a parameter (VTSM_LU_SA). As shown in FIG. 40, each video title set menu language unit (VTSM_LU) 111C consists of video title set menu language unit information (VTSM_LUI) 111D, video title set menu PGC information search pointers (VTSM_PGCI_SRP) 111E and video title set menu PGC information (VTSM_PGCI) 111F in the named order. The video title set menu language unit information (VTSM_LUI) 111D contains information of this table 111C. The video title set menu PGC information search pointers (VTSM_PGCI_SRP) 111E are described in the order associated with the video title set menus #1 to #n, and contain the categories of program chains of the video title set menus and descriptions about the pointers to search for the video title set menu PGC information (VTSM_PGCI) 111F described in the order associated with the video title set menus #1 to #n.

Each video title set menu PGC information (VTSM_PGCI) 111F contains information about the program chain of the associated video title set menu, i.e., VTSM program chain information (VTSM_PGCI).

More specifically, as shown in FIG. 41, the video title set menu language unit information (VTSM LUI) 111D contains the number of pieces of video title set menu PGC information (VTSM_PGCI) 111F as a parameter (VTSM_PGCI Ns), and the end address of the video title set menu language unit information (VTSM_LUI) 111D as a parameter (VTSM_LUI_EA). As shown in FIG. 42, each video title set menu PGC information search pointer (VTSM_PGCI_SRP) 111E contains the category of the program chain of the associated video title set menu as a parameter (VTSM_PGC_CAT) and the start address of the associated video title set menu PGC information (VTSM_PGCI) 111F as a parameter (VTSM_PGCI_SA).

Described in the category (VMGM_PGC_CAT) of the program chain of the video title set menu are a flag indicating whether or not there is an entry of this PGC and a menu ID indicating if it is a menu. The menu ID indicates a sub-picture menu when it is "0100," indicates an angle menu when it is "0110," and indicates a program menu when it is "0111."

As explained with reference to FIG. 8, a cell 84 is a set of video-object units (VOBU) 85. A video object unit 85 is defined as a pack train starting with a navigation (NAV) pack 86. Therefore, the start address (C_FVOBU_SA) of the first video object unit (VOBU) 85 in a cell 84 is the start address of the NAV pack 86. As shown in FIG. 43, the NAV pack 86 consists of a pack header 110, a system header 111, and two packets 116, 117 of navigation data; namely, a playback control information (PCI) packet 116 and a data search information (DSI) packet 117. As many bytes, as shown in FIG. 43, are allocated to the respective sections so that one pack may contain 2048 bytes corresponding to one logical sector. The NAV pack is provided immediately before the video pack 88, which contains the first data, item in the group of pictures (GOP). Even if the object unit 85 contains no video pack 88, the NAV pack 86 is positioned at the head of the object unit 85, provided that the object unit 85 contains an audio pack 91 and/or a sub-picture pack 90. Thus, even if object unit 85 contains no video pack, its playback time is determined on the basis of the time required for playing back a video pack 88, exactly in the same way as in the case where the unit 85 contains a video pack 88.

Here, GOP is defined as a data train constituting a screen determined in the MPEG standards. In other words, GOP is equivalent to compressed data, which may be expanded into image data representing a plurality of frames of a moving picture. The pack header 110 contains a pack starting code, a system clock reference (SCR), and a multiplex rate. The system header 111 contains a bit rate and a stream ID. The packet header 112, 114 of each of the PCI packet 116 and DCI packet 117 contains a packet starting code, a packet length, and a stream ID as determined in the MPEG2.

As shown in FIG. 44, another video, audio or sub-picture pack consists of a pack header 120, packet header 121, and a packet 122 containing the corresponding data as in the system layer 24. Its pack length is determined to be 2048 bytes. Each of these packs is aligned with the boundaries between logical blocks.

The PCI data (PCI) 113 in the PCI packet 116 is navigation data used to make a presentation, or to change the contents of the display, in synchronization with the playback of the video data in the VOB unit (VOBU) 85. Specifically, the PCI data (PCI) 113 contains PCI general information (PCI_GI) as information on the entire PCI data 113 and angle information (NSML_AGLI) as each piece of jump destination angle information during angle change, and highlight information (HLI) as shown in FIG. 45. The PCI general information (PCI_GI) contains the address (NV_PCK_LBN) of the NV pack (NV_PCK) 86 in which the PCI data is recorded as shown in FIG. 28, the address being expressed in the number of blocks, relative to the VOBU logical sector in which the PCI data is recorded. The PCI general information (PCI_GI) contains the category of VOBU (VOBU_CAT), the start PTS of VOBU 85 (VOBU_SPTS), and the end PTS of VOBU 85 (VOBU_EPTS). Here, the start PTS of VOBU 85 (VOBU_SPTS) indicates the playback start time (start presentation time stamp (SPTS)) of the video data in the VOBU 85 containing the PCI data. The playback-start time is the playback start time of the first picture in the first GOP in the VOBU 85. Normally, the first picture corresponds to I picture (intra-picture) data in the MPEG standards. The end PTS (VOBU_EPTS) in the VOBU 85 indicates the playback end time (end presentation time stamp (EPTS)) of the video data in the VOBU 85 containing the PCI data. The playback end time is the playback start time of the last picture in the last GOP in the VOBU 85.

The angle information (NSML_AGLI) contains as many start addresses (NSML_AGL_C_DSTA) of the angle cells at jump destinations as the number of angles, as shown in FIG. 47. Each of the start addresses is represented by a logical sector relative to the logical sector of the NV pack 86 in which the PCI data is recorded. When the angle is changed on the basis of the angle information (NSML_AGLI), the angle information (NSML_AGLI) contains either the start address of the VOBU in another angle block whose playback time is equal to that of the VOBU 85 in which the PCI data is recorded as shown in FIG. 48, or the start address (NSML_AGL_C_DSTA) of the VOBU 85 in another angle block whose playback time is closest to the preceding one.

According to the description of the start address (NSML_AGL_C_DSTA) of such an angle cell, the angle is changed in a concrete example as follows. Assuming that a series of consecutive scenes where in a baseball game, the pitcher throws a ball, the batter hits the ball, and the ball lands in the stands, the change of the angle will be explained. An angle cell (ANG-C#j) can be changed on a video object unit (VOBU) 85 basis as shown in FIG. 48. In FIG. 48, the video object units (VOBU) 85 are assigned numbers in the order of playback. The video object unit (VOBU#n) 85 corresponding to playback number n of an angle cell (ANG_C#j) stores the video data for a different scene which is contemporary with or immediately preceding that for which the video data is stored in the video object unit (VOBU#n) 85 with playback number n corresponding to another angle cell (ANG_C#1) or angle cell (ANG-C#9). It is assumed that in an angle cell (ANG_C#j), VOBUs are arranged consecutively as video data used to show on the screen the whole view including the pitcher and batter and a series of actions. It is also assumed that in angle cell (ANG C#1), VOBUs are arranged consecutively as video data used to show only the batter on the screen to view the batting form of the batter, and that in angle cell (ANG_C#9), VOBUs are arranged consecutively as video data used to show only the expression of the pitcher on the screen. When the user is viewing angle cell #j (ANG_C#i) and changes to angle cell #1 the moment the batter hit the ball, that is, changes to the angle at which only the batter is shown, at the moment the batter made a hit, this switches to a screen where the batter starts swinging a bat before making the hit, not to a screen showing only the batter after he made a hit. Furthermore, when the user is viewing angle cell #j (ANG_C#i) and changes to angle cell #9 the moment the batter hit the ball, that is, changes to the angle at which only the pitcher is shown, at the moment the batter made a hit, this causes the pitcher's expression at the moment the batter made a hit to appear on the screen, enabling the user to read a change in the pitcher's mental state in his expression.

Figure 49:
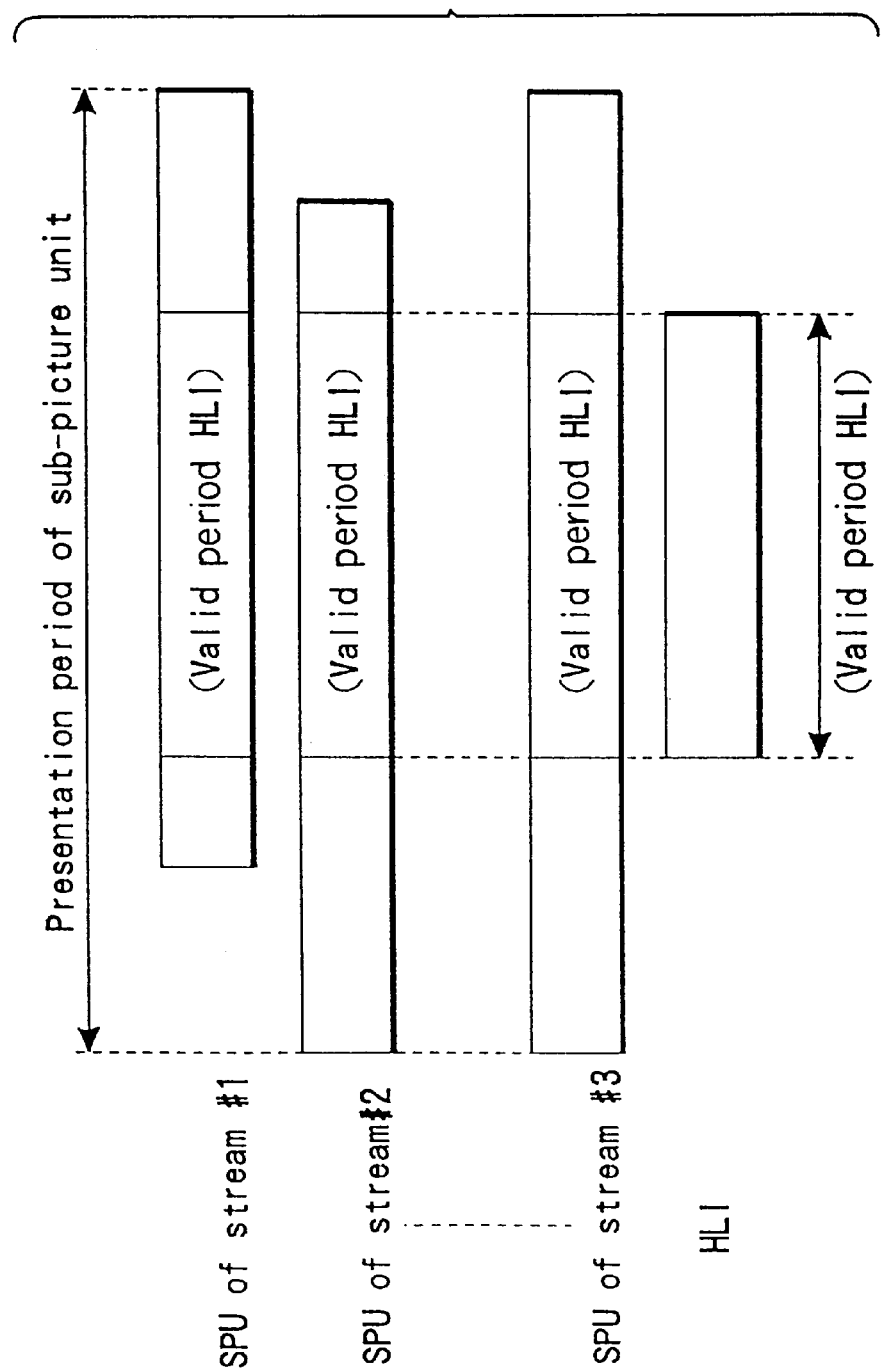
FIG. 49 is a view showing a valid period of highlight information of each sub-picture stream for a reproducing period of one sub-picture image unit.

Highlight information (HLI) is information for highlighting one rectangular area in a sub-picture display area. The mixing ratio (contrast) of the color and the video of the sub-picture of the specific rectangular area in the sub-picture display area is described. As shown in FIG. 49, the highlight information is commonly valid for all sub-picture streams to be reproduced within the valid period. For instance, when the video and the sub-picture and the highlight information are mixed, a mixing picture as shown in FIG. 50 is displayed on the monitor section 6.

Figure 52:
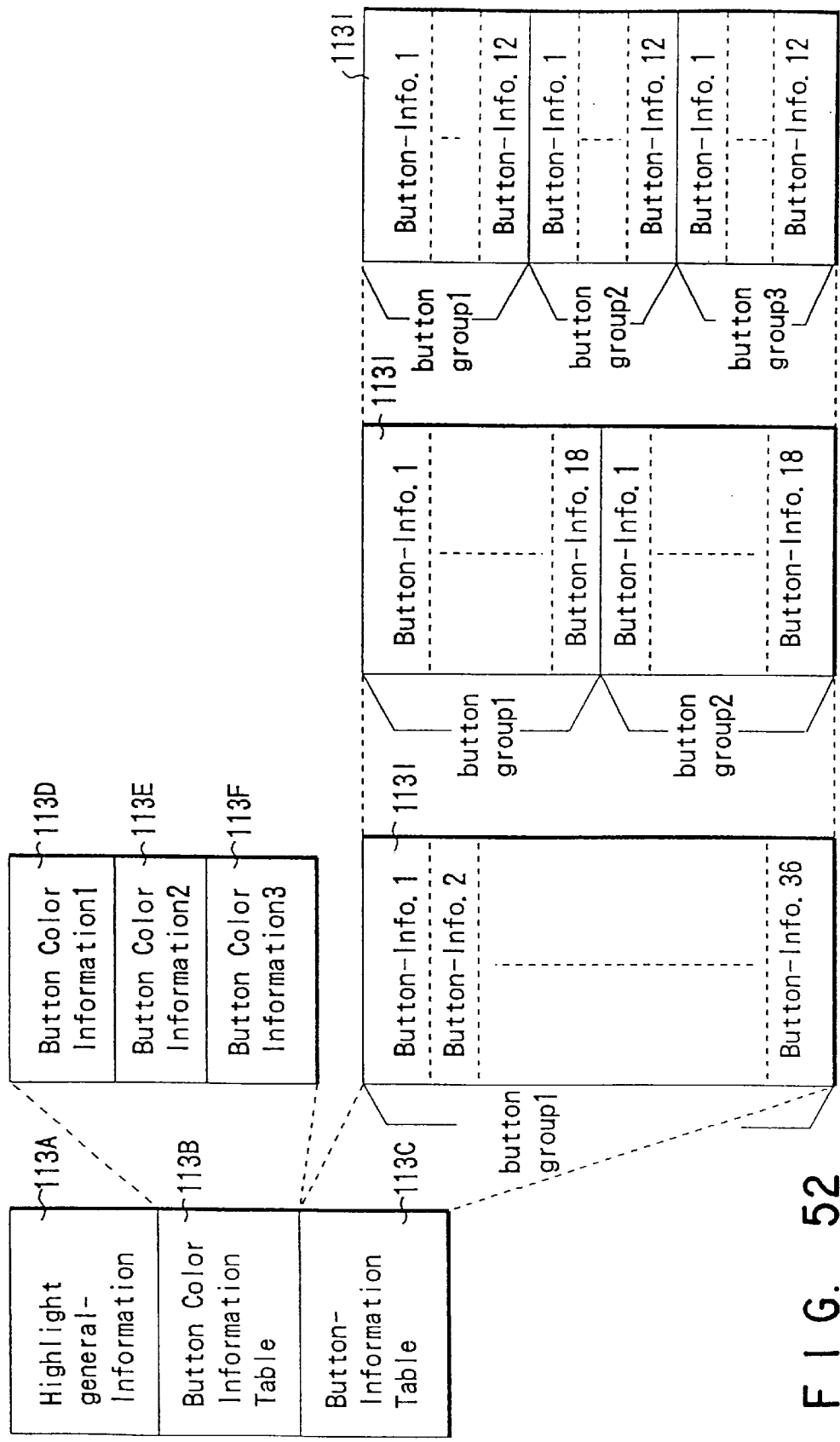
FIG. 52 is a view for explaining content of highlight information (HLI) shown in FIG. 51.

As shown in FIG. 51, the highlight information describes highlight general-information (HL_GI) 113A, button-color information table (BTN_COLIT) 113B and button-information table (BTNIT) 113C. As shown in FIG. 52, the button-color information table (BTN_COLIT) 113B describes three button color information items (BTN_COLI) 113D, 113E, 113F, and the button-information table (BTNIT) 113C describes 36 button information items IBTNI) 113I at the maximum.

For instance, as shown in FIG. 52, 36 button information items (BTNI) 113I are described by three group modes composed by specifying button groups of one group mode made up of 36 button information, two group modes formed of 18 button information, and three group modes composed of 12 button information.

The highlight general-information (HL_GI) 113A is information of the entire highlight information. As shown in FIG. 53, the highlight general-information (HL_GI) 113A describes status of highlight information (HLI_SS), start PTM of HLI (HLI_S_PTM), end PTM of HLI (HLI_E_PTM), end PTM of button select (BTM_SL_E_PTM), mode of button (BTM_MD), button start number (BTN_SN), number of valid buttons (BTN_Ns), number of numerical select buttons (NSBTN_Ns), forcedly selected button number (FSLBTN_N), and forced activated button number (FACBTN_N).

The status of highlight information (HLI_SS) describes the status of the highlight information in corresponding PCI. For instance, in the case of "00", the status of highlight information (HLI_SS) describes no valid highlight information. In the case of "01", the status of highlight information (HLI_SS) describes different highlight from the highlight information of the VOBU. In the case of "10", the status of highlight information (HLI_SS) describes the same highlight information as the highlight information of the VOBU. In the case of "11", the status of highlight information (HLI_SS) describes the highlight information containing difference from the highlight information of the VOBU only from button command.

The start PTM of highlight information (HLI_S_PTM) describes the start PTM of the highlight in which the corresponding highlight information becomes valid (start presentation time (SPTM)). The start PTM of the highlight becomes the display start time or more of the sub-picture stream in which the highlight information becomes an object. When HLI_SS is "01", the highlight start time of highlight information which is renewed during the presentation period of VOBU in which the PCI is included is described. When HLI_SS is "10" or "11", the highlight start time of highlight information used continuously during the presentation period of VOBU in which the PCI is included is described.

The end PTM of highlight information (HLI_E_PTM) describes the end PTM of the highlight information in which the highlight information becomes invalid. The end PTM of highlight information becomes the display end time or less of the sub-picture stream in which the highlight information becomes an object. When HLI_SS is "01", the highlight termination time of highlight information which is renewed during the presentation period of VOBU in which the PCI is included is described. When HLI_SS is "10" or "11", the highlight termination time of highlight information used continuously during the presentation period of VOBU in which the PCI is included is described. When HLI_SS is used during the still state, the end PTM of highlight information (HLI_E_PTM) shall describe (FFFFFFFFh).

End PTM of button select (BTN SL_E_PTM) describes the end PTM of the button select. The end PTM of the button select becomes the display end time or less of the sub-picture stream in which the highlight information becomes an object. When HLI_SS is "01", the button select termination time of highlight information which is renewed during the presentation period of VOBU in which the PCI is included is described. When HLI_SS is "10" or "11", the button select termination time of highlight information used continuously during the presentation period of VOBU in which the PCI is included is described. When highlight information is used during the still state, the button select termination time (BTN_SL_E_PTM) shall describe (FFFFFFFFh).

The mode of button (BTN_MD) describes grouping of the buttons and the display type of the sub-picture corresponding to each group. For instance, the mode of button (BTN_MD) describes number of button groups (BTNGR_Ns), display type of sub-picture corresponding to the button group 1 (BTNGR1_DSPTY), display type of sub-picture corresponding to the button group 2 (BTNGR2_DSPTY) and display type of sub-picture corresponding to the button group 3 (BTNGR3_DSPTY). The number of the button groups (BTNGR_Ns) is one group in the case of "01", 2 groups in the case of "10", and three groups in the case of "11". The display type is wide (9/16) in the case of "01", letter box in the case of "10", and pan-scan in the case of "11".

The button start number (BTN_SN) describes initial button offset number in button groups. The offset number can be described in a range of 1 to 255. The button start number (BTN_SN) is commonly applied to each button group.

The number of valid buttons (BTN_Ns) describes the number of valid buttons in the button groups. The number of the buttons can be described "a range of 1 to 36 when there is one button group, 1 to 18 when there are two button groups, and 1 to 12 when there are three button groups. The number of valid buttons (BTN_Ns) is commonly applied to each button group.

The number numerical select of buttons (NSBTN_Ns) describes the number of the buttons, which can be selected, by the button number in the button groups. The number of the buttons can be described 1 to 36 when there is one button group, 1 to 18 when there are two button groups, and 1 to 12 when there are three button groups. The button start number (NSBTN_Ns) is commonly applied to each button group.

The forcedly selected button number (FSLBTN_N) describes the button number which is forcedly selected at the highlight start time (HLI_S_PTM). Even when the presentation starts during the highlight information validity period, the button number set at highlight information is to be selected. The button number can be described as 1 to 36 and 63 where there is one button group, 1 to 18 and 63 when there are two button groups, and 1 to 12 and 63 when there are three button groups. The forcedly selected button number (FSLBTN_N) is commonly applied to each button group.

The forcedly activated button number (FACBTN_N) describes the button number which is forcedly activated at the end PTM of button select (BTN_SL_E_PTM). The button number can be described as 1 to 36 and 63 when there is one button group, 1 to 18 and 63 when there are two button groups, and 1 to 12 and 63 when there are three button group. The forcedly activated button number (FACBTN_N) is commonly applied to each button group.

Figures 54, 55:
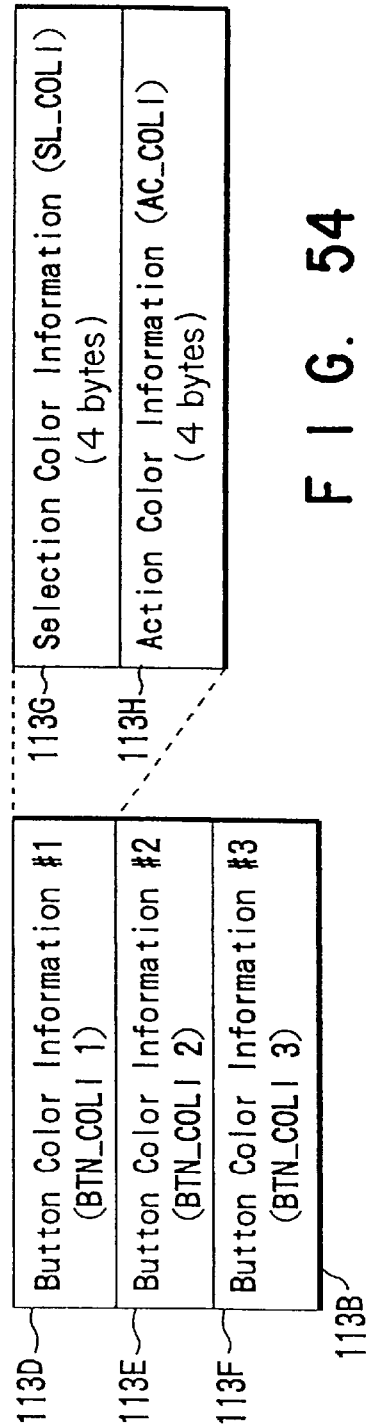
FIG. 54 is a view showing a configuration of a button color information table (BTN_COLIT) in highlight information (HLI) shown in FIG. 51.
FIG. 55 is a view showing the detail of description content of selection color information (SL_COLI) shown in FIG. 54.

Button color information table (BTN_COLIT) 113B describes, as shown in FIG. 54, three button color information (BTN_COLI) 113D, 113E and 113F. The button color number (BTN_COLN) is allocated from "1" in the describing the sequence of the button color information (BTN_COLI1) 113D. As shown in FIG. 54, selection color information (SL_COLI) 113G and action color information (AC_COLI) 113H are described in the button color information (BTN_COLI) 113D. The color and contrast, which are altered when the button is selected, is described in the selection color information (SL_COLI) 113G. The color and contrast, which are altered when the button is activated, are described in the action color information (AC_COLI) 113H. The button selection status is the status in which the selection color is displayed. At the time of this status, the user can change the highlighted button to another button. The button action status is the status in which the action color is displayed and the button command is executed. At the time of this status, the user is not able to change the highlighted button to the other button.

As shown in FIG. 55, emphasis pixel-2 selection color code, emphasis pixel-2 selection color code, pattern pixel selection color code, background pixel selection color code, emphasis pixel-2 selection contrast, emphasis pixel-1 selection contrast, pattern pixel selection contrast, background pixel selection contrast are described in the selection color information (SL_COLI) 113G.

Figure 56:
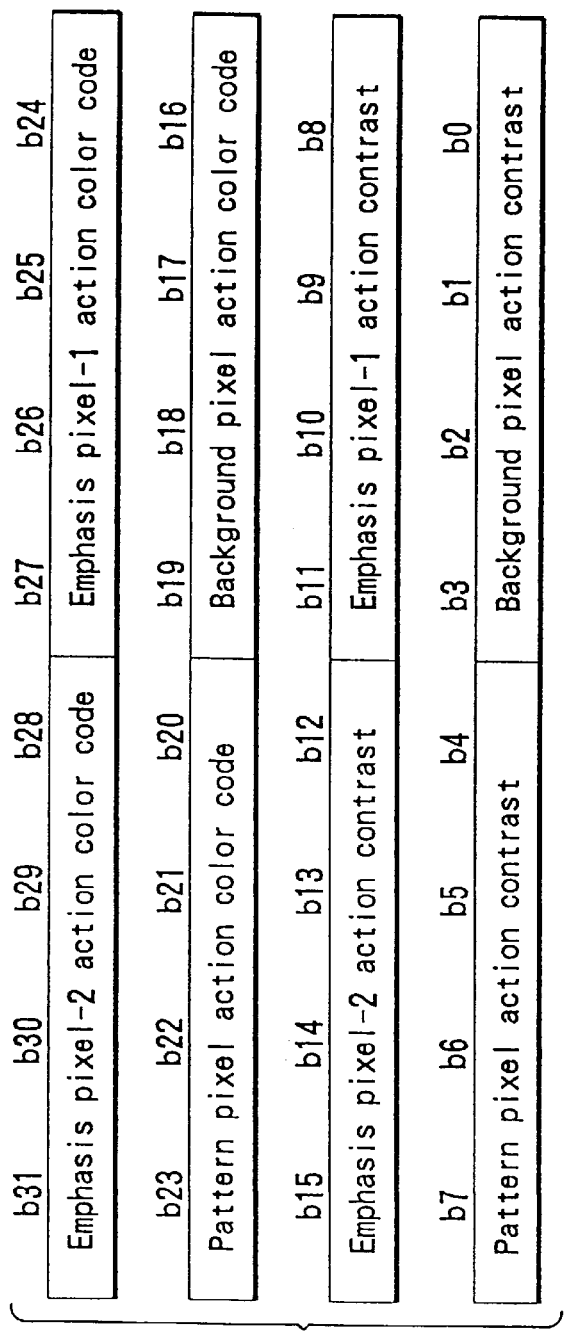
FIG. 56 is a view showing the detail of description content of action color information (AC_COLI) shown in FIG. 54.

As shown in FIG. 56, emphasis pixel-2 action color code, emphasis pixel-2 action color code, pattern pixel action color code, background pixel action color code, emphasis pixel-2 action contract, emphasis pixel-1 action contrast, pattern pixel action contrast, background pixel action contrast are described in the action color information (SL_COLI) 113G.

Figure 57:
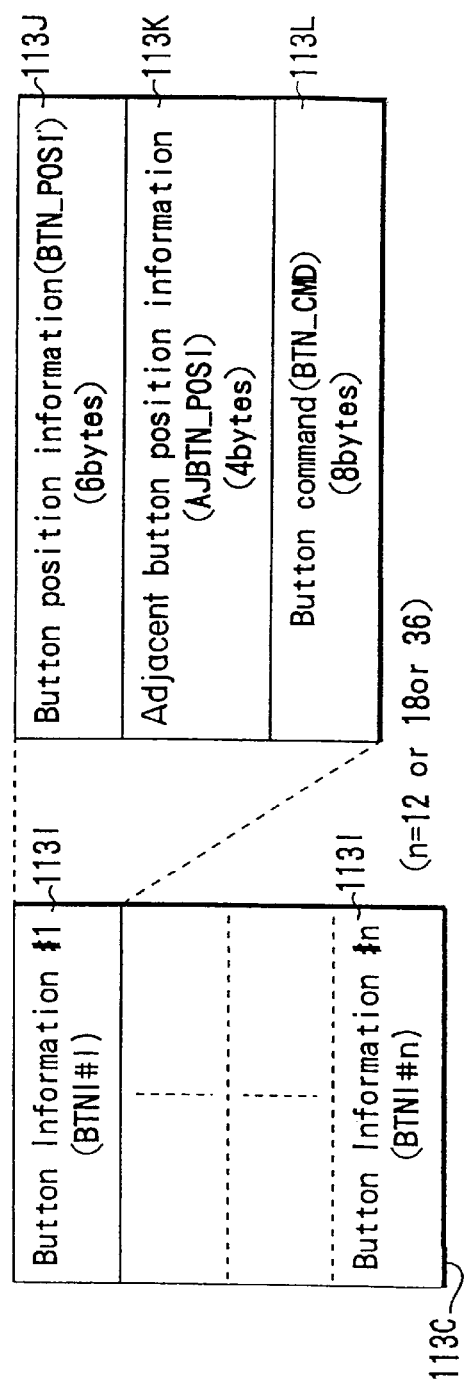
FIG. 57 is a view showing the detail of description content of button information table (BTNIT) in highlight information (HLI) shown in FIG. 51.

As shown in FIG. 57, 36 button information (BTNI) 113I are described in button information table (BTNIT) 113C. The button information (BTNI) 113I can be utilized as three modes: a one group mode in which all 36 button information (BTNI)113I become valid in the describing sequence of the button information table (BTNIT), a two group mode in which 18 units of button information (BTNI) 113I are grouped, and a three group mode in which 12 units of button information (BTNI) 113I are grouped according to the described content of the number of button groups (BTNGR_Ns). Since the describing area of the button information (BTNI) 113I of each group mode is stationary, zero is used to describe the areas in which valid button information (BTNI) 113I does not exist. The button number (BTNN) is allocated from "1" in the describing sequence of the button information (BTNI) 113I in each button group.

The user number specifiable buttons in the button group are the numbers of the values described from BTN_#1 to NSBTN_Ns.

As shown in FIG. 57, the button information (BTNI) 113I describes button position information (BTN_POSI) 113J, adjacent button position information (AJBTN_POSI) 113K and button command (BTN_CMD) 113L.

As shown in FIG. 58, the color numbers (1–3) used for the buttons and the display rectangular area on the video display screen are described in the button position information (BTN_POSI) 113J. The button color number of the button (BTN_COLN), start X-coordinate of the rectangular area displayed by the button (start X-coordinate), end X-coordinate of the rectangular area display by the button (end X-coordinate), start Y-coordinate of the rectangular area displayed by the button (start Y-coordinate), end Y-coordinate of the rectangular area displayed by the button and auto action mode (auto action mode) are described in the button position information (BTN_POSI) 113J. The auto action mode describes whether an selection status is not maintained, or describes whether an selection status or activated state is maintained.

The adjacent button position information (AJBTYN_POSI) 113K describes whether or not the button to be the button number disposed in four directions of upward, downward, rightward and leftward directions has an selection status. The button having no selection status is a button in which, when the button is moved to the button of the object, the button is immediately transferred to the action state without becoming the selection status. For example, the upper button number, the lower button number, the left button number and the right button number are described. It corresponds to the designation of the select key 5m.

The button command (BTN_CMD) 113L describes the command to be executed when the button is activated. A program for transferring, for example, to another selection screen or a program chain for reproducing a title is designated according to the command.

The DSI data (DSI) 115 in the DSI packet 117 shown in FIG. 43 is the navigation data used to search for a VOB unit (VOBU) 85. The DSI data (DSI) 115 contains the DSI general information (DSI_GI), angle information (SML_AGLI), VOB unit search information (VOBU_SRI), and the synchronizing playback information (SYNCI), as shown in FIG. 59.

The DSI information (DSI_GI) contains information about the entire DSI data 115. Specifically, as shown in FIG. 60, the DSI general information (DSI_GI) contains the system clock reference for the NV pack (NV_PCK_SCR) 86. The system clock reference (NV_PCK_SCR) is stored in the system time clock (STC) 54A, 58A, 60A or 62A built in each section of FIG. 1. On the basis of the STC 54A, 58A, 60A, 62A, video, audio, and sub-picture packs are decoded at the video, audio, and sub-picture decoders 58, 60, and 62 and the monitor 6 and the speaker 8 reproduce images and sound, respectively. The DSI general information (DSI_GI) contains the start address (NV_PCK_LBN) of the NV pack (NV_PCK) 86 containing the DSI data expressed by the number of logical sectors (RLSN), relative to the first logical sector in the VOB set (VOBS) 82 containing the DSI, and the address (VOBU_EA) of the last pack in the VOB unit (VOBU) 85 containing the DSI data expressed by the number of logical sectors (RLSN), relative to the first logical sector in the VOB unit (VOBU) 85.

Furthermore, the DSI general information (DSI_GI) contains the end address (VOBU_IP_EA) of the V pack (V_PCK) 88 containing the last data item for the first I picture in the VOB unit (VOBU) expressed by the number of logical sectors (RLSN), relative to the first logical sector in the VOB unit (VOBU) 85 containing the DSI data, and the identification number (VOBU_IP_EA) of the VOB 83 containing the DSI and the identification number (VOBU_C_IDN) of the cell 84 in which the DSI data is recorded.

Like the angle information (NSML_AGLI) in PCI 113, the angle information (SML_AGLI) contains as many start addresses (SML_AGL_C_DSTA) of angle cells at jump destinations as the number of angles, as shown in FIG. 61. Each of the start addresses is represented by a logical sector relative to the logical sector in the NV pack 86 in which the DSI 115 is recorded. When the angle is changed on the basis of the angle information (SML_AGLI), the angle information (SML_AGLI) contains the start address of the cell 84 in another angle block after the playback time of the VOBU 85 in which the DSI data 115 is recorded, as shown in FIG. 62.

When the angle information (SML_AGLI) in DSI data 113 is used, the angle is changed, cell by cell, whereas PCI can be changed on the basis of a video object unit (VOBU) 85. Namely, consecutive changes of the angle are described in the angle information (SML_AGLI) in DSI data 115, (e.g., FIG. 48) whereas discontinuous changes of the angle are described in the angle information (SML_AGLI) in PCI data 113 (e.g., FIG. 62). In the above example of baseball, the angle is changed as follows. It is assumed that angle cell #j (AGL_C#j) 84 contains a stream of video data for a series of scenes where the pitcher throws a ball, the batter hits the ball, and the ball lands in the stands, filmed from the infield, and that angle cell #1 contains a stream of video data for a series of the same scenes filmed from the outfield. Furthermore, angle cell #9 is assumed to be a stream of video data as to how the team to which the batter belongs looks in connection with a series of the above scenes. When the user is viewing angle cell #j (AGL_C#j) and changes to angle cell #1 the instant the batter made a hit, that is, changes to a scene from the outfield the instant the batter hit the ball, he or she can switch to consecutive scenes where the ball is flying closer to the outfield after the batter hit the ball. Furthermore, when the user is viewing angle cell #j (AGL_C#i) and changes, to angle cell #9 the moment the ball landed in the stands, that is, changes to an angle at which how the batter's team looks is shown on the screen, the team cheering for the home run and the baseball manager's expression are displayed on the screen. When the angle information (NSML_AGLI) in PCI data 113 and the angle information (SML_AGLI) in DSI data 115 are used, it is apparent that a different scene is played back.

The search information (VOBU_SRI) in VOBU 85 contains information used to identify the first address in a cell 84, as shown in FIG. 63. Specifically, the search information (VOBU_SRI) in VOBU 85 contains the start addresses (A_FWDn) of +1 to +20, +60, +120, and +240 VOB units (VOBU) 85 as forward addresses (FWDANn) in the order of playback on the basis of the VOB unit (VOBU) 85 containing the DSI 115 as shown in FIG. 35A, the forward addresses being expressed by the number of logical sectors, relative to the first logical sector in the VOB unit.

Each forward address (FWDANn) contains 32 bits as shown in FIG. 64. Bit number 29 (b29) to bit number 0 (b0) are assigned to its address, for example, the address of forward address 10 (FWDA10). At the head of the forward address (FWDANn), a flag (V_FWD_Exist1) indicating whether the video data exists in the video object unit (VOBU) 85 corresponding to the forward address (FWDANn) and a flag (V_FWD_Exist2) indicating whether the video data exists in the video object unit between the current address and the forward address (FWDAn). Specifically, VFWD_Exist1 corresponds to bit number (b31). When this flag is at 0, this means that there is no video data in the video object unit (VOBU) specified by the address (FWDANn) written in bit number 29 (b29) to bit number 0 (b0). When this flag is at 1, this means that there is video data in the video object unit (VOBU) specified by the forward address (FWDANn) written in bit number 29 (b29) to bit number 0 (b0). For example, if forward address 10 (FWD10) has video data, the flag will be up (1) in V_FWD_Exist1 of the 31st bit. If the address has no video data, the flag will be down (0) in V_FWD_Exist1 of the 31st bit. Furthermore, V_FWD_Exist2 corresponds to bit number (b30). When this flag is at 0, this means that there is video data in none of the video object units between the current address and the forwarding address (FWDAn). Specifically, V_FWD_Exixt 1 corresponds to bit number (b31). When this flag is at 0, this means that there is no video data in the video object units (VOBU) 85 between the forward address (FWDANn) written in bit number 29 to bit number 0 and current address. When this flag is at 1, this means that there is video data in at least one of the video object units (VOBU) 85 between them. For example, if there is video data in a plurality of video object units 85 between forward address 1 and forward address 9, the flag will be up (1) in V_FWD_Exist2 of the 30th bit. If the address has no video data, the flag will be down (0) in V_FWD_Exist2 of the 30th bit.

Furthermore, the VOBU search information (VOBU_SI) contains the start addresses (A_BWDn) of −1 to −20, −60, −120, and −240 VOB units (VOBU) 85 as backward addresses (BWDA) in the reverse order of playback on the basis of the VOB unit (VOBU) 85 containing the DSI as shown in FIG. 63, the backward addresses being expressed by the number of logical sectors, relative to the first logical sector in the VOB unit 85.

Each backward address (FWDANn) contains 32 bits as shown in FIG. 65. Bit number 29 (b29) to bit number 0 (b0) are assigned to its address, for example, the address of backward address 10 (BWDA10). At the head of the backward address (BWDANn), a flag (VLBWD_Exist1) indicating whether the video data exists in the video object unit (VOBU) 85 corresponding to the backward address (BWDANn) and a flag (V_BWD_Exist2) indicating whether the video data exists in the video object units between the backward address (BWDAn) and the current address. Specifically, V_BWD_Exist1 corresponds to bit number (b31). When this flag is at 0, this means that there is no video data in the video object unit (VOBU) 85 specified by the address (BWDANn) written in bit number 29 to bit number 0. When this flag is at 1, this means that there is video data in the video object unit (VOBU) specified by the address (BWDANn) written in bit number 29 to bit number 0. For example, if backward address 10 (BWDA10) has video data, the flag will be up (1) in V_BWD_Exist1 of the 31st bit. If the address has no video data, the flag will be down (0) in V_BWD_Exist1 of the 31st bit. Furthermore, V_BWD_Exist2 corresponds to bit number (b30). When this flag is at 0, this means that there is video data in none of the video object units between the backward address (BWDANn) written in bit number 29 to bit number 0 and the current address. When this flag is at 1, this means that there is video data in at least one of the video object units (VOBU) 85. For example, if there is video data in video object units between the backward address 10 (BWDA10) and the current address 0, the flag will be up (1) in V_BWD_Exist2 of the 30th bit. If the address has no video data, the flag will be down (0) in V_BWD_Exist2 of the 30th bit.

The synchronizing information (SYNCI) contains address information on the sub-pictures and audio data reproduced in synchronization with the playback start time of the video data in the VOB unit (VOBU) 85 containing the DSI data. Specifically, as shown in FIG. 66, the start address (A_SYNCA) of the target audio pack (A_PCK) is expressed by the number of logical sectors (RLSN), relative to the NV pack (NV_PCK) 86 in which DSI data 115 is recorded. When there are more than one audio stream (8 audio streams maximum), a number of pieces of the synchronizing information (SYNCI) written is equal to a number of audio streams. Furthermore, the synchronizing information (SYNCI) contains the address (SP_SYNCA) of the NV pack (NV_PCK) 86 of the VOB unit (VOBU) 85 containing the target audio pack (SP_PCK) 91, the address being expressed by the number of logical sectors (RLSN) relative to the NV pack (NV_PCK) 86 in which DSI 115 is recorded. When there are more than one sub-picture stream (32 sub-picture streams maximum), as many pieces of the synchronizing information (SYNCI) as there are sub-picture streams are written.

A sub-picture unit composed of sub-picture data of a plurality of sub-picture packets will be explained by referring to FIG. 67. The sub-picture unit as data (e.g., caption) of still pictures, which correspond to several tens of screens, can be recorded in 1 GOP. The sub-picture unit is composed of a sub-picture unit header (SPUH), a pixel data formed of run-length data (PXD), and display control sequence table (DCSQT).

As shown in FIG. 68, size of sub-picture unit (SPDSZ) and start address of display control sequence table (SPDCSQTA) are described in the sub-picture unit header (SPUH).

As shown in FIG. 69, display control sequence (DCSQ) is described in a lapse time sequence in the display control sequence table (DCSQT).

As shown in FIG. 70, a start address of a following display control sequence (SPNDCSQA) and at least one of display control command (SPDCCMD) are described in each display control sequence (DCSQ).

The display control command (SPDCCMD) is composed of a set command for forcedly display start timing of pixel data (FSTA_DSP), a set command for display start timing of pixel data (STA_DSP), a set command for display end timing of pixel data (STP_DSP), a set command for color code of pixel data (SET_COLOR), a set command for contrast ratio of pixel data and video (SET_CONTR), a set command for display area of pixel data (SET_DAREA), a set command for display start address of pixel data (SET_DSPXA), a set command for color change and contrast change of pixel data (CHG_COLCON), and an end command for the display control command (CMD_END).

The command (STA_DSP) is a command for designating the display start of the sub-picture data, and described by offset PTM from PTM described in the sub-picture packet including the sub-picture unit header (start PTM). The command (STP_DSP) is a command for designating the display stop of the sub-picture data, and described in the offset PTM from the PTM described in the sub-picture packet including the sub-picture unit header (stop PTM).

This start PTM and stop PTM are delayed by arbitrary predetermined time from the PTM of the video data and the audio data regenerated in the same time zone and set.

Figure 71:
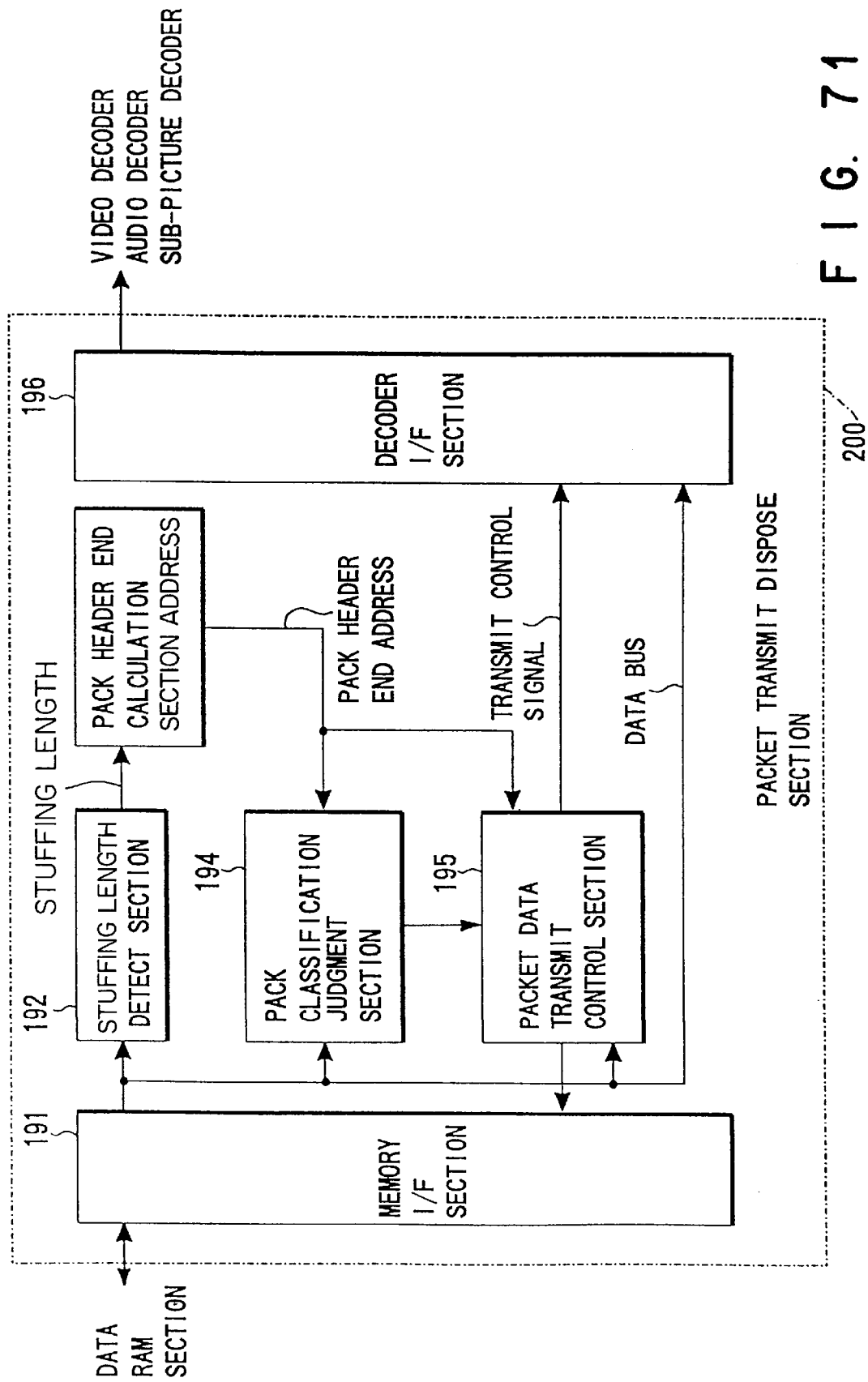
FIG. 71 illustrates a packet transmit dispose section.

The system processor section 54 shown in FIG. 1 has a packet transmit dispose section 200 for determining the type of the packet and transmitting the data in the packet to each decoder. This packet transmit dispose section 200 is composed, as shown in FIG. 71, a memory interface section (memory I/F section) 191, a stuffing length detect section 192, a pack header end address calculation section 193, a pack classification judgment section 194, a packet data transmit control section 195, and decoder interface section (decoder I/F section) 196.

The memory I/F section 191 outputs pack data from the data RAM section 56 to the stuffing length detect section 192, the pack classification judgment section 194, the packet data transmit control section 195 and the decoder I/F section 196 via a data bus.

The stuffing length detect section 192 detects how many bytes the stuffing length in the pack header 120 in the pack data supplied from the memory I/F section 191 contains, and outputs the detected result to the pack header end address calculation section 193.

The pack header end address calculation section 193 calculates the pack header end address according to the stuffing length supplied from the stuffing length detect section 192, and outputs the calculated result to the pack classification judgment section 194 and the packet data transmit control section 195.

The pack classification judgment section 194 judges any of the video pack 88, the audio pack 91, the sub-picture pack 90 and the NV pack 86 according to the content of the 4-byte data supplied next to the address of the pack data supplied from the memory I/F section 191 in accordance with the pack header end address supplied from the pack header end address calculation section 193, and outputs the judged result to the packet data transmit control section 195.

The packet data transmit control section 195 judges the destination and the packet start address in response to the pack header end address supplied from the pack header end address calculation section 193 and the judged result of the pack classification supplied from the pack classification judgment section 194, and further judges the packet length in the packet header 121 of the pack data supplied. Further, the packet data transmit control section 195 supplies a signal indicating the destination as a transmit control signal to the decoder I/F section 196, and supplies the packet end address from the packet start address to the memory I/F section 191.

The decoder I/F section 196 outputs the video data, the audio data, the sub-picture data as packet data including the packet header 121 supplied under the control of the packet data transmit control section 195 from the memory I/F section 191 to corresponding decoder sections 58, 60, 62, or outputs navigation data and computer data as packet data to the data RAM section 56.

The packet transmit dispose section 200 will be explained.

The pack data read from the data RAM section 56 is supplied to the stuffing length detect section 192, the pack classification judgment section 194, the packet data transmit control section 195 and the decoder I/F section 196 via the memory I/F section 191.

Thus, the stuffing length is detected by the stuffing length detect section 192, and the data indicating the stuffing length is output to the pack header end address calculation section 193.

The pack header end address calculation section 193 calculates the pack header end address according to the stuffing length supplied, and supplies the pack header end address to the pack classification judgment section 194 and the packet data transmit control section 195.

The pack classification judgment section 194 judges any of the NV pack 86, the video pack 88, the auto pack 91 of Dolby AC3, the audio pack 91 of linear PCM and the sub-picture pack 90 according to the content of the data of 4 to 6 bytes supplied next to the address in accordance with the supplied pack header end address, and supplies the judged result to the packet data transmit control section 195.

Specifically, when the stream ID of 1 byte indicating the private stream 2 is supplied, it is judged as the NV pack 86. The video pack 88 is judged according to the stream ID of 1 byte indicating the video stream. Any of the audio pack 91 of the Dolby AC3, the audio pack 91 and the sub-picture pack 90 is judged according to the stream ID of one byte indicating the private stream 1.

When the stream ID is the private stream 1, the audio pack of the linear PCM, the audio pack of the Dolby AC3 or the sub-picture stream is judged according to the substream ID continued to the packet header 121, and its stream number is judged.

The packet data transmit control section 195 judges the destination and the packet start address in response to the judged result of the supplied pack classification and the pack header end address, and further judges the packet length in the packet header 121 of the supplied pack data. Thus, the packet data transmit control section 195 supplies the signal indicating the destination as the transmit control signal to the decoder I/F section 196, and supplies the packet end address from the packet start address to the memory I/F section 191.

Therefore, the substantially valid packet data is supplied from the memory I/F section 191 to the decoder I/F section 196 via the data bus, and then transferred to the decoders 58, 60, 62 or the data RAM section 56 as the destination.

Specifically, the packet data of the video data is transferred to the video decoder section 58, the packet data of the audio data is transferred to the audio decoder section 60, and the packet data of the sub-picture data is transferred to the sub-picture decoder section 62.

In this case, since the pack data has a constant length, the storage state of the data RAM section 56 and hence the start address has a constant interval. Accordingly, the head of the pack data in the data RAM section 56 is always stored by the address of the same interval, and the pack data is not address managed, but only the pack number may be managed.

While classifying the data, when the PCI data and the DSI data of the NV data indicate the reproduced position of the video data, the NV data is stored in the data RAM section 56 rather than being transferred to the decoder. The NV data is referred to according to the system CPU section 50, if necessary, and utilized when the specific reproduction of the video data is executed. In this case, the PCI data and the DSI data are identified according to the substream ID imparted to the PCI data and the DSI data.

When the reproduction of one cell is finished, cell information to be reproduced next is obtained from the reproducing sequence information in the program chain data, and similarly continuously reproduced.

The above-described sub-picture decoder section 62 shown in FIG. 1 has a decoder 62B for decoding the sub-picture data supplied from the system processor section 54, and a highlight processor section 62C for highlighting the sub-picture data after decoding by the decoder 62B. The highlight processor section 62C highlights in response to the X-, Y-coordinate values indicating the rectangular area for displaying the selection item as highlight information supplied from the system CPU section 50, color code, highlight color/contrast value.

The decoder 62B expands the pixel data compressed by the run-length compression as the sub-picture data in response to the highlight pixel, the pattern pixel, the background pixel, etc.

The highlight processor section 62C is composed of, as shown in FIG. 72, a highlight area setting/judgment section 180, a default color/contrast setter 181, a highlight color/contrast setter 182, a selector 183 and a color pallet register 184.

The highlight area setting/judgment section 180 judges the designated highlight area according to the X-, Y-coordinate values indicating the rectangular area (designated highlight area) representing an selection item by the system CPU section 50 and the X-, Y-coordinate values obtained by raster scanning, i.e., pixel data X-, Y-coordinate values, outputs a switching signal indicating a highlight zone, and supplies-its output to the selector 183.

The default color/contrast setter 181 sets the display color and the contrast of the default of each pixel included in the sub-picture data.

The highlight color/contrast setter 182 sets the highlight color and contrast values by the system CPU 50.

The selector 183 selectively outputs the display color and contrast of the default from the default color/contrast setter 181 to the color pallet register 184, or outputs the color and the contrast at the time of the highlight from the highlight color/contrast setter 182 to the color pallet register 184.

The color pallet register 184 outputs the signal responsive to the color and the contrast supplied from the selector 183.

Therefore, when the highlight area is judged by the highlight area setting/judgment section 180, the selector 183 receives the display color and the contrast of the default of each pixel data from the default color/contrast setter 181, outputs them to the color pallet register 184, and outputs the color signal from the color pallet register 184 to a D/A and data reproducing section 64.

When the highlight area is judged by the highlight area setting/judgment section 180, the selector 183 receives the display color and the contrast at the time of the highlight of each pixel data from the highlight color/contrast setter 182, outputs them to the color pallet register 184, and outputs the color signal from the color pallet register 184 to the D/A and data reproducing section 64.

The reproducing process of the menu will be explained by using an optical disk 10 having a logic format shown in FIGS. 6 to 66 by referring to FIG. 1. In FIG. 1, arrows with solid lines between the blocks indicate data buses, and arrows with broken lines indicate a control bus.

In the optical disk apparatus shown in FIG. 1, when a power source is turned on and the optical disk 10 is inserted, the system CPU 50 reads the initial program from the system ROM and RAM section 52, and operates the disk drive section 30. Accordingly, the disk drive section 30 starts reading from a lead-in area 27, and reads volume and file structure area for specifying the volume and the file structure according to ISO-9660 subsequently to the lead-in area 27. Specifically, the system CPU 50 applies a read command to the disk drive section 30 to read the volume and the file structure area 70 recorded at a predetermined position of the optical disk 10 set to the disk drive section 30, reads the contents of the volume and file structure area 70, and temporarily stores the contents in the data RAM section 56 via the system processor section 56. The system CPU 50 extracts information such as recording position, recording capacity, size, etc., and management information as necessary information for the other management via a pass table and directory record stored in the data RAM section 56, transfers and stores them at a predetermined position the system ROM and RAM section 52.

Then, the system CPU section 50 acquires a video manager 71 composed of a plurality of files starting from "0" of the file number by referring to the information of the recording position and the recording capacity of each file from the system ROM and RAM section 52. Specifically, the system CPU section 50 applies the read command to the disk drive section 30 by referring to the information of the recording position and the recording capacity of each file obtained from the system ROM and RAM section 52, obtains the position and the size of the plurality files for composing the video manager 71 present on a route directory, reads the video manager 71, and stores them in the data RAM section 56 via the system processor section 54.

Figure 73:
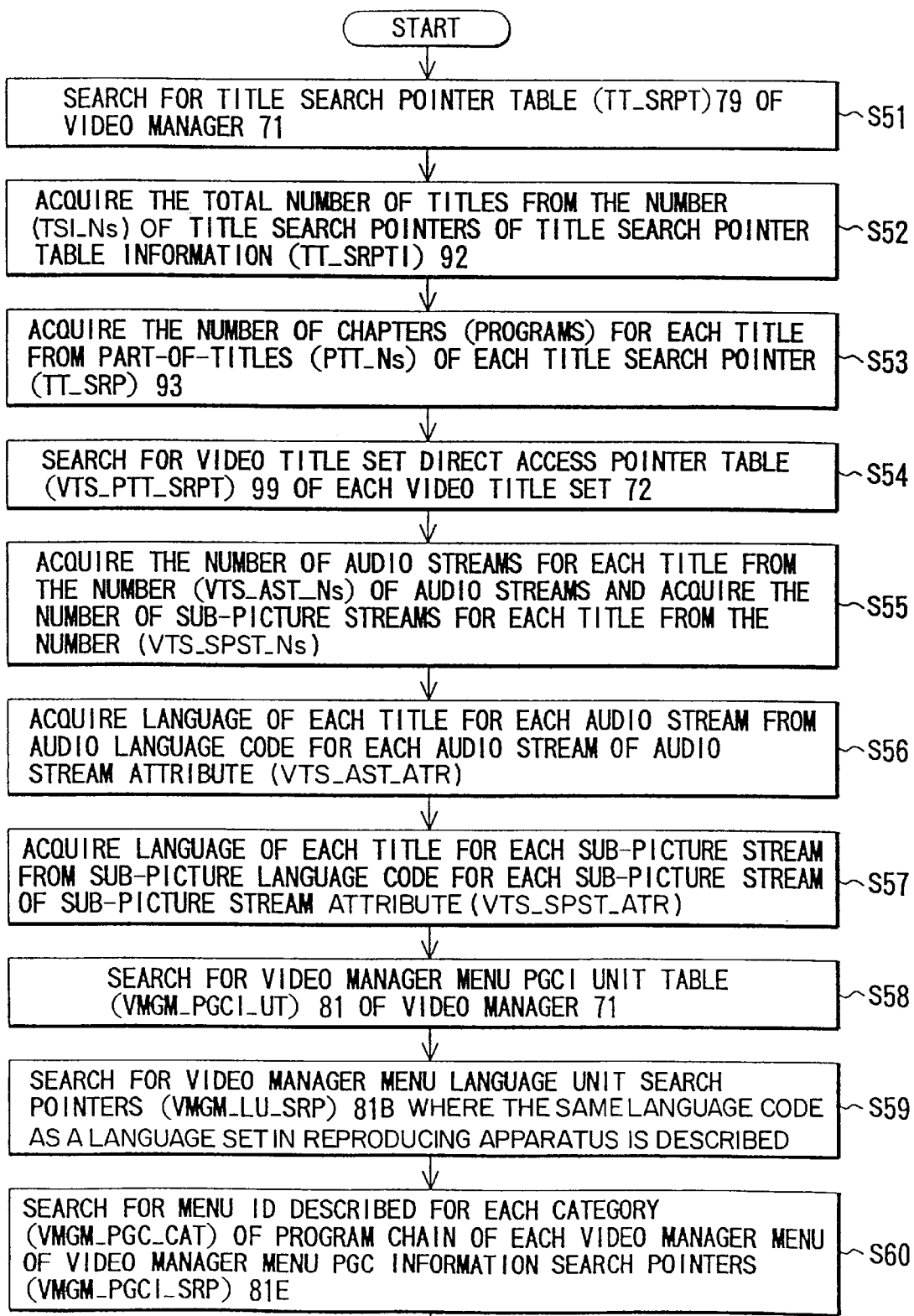

Thereafter, as shown in FIGS. 73 and 74, the system CPU section 50 determines the number of titles in the optical disk 10, the number of chapters of each title (number of programs), the number of audio streams of each title, the language of the audio stream, the number of sub-picture streams of each title and the language of the sub-picture stream.

Specifically, the system CPU section 50 searches the title search pointer table (TT_SRPT) 79 of the second table of the video manager 71 (Step S51). The system CPU 50 acquires the total number of the titles in the optical disk 10 according to the number of the title search pointers described in the information of the title search pointer table (TT_SRPTI) 92 in the title search pointer table (TT_SRPT) 79 (Step S52).

The system CPU acquires the number of chapters (number of programs) of each title according to the number of part-of-titles (PTT_Ns) described in each title search pointer (TT_SRP) 93 in the title search pointer table (TT_SRPT) 79 (Step S53).

The system CPU 50 searches for the video title set part-of-title search pointer table (VTS_PTT_SRPT) 99 in the video title set information (VTSI) 94 of the first table of the video title set 72 described in each title search pointer (TT_SRP) 93 (Step S54). The system CPU 50 acquires the number of audio streams of each title according to the number of the audio streams described in the table (VTS_PTT_SRPT) 99 of each video title set 72, and acquires the number of the sub-picture streams of each title according to the number of the sub-picture streams (VTS_SPST_Ns) (Step S55).

The system CPU 50 acquires the language of the audio streams of each title according to the language code of the auto of each audio stream described in the audio stream attribute (VTS_AST_ATR) of the table (VTS_PTT_SRPT) 99 of each video title set 72, and acquires the language of the audio streams of each title (Step S56).

The system CPU section 50 acquires the sub-picture streams of each title according to the language code of the sub-picture of the sub-picture streams described in the sub-picture stream attribute (VTS_SPST_ATR) of the table (VTS_PTT_SRPT) 99 of each video title set 72 (Step S57). The system CPU section 50 also searches the video manager menu PGCI unit table (VMGM_PGCI_UT) 81 of the fourth table in the video manager information (VMGM) 75 of the video manager (Step S58). By this search, the video manager menu PGCI unit search pointer (VMGM_LU_SRP) 81B describing the same language code as the language set to the reproducing apparatus is located (Step S59).

When the video manager menu PGCI unit search pointer (VMGM_LU_SRP) 81B describing the same language code is searched, the system CPU section 50 searches the menu ID described together with the category (VMGM_PGC_CAT) of the program chain of each video manager menu of the video manager menu PGC information search pointer (VMGM PGCI_SRP) 81E in the video manager menu language unit (VMGM_LU) 81C corresponding to the pointer (VMGM_LU_SRP) 81B (Step S60), judges whether or not the main menu as the route menu by the search exists, and judges whether or not the title menu (video title set menu) exists (Step S61).

When the main menu exists, the system CPU section 50 reads the contents of the corresponding VMGM program chain information (VMGM_PGCI SA) by the start address of the VMGM program chain information (VMGM_PGCI) 81F described in one of the video manager menu PGC information search pointers (VMGM_PGCI_SRP) 81E describing the menu ID of the route menu. The system CPU then stores the start address (C_FVOBU_SA) of the head video object unit (VOBU) 85 described in the VMGM program chain information (VMGM_PGCI) 81F in the memory table 56A as the start address of the main menu (Step S62).

When the title menu exists, the system CPU section 50 reads the contents of the corresponding VMGM program chain information (VMGM_PGCI) 81F according to the parameter (VMGM_PGCI_SA) by the start address of the VMGM program chain information (VMGM_PGCI) 81F described in one of the video manager menu PGC information search pointer (VMGM_PGCI_SRP) 81E describing the menu ID of the title menu. The CPU section so then stores the start address (C_FVOBU_SA) of the head video object chain information (VOBU) 85 described in the corresponding VMGM program chain information (VMGM_PGCI) 81F in the memory table 56A as the start address of the title menu (Step S63).

The system CPU section 50 searches the video title set menu PGCI unit table (VTSM_PGCI UT) 111 in the video title set information (VTSI) 94 of the first table of each video title set 72 (Step S64). By this search, the video title set menu PGCI unit search pointer (VTSM_LU_SRP) 111B identifies the same language code as the language set to the reproducing apparatus (Step S65).

When the video title set menu PGCI unit search pointer (VTSM_LU_SRP) 111B describing the same language code is searched, the system CPU section 50 searches the menu ID described together with the category (VTSM_PGC_CAT) of the program chain of each video title set menu of the video title set menu PGC information search pointer (VTSM_PGCI_SRP) 111E in the video title set menu language unit (VTSM_LU) 111C corresponding to the pointer (VTSM_LU_SRP) 111B (Step S66). The CPU then judges whether or not the sub-picture menu, the audio menu, the angle menu, the chapter (program) menu exist by this search, and judges whether or not the title menu exists (Step S67).

When these menus exist, the system CPU section 50 reads the contents of the corresponding VTSM program chain information (VTSM_PGCI) 111F by the start address by the parameter (VTSM_PGCI_SA) of the VTSM program chain information (VTSM_PGCI) 111F described in one of the video title set menu PGC information search pointers (VTSM_PGCI SRP) 111E describing the menu ID, and stores the start address (C_FVOBU_SA) of the head video object unit (VOBU) 85 described in the VTSM program chain information (VTSM_PGCI) 111F in the memory table 56A as the start address of the corresponding menu (Step S68).

As described above, the start addresses of the sub-picture menu, the audio menu, the angle menu, and the chapter (program) menu of each video title set 72 are stored in the memory table 56A.

As a result, as shown in FIG. 75, the start address corresponding to each menu corresponding to the language set to the reproducing apparatus is stored in the memory table 56A.

Therefore, when the menu key 5k of the remote controller 5 is closed, the system CPU section 50 judges the reproduction of the main menu, and judges whether or not the main menu exists. If the main menu is judged to exist, the system CPU section 50 reads the start address (C_FVOBU_SA) of the head video object unit (VOBU) 85 stored corresponding to the main menu of the memory table 56A, reads the data of the main menu corresponding to the address from the area corresponding to the video object set (VMGM_VOBS) 76 for the video manager menu (VMGM) 75 of the optical disk 10, and reproduces the main menu. The reproduced data is input to the data RAM section 56 via the system processor section 54. The data cell 84 is applied to the video decoder section 58, the audio decoder section 60 and the sub-picture decoder section 62 based on the reproducing time information, decoded, signal-converted by the D/A and data reproducing section 64, and the image of the main menu as shown in FIG. 76 on the monitor 6, and the voice is reproduced from the speaker 8.

When the title key 51 of the remote controller 5 is closed, or the "1" key corresponding to the title is closed after the main menu is reproduced or during normal reproducing, the system CPU section 50 judges the reproduction of the title menu to determine whether or not the title menu exists. As a result of the judgment, if the presence of the title menu is found, the system CPU section 50 reads the start address (C_FVOBU_SA) of the head video object unit (VOBU) 85 stored corresponding to the title menu of the memory table 56A, reads the data of the title menu corresponding to the address from the area corresponding to the video object set (VMGM_VOBS) 76 for the video manager menu (VMGM) 75 of the optical disk 10, and reproduces it. The reproduced data is input to the data RAM section 56 via the system processor section 54. The data cell 84 is applied to the video decoder section 58, the audio decoder section 60 and the sub-picture decoder section 62 based on the reproducing time information, decoded, signal-converted by the D/A and data reproducing section 64, and the image of the title menu as shown in FIG. 77A on the monitor 6 and the voice is reproduced from the speaker 8.

When the "2" key corresponding to the chapter is closed in the state that the main menu is reproduced or the title is selected by the normal reproduction, the system CPU section 50 judges the reproduction of the chapter menu corresponding to the title selected at present to determine whether or not the chapter menu exists. As the result of the judgment, if the presence of the chapter menu is found, the system CPU section 50 reads the start address (C_FVOBU_SA) of the head video object unit (VOBU) 84 stored corresponding to the chapter menu of the memory table 56A, reads the data of the chapter menu corresponding to the address from the area corresponding to the video object set (VTSM_VOBS) 96 for the video title set menu (VTSM) of the optical disk 10, and reproduces it. The reproduced data is input to the data RAM section 56 via the system processor section 54. The data cell 84 is applied to the video decoder section 58, the audio decoder section 60 and the sub-picture decoder section 62 based on the reproducing time information, decoded, and signal-converted by the D/A and data reproducing section 64, and the image of the chapter menu is reproduced as shown in FIG. 77B on the monitor 6, and the voice is reproduced from the speaker 8.

When the "3" key corresponding to the audio is closed in the state that the main menu is reproduced or the title is selected by the normal reproduction, the system CPU section 50 judges the reproduction of the audio menu corresponding to the title selected at present to determine whether or not the audio menu exists. As the result of the judgment, if the presence-of the audio menu is found, the system CPU section 50 reads the start address (C_FVOBU_SA) of the head video object unit (VOBU) 84 stored corresponding to the audio menu of the memory table 56A, reads the data of the audio menu corresponding to the address from the area corresponding to the video object set (VTSM_VOBS) 96 for the video title set menu (VTSM) of the optical disk 10, and reproduces it. The reproduced data is input to the data RAM section 56 via the system processor section 54. The data cell 84 is applied to the video decoder section 58, the audio decoder section 60 and the sub-picture decoder section 62 based on the reproducing time information, decoded, and signal-converted by the D/A and data reproducing section 64, and the image of the chapter menu is reproduced as shown in FIG. 77C on the monitor 6, and the voice is reproduced from the speaker 8.

When the "4" key corresponding to the sub-picture is closed in the state that the main menu is reproduced or the title is selected by the normal reproduction, the system CPU section 50 judges the reproduction of the sub-picture menu corresponding to the title selected at present to determine whether or not the sub-picture menu exists. As the result of the judgment, if the presence of the sub-picture menu is found, the system CPU section 50 reads the start address (C_FVOBU_SA) of the head video object unit (VOBU) 84 stored corresponding to the sub-picture menu of the memory table 56A, reads the data of the sub-picture menu corresponding to the address from the area corresponding to the video object set (VTSM_VOBS) 96 for the video title set menu (VTSM) of the optical disk 10, and reproduces it. The reproduced data is input to the data RAM section 56 via the system processor section 54. The data cell 84 is applied to the video decoder section 58, the audio decoder section 60 and the sub-picture decoder section 62 based on the reproducing time information, decoded, and signal-converted by the D/A and data reproducing section 64, and the image of the chapter menu is reproduced as shown in FIG. 77D on the monitor 6, and the voice is reproduced from the speaker 8.

When the "5" key corresponding to the angle is closed in the state that the main menu is reproduced or the title is selected by the normal reproduction, the system CPU section 50 judges the reproduction of the angle menu corresponding to the title selected at present to determine whether or not the angle menu exists. As the result of the judgment, if the presence of the angle menu is judged, the system CPU section 50 reads the start address (C_FVOBU_SA) of the head video object unit (VOBU) 84 stored corresponding to the angle menu of the memory table 56A, reads the data of the angle menu corresponding to the address from the area corresponding to the video object set (VTSM_VOBS) 96 for the video title set menu (VTSM) of the optical disk 10, and reproduces it. The reproduced data is input to the data RAM section 56 via the system processor section 54. The data cell 84 is applied to the video decoder section 58, the audio decoder section 60 and the sub-picture decoder section 62 based on the reproducing time information, decoded, and signal-converted by the D/A and data reproducing section 64, and the image of the chapter menu is reproduced as shown in FIG. 77E on the monitor 6, and the voice is reproduced from the speaker 8.

Therefore, since the system CPU section 50 can store the position data of each acquired menu in the menu table 56A in the data RAM 56, a desired menu can be easily reproduced by using the same.

The system CPU 50 sets the parameters for reproducing the video manager menu to each video decoder section 58, each audio decoder section 60 and each sub-picture decoder section 62 based on the attribute information acquired for the number of streams of the video, the audio and the sub-picture and the attribute information for the video manager menu described in the information management table (VMGI_MAT) 78 of the video manager (VMGI) 75.

Figure 78:
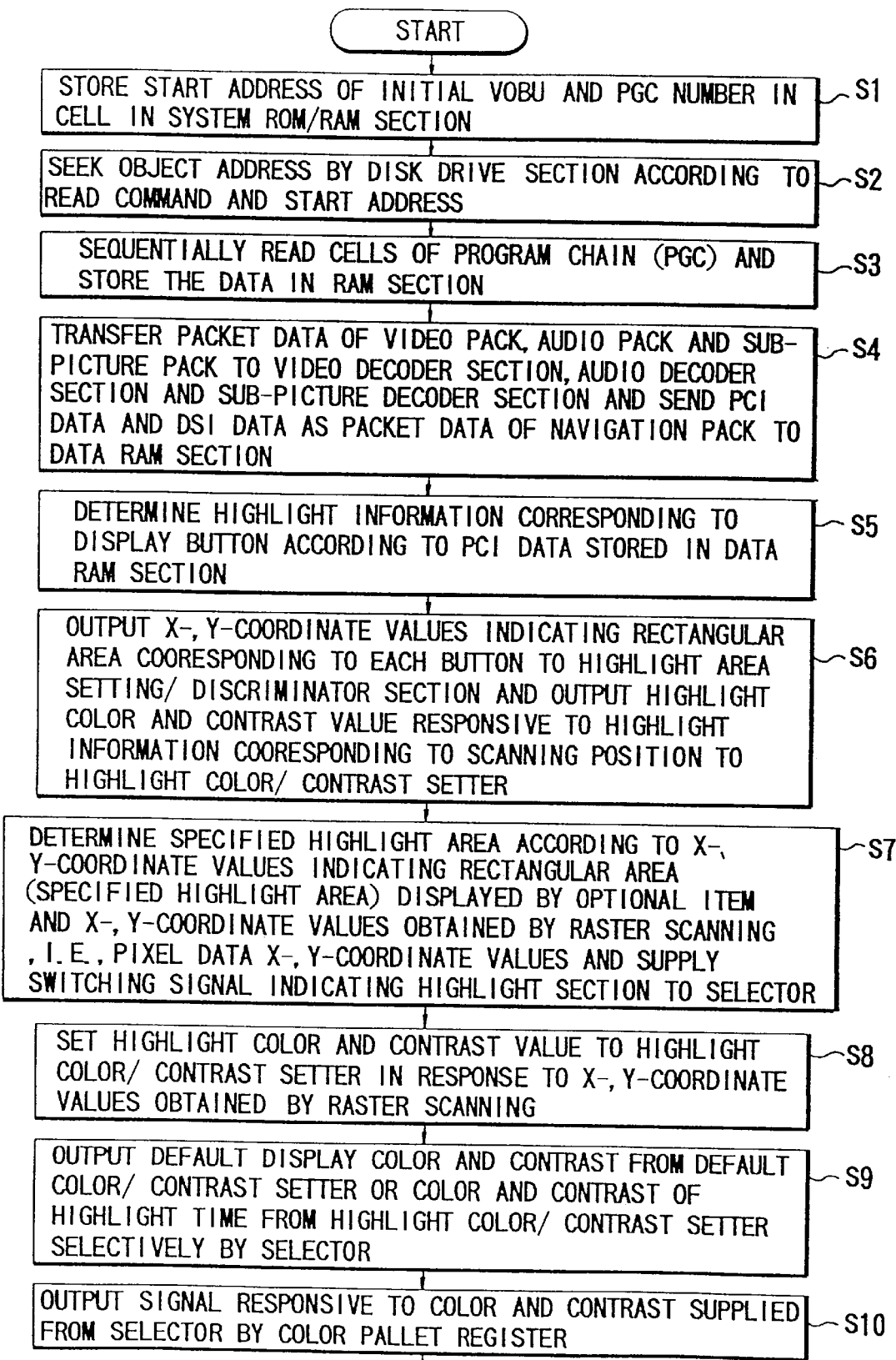
FIG. 78 shows a flowchart showing the processing sequence when the menu is reproduced.

The process of the case of reproducing the above-described menu will be described in detail by referring to the flowchart shown in FIG. 78.

The start address of the initial VOBU in the cell as the start address corresponding to the menu to be reproduced and the PGC number (i.e., the cell number) are stored in the system ROM and RAM section 52 (Step S1).

When the preparation for reading the video title set is arranged, a read command is applied from the system CPU section 50 to the disk drive section 30, and the optical disk 10 is sought by the disk drive section 30 based on the above-described start address (Step S2). The cells corresponding to the designated program chain (PGC) are sequentially read from the optical disk 10 according to the read command, and sent to the data RAM section 56 via the system CPU section 50 and the system processor section 54 (Step S3). The sent data is stored as the pack from the navigation pack 85 of the head pack of the video object unit (VOBU) 85, as shown in FIG. 8 in the data RAM section 56. Thereafter, the packet data of the video pack 88, the audio pack 91 and the sub-picture pack 90 of the video object unit (VOBU) are transferred by the packet transmit dispose section 200 to the video decoder section 58, the audio decoder section 60 and the sub-picture decoder section 62, and the PCI data and the DSI data as the packet data of the navigation pack 86 are transmitted to the data RAM section 56 (Step S4).

In this case, the system CPU section 50 judges the highlight information (the contents of FIGS. 49 to 58 described above) corresponding to the display button according to the PCI data stored in the data RAM section 56 (Step S5).

Specifically, the system CPU section 50 judges the rectangular area of the button at each button, the display color and the contrast value of the pixel data before selecting in the case that the button is the selection button, the display color and the contrast value of the pixel data after selecting, the display color and the contrast value of the pixel data before activation in the case that the button is the action button, and the display color and the contrast value of the pixel data after the activation. CPU section 50 stores this data in the data RAM section 56. As the pixel data, highlight pixels, 1 and 2 pattern pixels, and background pixel are prepared, and the corresponding display colors and the contrast values are prepared.

As described above, the system CPU section 50 outputs X- and Y-coordinate values indicating the rectangular area corresponding to each button stored in the data RAM section 56 to the highlight area setting/judgment section 180 of the highlight processor section 62C, and outputs the highlight color and the contrast value responsive to the highlight information corresponding to the scanning position to the highlight color/contrast setter 182 of the highlight processor section 62C (Step S6).

Thus, the highlight area setting/judgment section 180 judges the designated highlight area according to the X-, Y-coordinate values indicating the rectangular area (designated highlight area) displayed by the selection item by the system CPU section 50 and the X- and Y-coordinate values obtained the raster scanning (i.e., pixel data X-, Y-coordinate values), and supplies the switching signal indicating the highlight section to the selector 183 (Step S7).

The highlight color/contrast setter 182 sets the highlight color and contrast value by the system CPU section 50 in response to the X- and Y-coordinate values obtained by raster scanning (Step S8).

As described above, the selector 183 selectively outputs the display color and contrast of the default from the default color/contrast setter 181 to the color pallet register 181 in response to the switching signal from the highlight area setting/judgment section 180 or outputs the color and the contrast at the time of the highlight from the highlight color/contrast setter 182 to the color pallet register 184 (Step S9).

The color pallet register 184 outputs the signal responsive to the color and the contrast supplied from the selector 183 (Step S10).

As a result, when the highlight area is judged by the highlight area setting/judgment section 180, the selector 183 receives the display color and the contrast of the default of each pixel from the default color/contrast setter 181, outputs them to the color pallet register 184 and outputs the color signal from the color pallet register 184 to the D/A and data reproducing section 64.

When the highlight area is judged by the highlight area setting/judgment section 180, the selector 183 receives the display color and the contrast from the highlight color/contrast setter 182, outputs them to the color pallet register 184, and outputs the color signal from the color pallet register 184 to the D/A and data reproducing section 64.

As a result, contrast of the sub-picture data of the pixel data is altered in response to the highlight information. It is then supplied to the image mixing section 64A (refer to FIG. 1) in the D/A and data reproducing section 64 shown in FIG. 1.

Therefore, the video data decoded by the video decoder section 58 is supplied to the image mixing section 64A in the D/A and data reproducing section 64. The sub-picture data is decoded by the decoder 62B in the sub-picture decoder section 62, and supplied to the image mixing section 64A in the D/A and data reproducing section 64 via the highlight processor section 62C. Thus, the video data and the sub-picture data are mixed by the image mixing section 64A, and the mixing picture is displayed on the monitor section 6.

Figure 79D:
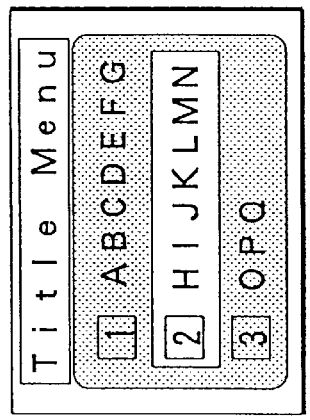
Figure 79B:
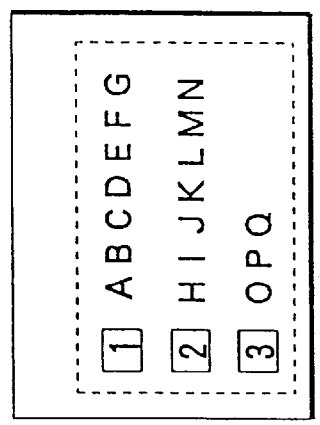
Figure 79C:
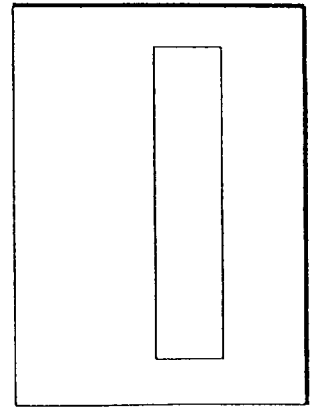
Figure 79A:
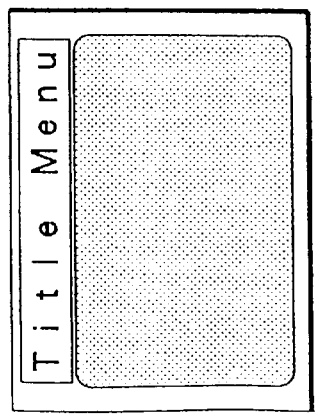

For instance, the sub-picture image formed of the button as the selection item shown in FIG. 79B is combined with the video as the background image shown in FIG. 79A to the image highlighted according to the highlight information indicated by FIG. 79C, thereby acquiring the mixing picture indicated in FIG. 79D. In this case, the background of the selection item is displayed by blue, and the character of the selection item is displayed by black.

The audio data decoded by the audio decoder section 60 is supplied to the D/A and data reproducing section 64, and the menu or the voice corresponding to the video is reproduced from the speaker 8.

When the user selects the selection item highlight displayed by the key/display section 4 of the remote controller 5 in the menu display state, the system CPU section 50 outputs the corresponding highlight color and contrast value after selecting to the highlight color/contrast setter 182 of the highlight processor section 62C. As a result, the highlight color and contrast of the selection item are altered. In this case, the background of the selection item is displayed in red, and the character of the selection item is displayed in white.

The other example of the menu image will be explained by referring to FIGS. 80A to 80E.

Specifically, when the video data shown by in FIG. 80A and the sub-picture data shown by in FIG. 80B are supplied, the menu image before selecting is displayed as shown in FIG. 80C so that the characters of the selection item for "1" and "2" are display with black and the background is displayed gray.

Thereafter, when the selection item of "1" is selected by the key/display section 4 or the remote controller 5, the system CPU 50 sets the X-, Y-coordinates indicating the rectangular area for the selection item of "1" read from the PCI data and the altered content (highlight information) of the color or contrast of the pixel to the highlight processor section 62C.

As described above, the sub-picture data decoded by the decoder 62B of the sub-picture decoder section 62 is altered at the highlight color and contrast value corresponding to the selection item of "1" by the highlight processor 62C, and supplied to the image mixing section 64A in the D/A and data reproducing section 64. As a result, the video data and the sub-picture data are mixed by the image mixing section 64A, and the mixed image (i.e., the display content of the selection item) of "1" of the selection item is altered as shown in FIG. 80D to the menu image, the altered image is displayed on the monitor section 6. For instance, the part of the character of the selection item of "1" is displayed with white and the background is displayed with red.

Thereafter, when the selection item of "2" is selected by the key/display section 4 or the remote controller 5, the system CPU 50 sets the X-, Y-coordinates indicating the rectangular area for the selection item of "1" read from the PCI data and the altered content (highlight information) of the color or contrast of the pixel to the highlight processor section 62C.

As described above, the sub-picture data decoded by the decoder 62B of the sub-picture decoder section 62 is altered at the highlight color and contrast value corresponding to the selection item of "1" by the highlight processor 62C, and supplied to the image mixing section 64A in the D/A and data reproducing section 64. As a result, the video data and the sub-picture data are mixed by the image mixing section 64A, and the mixed image (i.e., the display content of the selection item of "2" of the selection item) is altered as shown in FIG. 80E to the menu image, and the altered image is displayed on the monitor section 6. For instance, the part of the character of the selection item of "2" is displayed with white and the background is displayed with red.

As described above, various menu screens can be simply altered without reading new video image.

The selection item position information is simply determined at the positional relationship between the video and the sub-picture by designating it corresponding to the display coordinate system of the video.

Figure 81B:
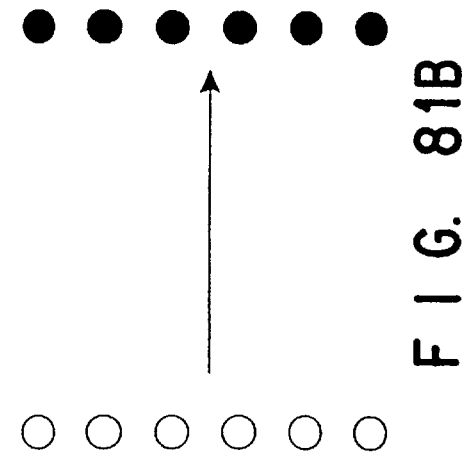
FIGS. 81A and 81B are views showing a pattern pixel and highlight pixel in sub-picture data.
Figure 81A:
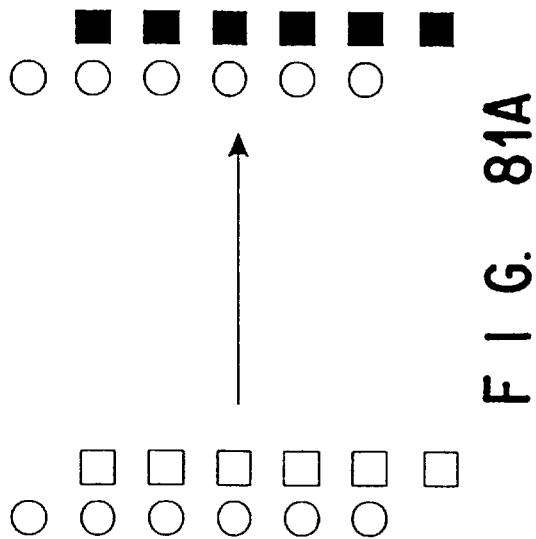

An embodiment illustrating the relation of the highlight information as the sub-picture data of the selection item and the control data is described using FIGS. 81A and 81B.

In-the drawings, the pixel surrounded by "0" is formed by using the pattern pixel, and the pixel represented by "0" is formed by using the highlight pixel 1.

FIG. 81A illustrates the use of the pattern pixel of the sub-picture data and the highlight pixel used as the shade of the pattern pixel. In this case, after the control data is selected, the display color information is altered in real time by setting the color of the highlight pixel 1 to a new color and by setting the pixel color and the contrast, leaving non-selected portions with the present color as is. Thus, the selected selection item is altered to the shade of different color from the other selection item in real time.

FIG. 81B shows the case that the sub-picture data is formed only from the pattern pixel. In this case, after the highlight information is selected, the display color information is used to set the color of the pattern pixel to a new color and to set the pixel contrast, leaving the information to the present color as is. Thus, the color of the selected selection item itself is altered to a color, which is different from the other selection item.

In addition, the contrast of the background pixel in the selection item area is set to 100% of the sub-picture data at the time of selecting, and to 0% at the time of inhibiting to select. Thus, at the time of selecting, the control for varying the entire color of the selection area, and hence various format, can be employed real time by using the structure of the sub-picture data and the content of the highlight information.

For-example, when the above-descried identified cell classification is a menu, it is not automatically transferred to next cell reproduction, but in the final frame display state at the time of finishing the cell reproduction, it becomes the standby state.

Therefore, when the cell for the menu is reproduced, still picture state is obtained in the cell final display state. Since the NV pack 88 is always inserted at a constant unit of the video data in the cell, the highlight information of the above-mentioned menu is stored in the data RAM section 56.

The system CPU section 50 becomes a standby state of user vent (key input, etc.) when the cell reproduction is finished, the process of the selection item for the user selection of the menu is executed by referring to the information regarding the menu (highlight information from the PCI data stored in the data RAM section 56).

With reference to FIG. 1, a description will now be given of the operation for reproducing movie data from the optical disk 10 which has the logic format illustrated in FIGS. 6 through 66 under the condition that the title, etc. are selected through the above-described menus.

When the playback key 4c on the key/display section 4 or the playback key 5d on the remote controller 5 is manipulated while the desired title is selected, the system CPU section 50 acquires the last address of the title search pointer table (TT_SRPT) 79 from the title search pointer table information (TT_SRPTI) 92 and acquires the video title set number (VTSN), program chain number (PGCN) and the start address (VTS_SA) of the video title set, which correspond to the input number from the title search pointers (TT_SRP) 93 corresponding to the input number from the key/display section 4 or the title number selected by the remote controller 5. When there is only one title set, a single title search pointer (TT_SRP) 93 is searched, regardless of the presence of the input number from the key/display section 4 or the selection of the title number by the remote controller 5, to acquire the start address (VTS_SA) of that title set. The system CPU section 50 acquires the target title set from the start address (VTS_SA) of the title set.

Next, from the start address (VTS_SA) of the video title set 72 of FIG. 13, the video title set information (VTSI) 94 about the title set is obtained as shown in FIG. 20. The end address (VTSI_MAT_EA) of the video title set information management table (VTSI_MAT) 98 of FIG. 21 is acquired from the management table (VTSI_MAT) 98 of the video title set information (VTSI) 94. At the same time, each section of the reproducing unit shown in FIG. 1 is set on the basis of the number of audio streams and the number of sub-picture data streams (VTS_AST_Ns, VTS_SPST_Ns) and the attribute information on the video, audio, and sub-picture data (VTS, V_ATR, VTS_A_ATR, VTS_SPST_ATR).

When a menu (VTSM) for a video title set (VTS) has a simple structure, the start address (VTSM_VOB_SA) of a video object set (VTSM_VOB) for menus for a video title set is acquired from the video title set information management table (VTSI_MAT) 98 of FIG. 21. On the basis of the video object set (VTSM_VOB) 95, a menu for the video title set is displayed. When an video object set (VTSTT_VOBS) 96 for titles (VTST) in the title set (VTS) is simply reproduced without selecting a program chain (PGC) with reference to the menu, the video object set 96 is reproduced on the basis of the start address (VTSTT_VOB_SA) shown in FIG. 21.

When a program chain is specified from the key/display section 4 or the remote controller 5, the desired program chain 87 is retrieved in the following procedure. The retrieval of a program chain 87 is not limited to a program chain 87 for titles in the video title set. The same procedure applies to the retrieval of a program chain 87 for a relatively complex menu made up of program chains 87. The start address of the program chain information table (VTS_PGCIT) 100 in the video title set (VTS) of FIG. 21 written in the management table (VTSI_MAT) 98 of the video title set information (VTSI) 94 is acquired, and the information (VTS_PGCIT_I) 102 in the VTS program chain information table 100 of FIG. 24 is read. From the information (VTS_PGCIT_I) 104, the number of program chains (VTS_PGC_Ns) and the end address (VTS_PGCIT_EA) of the table 100 shown in FIG. 25 are obtained.

When the number of a program chain 87 is specified from the key/display section 4 or the remote controller 5, the category of the program chain 87 and the start address of the VTS_PGC information 104 corresponding to the search pointer (VTS_PGCIT_SRP) 103 shown in FIG. 26 are acquired from the VTS_PGCIT search pointer (VTS_PGCIT_SRP) 103 corresponding to the number shown in FIG. 24. On the basis of the start address (VTS_PGCI_SA), the program chain general information (PGC_GI) of FIG. 27 is read out. According to the general information (PGC_GI) 105, the category and playback time of the program chain (PGC) (PGC_CAT, PGC_PB_TIME) are obtained and further the start addresses (C_PBIT_SA, C_POSIT_SA) of the cell playback information table (C_PBIT) and cell position information table (C_POSIT) 108 contained in the general information (PGC_GI) are acquired. From the start address (C_POSIT_SA), the video object identifier (C_VOB_IDN) and cell identifier (C_IDN) are acquired as the cell position information (C_POSI) of FIG. 36 via the cell position information tab 6 (C_POSIT) of FIG. 35.

Furthermore, from the start address (C_PBIT_SA), the cell playback information (C_PBI) of FIG. 33 is obtained. The start address (C_FVOBU_SA) of the first VOBU 85 and the start address (C_LVOBU_SA) of the last VOBU in the cell of FIG. 34 contained in the playback information (C_PBI) are acquired. Then, the target cell is retrieved. In the playback of cells, referring to the program map of FIG. 31 in the PGC program map (PGC_PGMAP) 106 of FIG. 27, playback cells 84 are determined one after another. The data cells of program chains thus determined are read one after another from the video object and inputted to the data RAM section 56 via the system processor section 54. On the basis of the playback time information, the data cells 84 are supplied to the video decoder section 58, audio decoder section 60, and sub-picture decoder section 62, which decode them. The decoded signals are subjected to signal conversion at the D/A and data-reproducing section 64 and an image is reproduced at the monitor section 6 while sound is simultaneously reproduced at the speaker sections 8.

Furthermore, a normal playback and high-speed search of the video data using a navigation pack 86 will be described in detail with reference to a flowchart.

Figure 83:
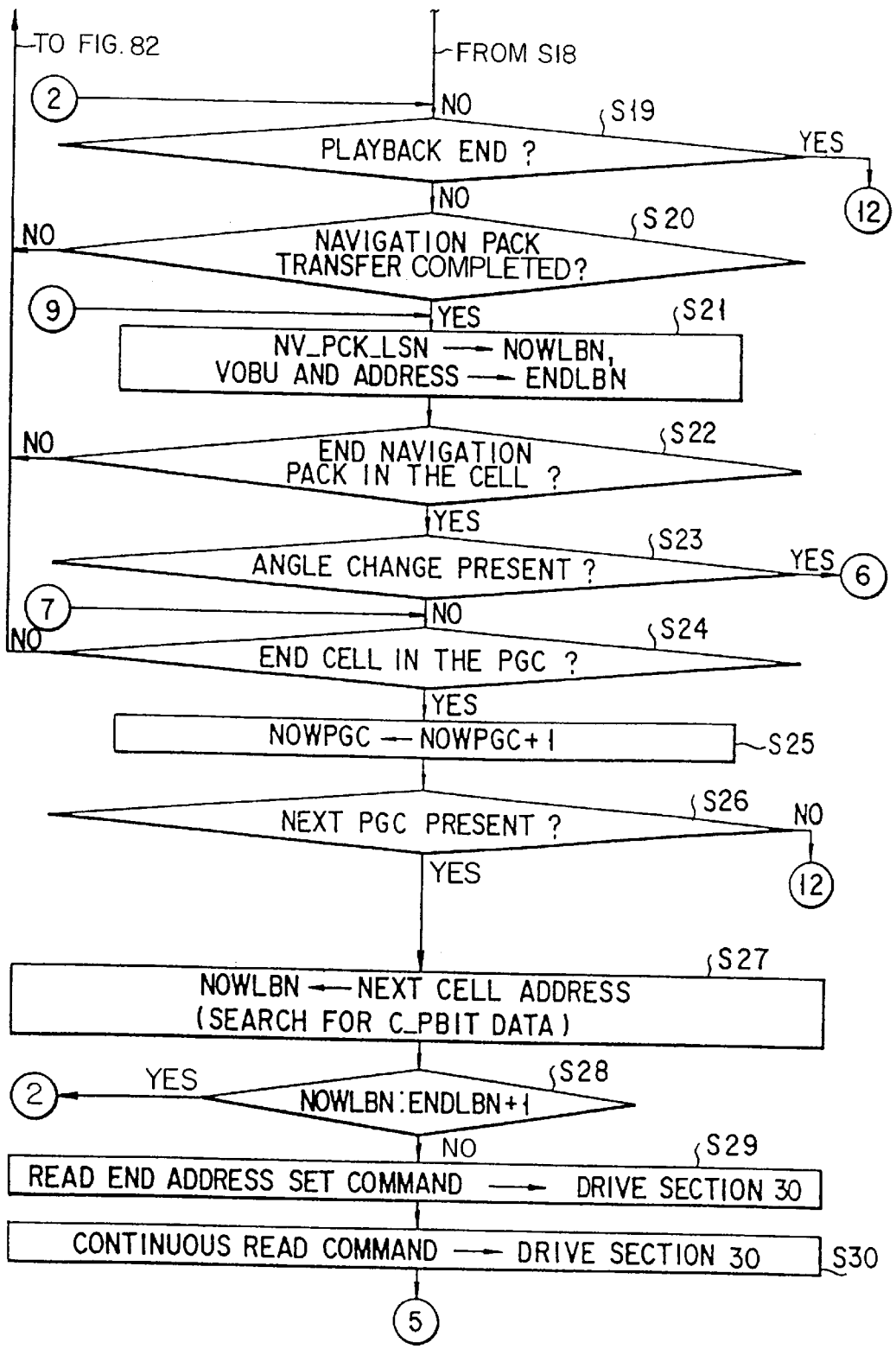

When a normal playback of video data is started as shown in FIGS. 82 and 83, the video manager information (VMGI) 75, is retrieved by the system CPU section 50 and stored in the system ROM/RAM section 52 after the start-up at step S11, as explained earlier. On the basis of the video manager information (VMGI) 75, the video title set information (VTSI) 94 on the video title set (VTS) 72 is read and the video title set menu is simultaneously displayed on the monitor section 6, as mentioned above, using the video object set (VTSM_VOBS) 95. On the basis of the display, as shown in step S13, the user selects a title set 72 to be reproduced. When a title 72 is selected using the key/display section 4 or the remote controller 5, as shown in step S14, the data in the cell playback information table (C_PBIT) 107 of FIGS. 27, 33 and 34 is read by the system CPU section 50 from the program chain information table (VTS_PGCIT) 100 of FIG. 24 in the selected title set 72. The read-out data is stored in the system ROM/RAM section 52. According to the playback conditions, the system CPU section 50 determines a program chain number (VTS_PGC_Ns), angle number (ANGNs), audio stream number, and sub-picture stream number using the aforementioned menus. For example, the eleventh boxing match for a world championship is selected as a title for a program chain and it is determined that Japanese subtitles are displayed as sub-pictures with English narration. The user selects an angle so that a match between the champion and the opponent may be viewed impressively. The determined sub-picture number and audio stream number are set in the register of the system processor section 54 as shown in step S16. Similarly, the playback start time is set in the system time clock in each of the system processor section 54, video decoder 58, audio decoder 60, and sub-picture decoder 62. The start address of the first VOBU in a cell and PGC number, or cell number, are stored in the system ROM/RAM section 52.

As shown in step S17, at the time when a preparation to read a video title set has been made, the system CPU section 50 gives a read command to the disk drive section 30, which searches the optical disk 10 on the basis of the above start address and PGC number. By the read command, the cells 84 related to the specified program chain (PGC) are read one after another from the optical disk 10, and are transferred to the data RAM section 56 via the system CPU section 50 and system processing section 54. The transferred cell data includes a navigation pack 86, which is, as shown in FIG. 8, the head pack of the video object unit (VOBU) 85. The navigation pack 86 is stored into the data RAM 56. Thereafter, the video pack 88, audio pack 91, and sub-picture pack 90 in the video object unit (VOBU) are distributed to the video decoder section 58, audio decoder section 60, and sub-picture decoder section 62, respectively. The individual decoders decode the packs and supply the resulting signals to the D/A and data-reproducing section 64. As a result, a video signal is sent to the monitor 6 and an audio signal is transmitted to the speaker 8, thereby starting the display of images with sub-pictures. At the same time, the reproduction of sound is started.

If a key input is supplied from the key/display section 4 or the remote controller 5 during the video and audio reproduction, the key data acquired is stored into the system RAM/ROM section 52. If there is no key input from the section 4, it is determined in step S19 whether or not a play-back end message has been supplied from the drive section 30. If the message has been supplied, it is determined whether or not a navigation pack 86 has been transferred to the system ROM/RAM section 52. If the navigation pack 86 is determined to have been transferred to the section 52 (step S20), the logical sector number (NV_PCK_LSN) in the navigation pack 86 is stored as current logical block number (NOWLBN) into the system RAM/ROM section 52 in step S21.

After the NV pack has been transferred, it is determined whether the NV pack is the last one in the cell 84 (step S22). More precisely, in step S22, it is determined whether or not the NV pack is the last navigation pack 86 in the cell 84. This is effected by comparing the start address (C_LVOBU_SA) of the cell playback table (C_PBI) 107 with the address (V_PCK_LBN) of the navigation pack 86. If the NV pack 86 is not the last one in the cell 84, control will return to step S18. If the NV pack 86 is the last one in the cell 84, control goes to step S23. In step S23 it is verified whether there is an angle change. An angle change is judged on the basis of whether an angle change is inputted from the key/display section 4 or the remote controller 5 to the system CPU section 50. If there is no angle change, it will be verified whether it is the end cell of the program chain (PGC) to which the cell 84 belongs (step S24). The verification is effected on the basis of whether the cell 84 shown in FIGS. 27 and 33 is the end cell in the cell playback information table (C_PBIT) 107. Namely, the verification is achieved on the basis of the number of cells 84 constituting the program chain and the identification number of the reproduced cell. If the cell does not correspond to the end cell of the program chain (PGC), control will be returned to step S19.

If the cell 84 is the end cell of the program chain (PGC), it will be determined that the program chain has finished and the next program chain (PGC) will be specified. Except for special cases, the program chains are reproduced in the sequence of their numbers, so that number of a program chain to be reproduced next may be determined by adding 1 to the number of the program chain that has been reproduced. Whether there is a program chain whose program number is the set program chain number is verified at step S26. If there is no program chain to be reproduced next, control will be passed to the flow for the playback end procedure shown in FIG. 84 explained later. If the set program chain is present, the address of the cell in the program chain that has been set again (i.e., the start address (C_FVOBU_SA) of C_FVOBU in the cell playback information (C_PBI) 107 of FIG. 34) is obtained as the present logical block number, as shown in step S27. As shown in step S28, it is verified whether the start address (C_FVOBU_SA) is equal to the address obtained by adding 1 to the end address (ENDLBN) of the cell 84 in the preceding program chain already reproduced. If they are equal to each other, the playback of cells having consecutive addresses and control will return to step S19. If those addresses are not equal, this means that addresses of the cells are not consecutive. In this case in step S29, the system CPU section 50 issues a read end address command and temporarily stops the reading operation of the disk drive section 30. The read end address command designates the end address of the current video object unit. Thereafter, in step S30, the system CPU section 50 gives a consecutive read command again to the disk drive section 30. Then, control return to step S18, thereby starting the retrieval of a navigation pack 86.

If a key input is supplied from the key/display section 4 or the remote controller 5 at step 18, it will be confirmed whether the key input is for fast-forward (FF), for example. If it is for fast-forward (FF), a high-speed searching process will be executed. If it is not for fast-forward, another process, or a process related to a series of video playback, such as a pause in playback or the change of audio streams, will be carried out. Then, control returns to step S19.

Figure 84:
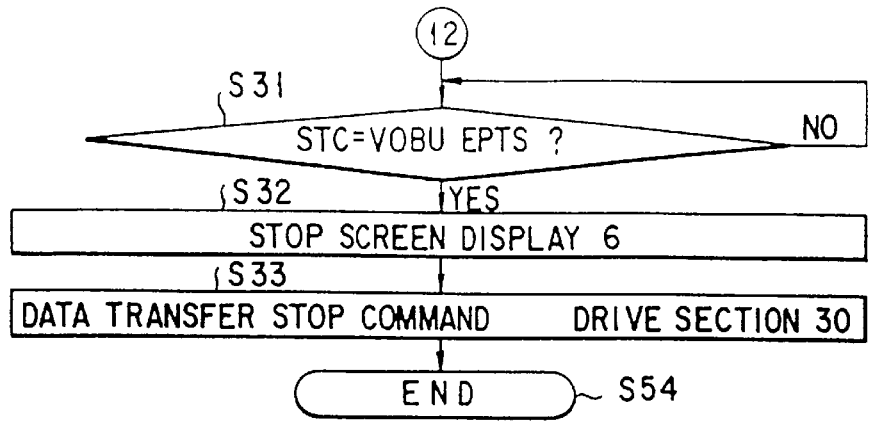

If the end of playback has been specified in step S19, or if there is no program chain to be reproduced next in step S26, the end PTS (VOBU_EPTS) contained in the PCI general information (PCI_GI) is referred to in step S31 (FIG. 84). When the end PTS (VOBU_EPTS) coincides with the system time clock (STC), the monitor 6 will stop displaying on the screen as shown in step S32, then the system CPU will supply a data transfer stop command to the disk drive section 30 to stop the data transfer as shown in step S33, terminating the playback operation.

Figure 85:
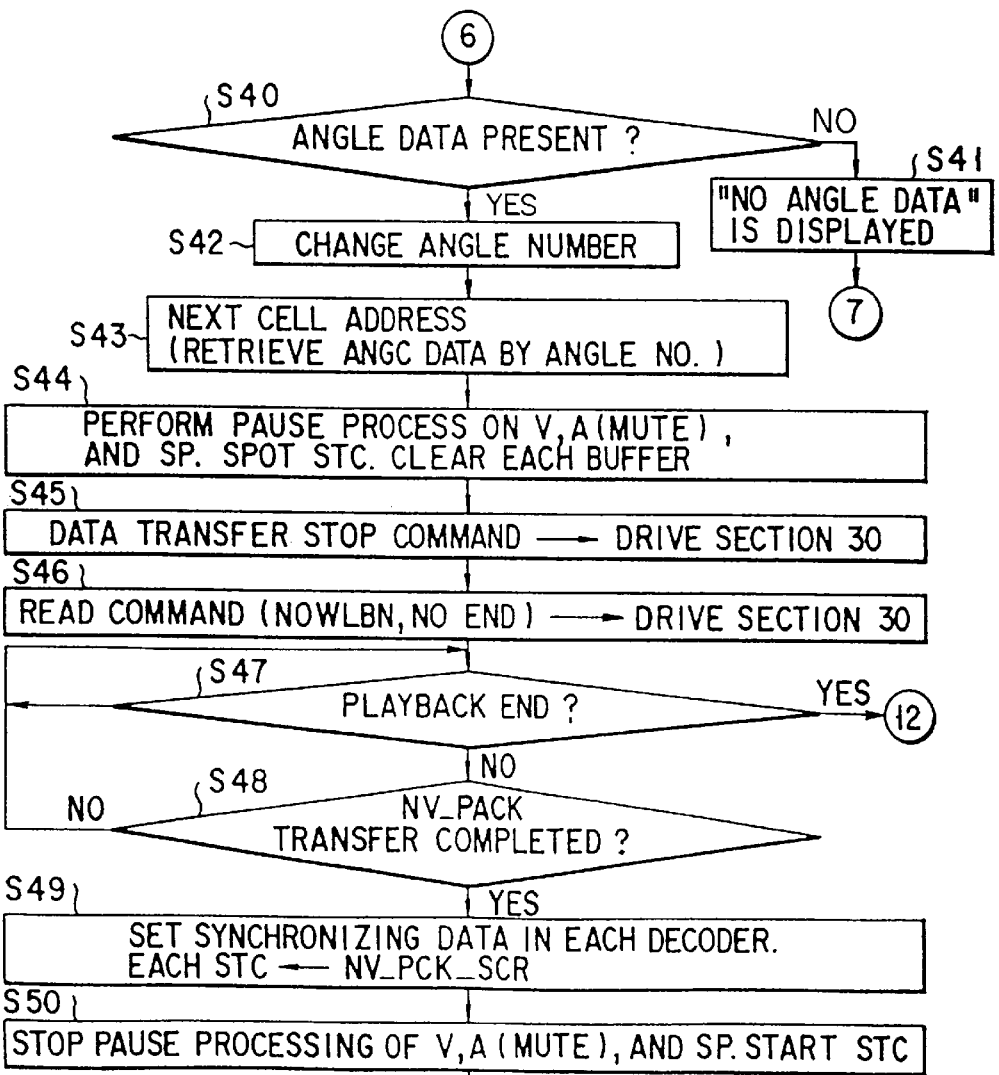
FIG. 85 is a flowchart of the procedure for changing the angle during playback of the video data from an optical disk having logic formats shown in FIGS. 6 to 66.

If angle change input is supplied from the key/display section 4 or the remote controller 5 in step S23, it will be checked whether there is angle data as shown in step S40 of FIG. 85. The presence/absence of angle has been given as angle information (NSML_AGLI, SML_AGLI) to both, the PCI data 113 and DSI data 115 in the navigation pack 86. If there is no angle to be changed in step S40, the message that there is no angle data will be displayed on the key/display section 4 or the remote controller 5 or the monitor 6 as shown in step S41. After the message for no angle data is displayed, control goes to step S24. If there is angle data, as shown in step S42, an angle number to be changed will be specified from the key/display section 4 or the remote controller 5. In this case, as explained earlier, it will be specified which of the angle information in the PCI data and the DSI data (NSML_AGLI, SML_AGLI) is used to change the angle. When only one type of angle information is available, the selection is limited to the one type. If an angle number is specified, the target addresses (NSML_AGL_CDSTA, SML_AGL_C_DSTA) of the angle cell corresponding to the specified angle number as shown in FIGS. 47 and 61 will be acquired at step S43. By this address, a cell is searched for. The address is set for the logical block number (NOWLBN) to be searched for. With the angle change operation using the PCI data, the system CPU section 50 performs a muting process on the playback of video and audio data, and also effects a pause process on the playback of sub-pictures. These processes stop the system time clock (STC) in each section of the reproducing system and make it possible to take in the angle data already changed by clearing the buffers in the video, audio, and sub-picture decoders 58, 60, and 62. At the same time, at shown in step S45, the system CPU section 50 issues a read end address command and temporarily prevents the disk drive section 30 from reading the data. Thereafter, as shown in step S46, the CPU section 50 supplies a read command to the disk drive section 30. Then, the selected cell is searched for by the set retrieval logical block number or by the start address of the cell and the cell data is retrieved consecutively. The transfer of the data in the selected angle cell is then started.

After the transfer has been started, it is checked again, in step S47 whether a playback end has been specified and control waits for the transfer of the navigation pack of the first cell associated with the changed angle. As shown in step S48, it is checked whether a navigation pack has been transferred as a result of the data transfer. If no navigation pack has been transferred, control will be returned to step S47. If a navigation pack has been transferred, each system time clock (STC) will be set with reference to the SCR in the NV pack (NV_PCK_SCR) contained in the DSI general information (DSI_GI) in the navigation pack 86. Thereafter, the video and audio muting state and the pause state of sub-pictures are canceled at step S50 and then the system time clock (STC) starts. Then, step S21 of FIG. 82 is executed as in a normal playback.

Next, the video data in the logic formats shown in FIGS. 6 to 66, a method of recording data on the optical disk 10 to reproduce the video data, and a recording system to which the recording method is applied will be explained with reference to FIGS. 86 to 91.

Figure 86:
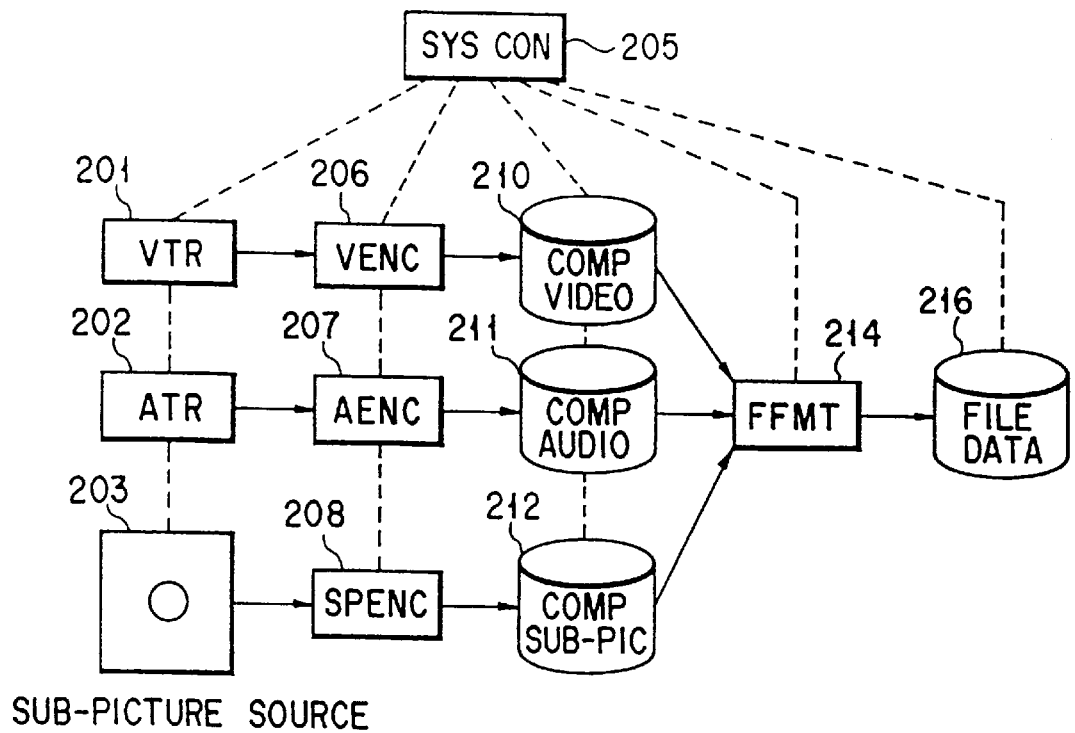
FIG. 86 is a block diagram of an encoder system that encodes the video data and generates a video file.

FIG. 86 shows an encoder system that creates a video file of a title set 84 in which the video data including menu data is encoded. In the system of FIG. 86, for example, a videotape recorder (VTR) 201, an audiotape recorder (ATR) 202, and a sub-picture source 203 are used as sources of the video data, the audio data, and the sub-picture data. Under the control of a system controller (Sys con) 205, they create the video data, audio data, and sub-picture data, which are supplied to a video encoder (VENC) 206, an audio encoder (AENC) 207, and a sub-picture encoder (SPENC) 208, respectively. Under the control of the system controller (Sys con) 205, these encoders 206, 207, and 208 perform A/D conversion of the video data, audio data, and sub-picture data and encode them by the respective compression schemes. The encoded video data, audio data, and sub-picture data (Comp Video, Comp Audio, Comp Sub-pic) are stored in memories 210, 211, and 212. The video data, audio data, and sub-picture data (Comp Video, Comp Audio, Comp Sub-pic) are outputted to a file formatter (FFMT) 214 under the control of the system controller (Sys con) 205, which converts them so that they may have a file structure of video data for the system as explained earlier. Then, under the control of the system controller (Sys con) 205, management information, such as the setting conditions for each data item, the attributes, the highlight information and data for preparing menu data are stored in a memory 216 in the form of files.

The menu-data preparing data includes the aforementioned PTT_Ns, TT_Ns, ATS_AST_Ns, VTS_AST_ATR, VTS_SPST_Ns and VTS_SPST_AST.

Explained next will be a standard flow of an encoding process in the system controller (Sys con) 205 that creates a file from video data.

According to the flow of FIG. 87, the video data and the audio data are encoded and the encoded video data and audio data (Comp Video, Comp Audio) are supplied. Specifically, when the encoding process is started, as shown in step S70 of FIG. 87, the parameters necessary for encoding the video data and audio data are set. Part of the set parameters are stored in the system controller (Sys con) 205 while being used at the file formatter (FFMT) 214. As shown in step S271, the video data is pre-encoded using the parameters and the optimum distribution of the amount of codes is calculated. Then, on the basis of the code amount distribution obtained in the pre-encoding, the video data is encoded as shown in step S72. At the same time, the audio data is also encoded at step S72. As shown in step in S73, if necessary, the video data is partially encoded again and the reencoded portion of the video data is replaced with the old one. Through the series of steps, the video data and audio data are encoded. Furthermore, as shown in steps S74 and S75, the sub-picture data is encoded and the encoded sub-picture data (Comp Sub-pict) is supplied. Namely, the parameters necessary for encoding the sub-picture data are set. As shown in step S74, part of the parameters are stored in the system controller (Sys con) 205 and used in the file formatter (FFMT) 214. On the basis of the parameters, the sub-picture data is encoded. By the process, the sub-picture data is encoded.

According to the flow of FIG. 88, the encoded video data, audio data, and sub-picture data (Com Video, Com Audio, Comp Sub-pict) are combined and converted so as to form a video data title set structure as explained in FIG. 6. Specifically, as shown in step S76, a cell is set as the smallest unit of the video data and cell playback information on a cell (C_PBI) is created. Then, as shown in step S77, the structure of the cells constituting a program chain and the video, sub-picture, and audio attributes (the information obtained in encoding the respective data items are used as part of these attributes) are set and the video title set information management table information (VTSI_MAT) 98 containing information on a program chain and a video title set time search map table (VTS_MAPT) 101 are created. At this time, as the need arises, a video title set part of title search pointer table (VTS_PTT_SRPT). is also created. The encoded video data, audio data, and sub-picture data (Com Video, Comp Audio, Comp Sub-pict) are subdivided into specific packs. An NV pack is placed at the head of each VOBU unit so that playback can be effected in the order of time code of each data item. With the NV packs arranged this way, each data cell is positioned so that a video object (VOB) may be composed of a plurality of cells as shown in FIG. 8. A set of such video objects is formatted into the title set structure.

In the flow of FIG. 88, the program chain information (PGI) is obtained in the process of step S77 by using the database in the system controller (Sys con) 205 or entering data again as the need arises.

Figure 89:
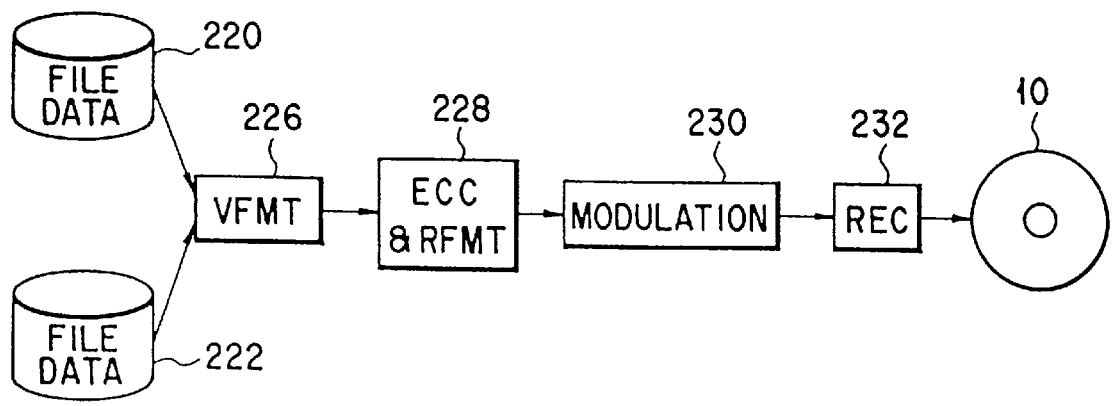
FIG. 89 is a block diagram of a disk formatter system that records the formatted video files on an optical disk.

FIG. 89 shows a disk formatter system that records the title set formatted as described above on an optical disk. In the disk formatter system of FIG. 89, the memories 220, 222 in which the created title set is stored supply these file data items to a volume formatter (VFMT) 226. The volume formatter (VFMT) 226 extracts the management information from the title sets 84, 86, produces a video manager 71, and creates the logic data to be recorded on the disk 10 in the arrangement of FIG. 6. A disk formatter (DFMT) 228 adds error correction data to the logic data created at the volume formatter (VFMT) 226, thereby reconverting the logic data into physical data to be recorded on the disk. A modulator 230 converts the physical data created at the disk formatter (DFMT) 228 into the recording data actually to be recorded on the disk. Then, a recorder 232 records the modulated recording data on the disk 10.

A standard flow for creating the aforementioned disk will be described with reference to FIGS. 90 and 91. FIG. 90 shows the flow for creating the logic data to be recorded on the disk 10. Specifically, as shown in step S80, parameter data items, including the number of video data files, their arrangement, and the size of each video data file, are set first. Next, in step S81, video manger 71 is generated from the parameters set and the video title set information 281 of each video title set 72. In step S82, the video manager 71 and the video tile set 71 are arranged in the order mentioned, according to their logic block numbers, thereby generating logic data which is to be recorded on the disk 10.

Thereafter, the flow for creating the physical data to be recorded on the disk is executed as shown in FIG. 91. Specifically, as shown in step S83, the logic data is divided into units of a specific number of bytes, thereby forming error correction data. Next, as shown in step S84, the logic data divided into units of a specific number of bytes are combined with the created error correction data to form physical sectors. Thereafter, as shown in step S85, physical data is created by combining physical sectors. In this way, the modulating process based on certain rules is performed on the physical data created in the flow of FIG. 91, thereby forming the recording data. Thereafter, the recording data is recorded on the disk 10.

Figure 92:
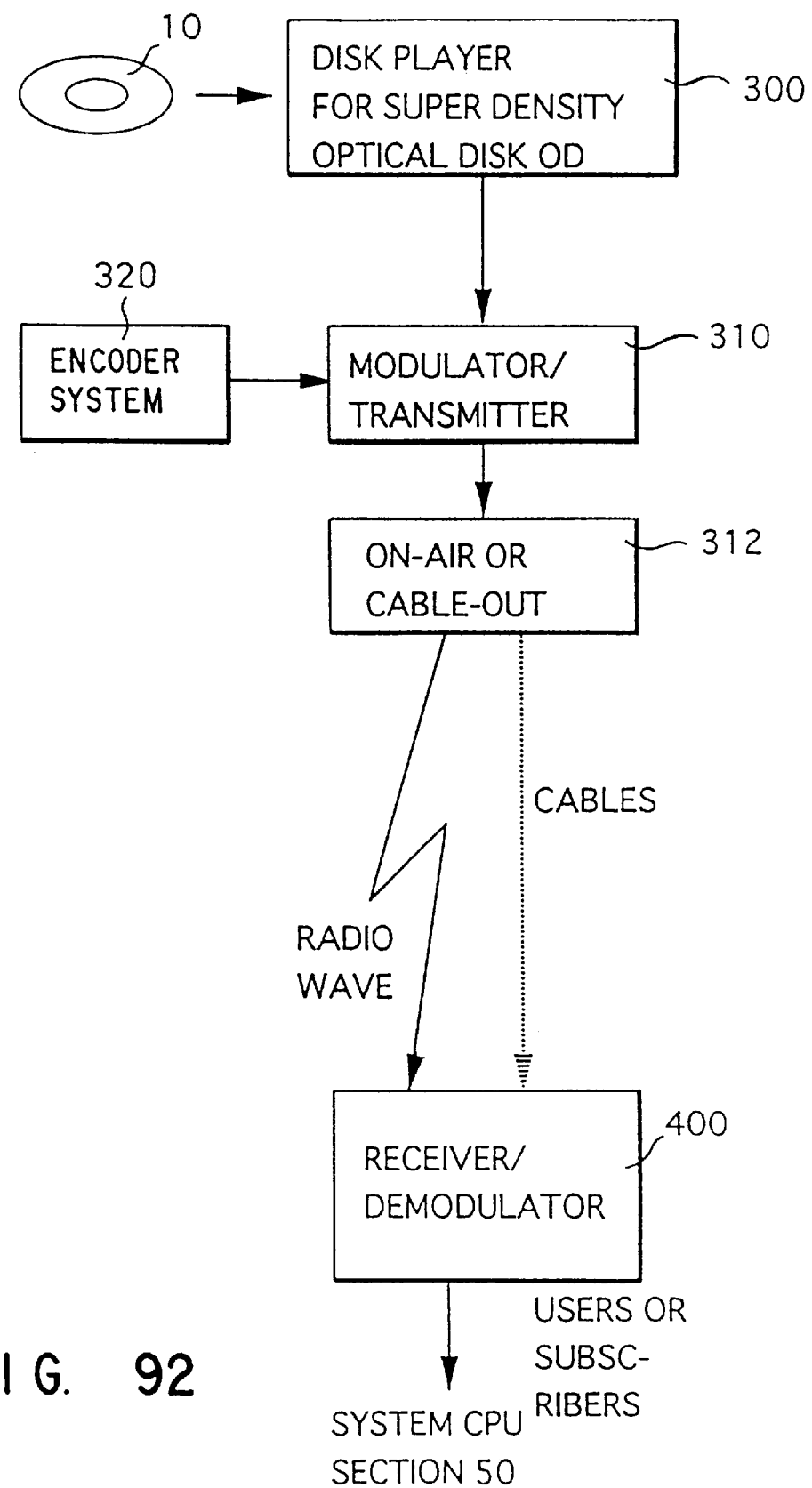
FIG. 92 is a schematic diagram of a system that transfers the video title set of FIG. 6 via a communication route.

The above-described data structure can be applied not only to a case where the data is recorded on recording mediums, such as optical disks, which are distributed to the users, but also to a communication system as shown in FIG. 92. Specifically, according to the procedure shown in FIGS. 86 to 89, an optical disk 10 in which a video manager 71 and video title set 72 as shown in FIG. 6 may be loaded into a reproducing unit 300, from whose system CPU section 50 the encoded data is taken out digitally and transmitted by a modulator/transmitter 310 to the users or the cable subscribers by radio or via a cable. Furthermore, the encoding system 320 shown in FIGS. 92 may create the data encoded on the provider side, such as a broadcasting station and the encoded data may be transmitted by the modulator/transmitter 310 to the users or the cable subscribers by radio or via a cable. In such a communication system, the information in the video manager 71 is modulated at the modulator/transmitter 310 and then supplied to, or directly supplied to, the users free of charge. When a user is interested in the title, the modulator/transmitter 310 transmits the title set 72 at the user's or subscriber's request by radio or via a cable 312. Under the control of the video manager 71, the video title set information 94 is first transferred and then the title video object 95 in the video title set reproduced according to the title set information 94 is transferred. At this time, if necessary, the video title set menu video object 95 is also transmitted. The transferred data is received by a receiver/demodulator 400 on the user side and is processed as encoded data at the system CPU section 50 of the reproducing unit on the user or subscriber side of FIG. 1 in the same manner as in the above-described reproducing process, whereby the video data is reproduced.

In transferring the video title set 72, the video object sets 95, 96 are transferred using the video object unit 85 of FIG. 6 as a unit. At the head of the video object unit 85, an NV pack 86 containing video playback and search information is arranged. Furthermore, because the NV pack contains the addresses of the video object units to be reproduced immediately before and after the video object unit 85 to which the NV pack 86 belongs, even if the video object unit 85 is lost during transfer for some reason, the video object can be reproduced reliably on the user side by requesting the lost video object unit 85 to be transmitted again. Furthermore, even if transfer is not carried out in the order of playback of video object units, because the system ROM/RAM section 52 on the user side holds the accurate playback information on program chains, the system CPU section 50 can specify the order of playback referring to the address data in its NV pack.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An encoding method for encoding data to be recorded in an information recording medium, said recording medium having a data recording area for recording a video manager and at least one video title set, said video manager having data for controlling said video title set and said video title set containing video data, audio data, and sub-picture data, said encoding method comprising:

receiving said video data, said audio data, and said sub-picture data;

encoding said video data, said audio data, and said sub-picture data;

dividing contents of said encoded video, audio, and sub-picture data into corresponding one or more video packs, one or more audio packs, and one or more sub-picture packs;

arranging said video packs, audio packs, and sub-picture packs and appending a navigation pack to define a video object unit, wherein said navigation pack includes playback control data and is disposed at a beginning position within said video object unit;

arranging a plurality of said video object units to define each of a plurality of video object sets;

arranging a plurality of said video object sets to define said video title set, wherein at least one of said video manager and said video title set contains menu information, said menu information including a menu background image, at least one menu selection item image for indicating a selection of a menu item, and at least one menu status button for indicating a status of a selection, wherein said playback control data includes highlight information for highlighting said menu status button, wherein said highlight information contains highlight general information describing attributes of said highlight information including a highlight start time during a presentation period of said video object unit, number of numerical selection button information, forcedly selected button number information at said highlight start time, and forcedly activated button number information at an end time of a button selection, said highlight information also containing a menu status button color information table describing color attributes of said menu status button and a menu status button information table having menu status button information, and wherein said menu status button information includes, status button position information for indicating a position corresponding to said menu status button, adjacent status button information for describing a direction of a next selection for said menu status button, and status button command for describing a status command to be executed when said menu status button is activated to reproduce a title which is designated according to said status button command.

* * * * *